(12) United States Patent
O'Neil et al.

(10) Patent No.: US 12,460,196 B2
(45) Date of Patent: *Nov. 4, 2025

(54) METHOD FOR ISOLATING NUCLEIC ACIDS FROM PLANT SAMPLES

(71) Applicant: QIAGEN GmbH, Hilden (DE)

(72) Inventors: Dominic O'Neil, Hilden (DE); Patrick Smith, Hilden (DE)

(73) Assignee: QIAGEN GmbH, Hilden (DE)

( * ) Notice: Subject to any disclaimer, the term of this patent is extended or adjusted under 35 U.S.C. 154(b) by 1056 days.

This patent is subject to a terminal disclaimer.

(21) Appl. No.: 17/048,788

(22) PCT Filed: Apr. 29, 2019

(86) PCT No.: PCT/EP2019/060982
§ 371 (c)(1),
(2) Date: Oct. 19, 2020

(87) PCT Pub. No.: WO2019/207168
PCT Pub. Date: Oct. 31, 2019

(65) Prior Publication Data
US 2021/0292742 A1    Sep. 23, 2021

Related U.S. Application Data

(60) Provisional application No. 62/664,028, filed on Apr. 27, 2018.

(30) Foreign Application Priority Data

May 11, 2018  (EP) .................. 18171963
Aug. 16, 2018  (EP) .................. 18189421

(51) Int. Cl.
C12N 15/10     (2006.01)
C12Q 1/6806    (2018.01)

(52) U.S. Cl.
CPC ....... *C12N 15/1003* (2013.01); *C12Q 1/6806* (2013.01)

(58) Field of Classification Search
CPC .................................. C12N 15/1003
See application file for complete search history.

(56) References Cited

U.S. PATENT DOCUMENTS

| | | | |
|---|---|---|---|
| 5,538,530 A | 7/1996 | Heaton et al. | |
| 5,639,635 A | 6/1997 | Joly et al. | |
| 8,889,393 B2 | 11/2014 | Sjöblom et al. | |
| 2007/0106071 A1* | 5/2007 | Yamashita | C12N 15/1006 536/25.4 |
| 2013/0091601 A1 | 4/2013 | Narva et al. | |
| 2015/0185126 A1 | 7/2015 | Callahan et al. | |
| 2017/0218356 A1 | 8/2017 | Klapproth et al. | |
| 2018/0245064 A1 | 8/2018 | Moroney et al. | |
| 2019/0071665 A1 | 3/2019 | Callahan et al. | |
| 2019/0083554 A1 | 3/2019 | Morrison et al. | |
| 2019/0367904 A1 | 12/2019 | Kemp et al. | |

FOREIGN PATENT DOCUMENTS

| | | |
|---|---|---|
| WO | 2004/108925 A1 | 12/2004 |
| WO | 2005/039722 A2 | 5/2005 |
| WO | 2013/096799 A1 | 6/2013 |
| WO | 2015/154013 A1 | 10/2015 |
| WO | 2016/183292 A1 | 11/2016 |
| WO | 2016/189132 A1 | 12/2016 |
| WO | 2017/044827 A1 | 3/2017 |
| WO | 2019/209597 A1 | 10/2019 |
| WO | 2019/209600 A1 | 10/2019 |

OTHER PUBLICATIONS

Krsek et al., Journal of Microbiological Methods, 1999, 39, p. 1-16. (Year: 1999).*
Mustafa et al., AIP Conf. Proc., 2017, 1844, 030007, 5 pages. (Year: 2017).*
FastDNA® SPIN Kit for Soil, *Rapid Isolation of PCR—Ready Genomic DNA from Soil Samples Using the FastPrep® System*, Instruction Manual, 16 pages, Retrieved from the Internet Jun. 27, 2018.
Greco et al., "A Simple and Effective Method for High Quality Co-Extraction of Genomic DNA and Total RNA from Low Biomass *Ectocarpus siliculosus*, the Model Brown Alga," *PLOS One* 9(5):e96479, 13 pages (May 2014).
Köberl et al., Agroforestry leads to shifts within the gammaproteobacterial microbiome of banana plants cultivated in Central America, *frontiers in Microbiology* 6(91):1-10, www.frontiersin.org (Feb. 11, 2015).
Serna-Dominguez et al., "Two efficient methods for isolation of high-quality genomic DNA from entomopathogenic fungi," *Journal of Microbiological Methods* 148:55-63 (2018).
Triant et al., "Simultaneous Extraction of High-Quality RNA and DNA from Small Tissue Samples," *Journal of Heredity* 100(2):246-250 (2009).
Yu, "Bead Beating Offers High-Performance Homogenization for Molecular Biology Downstream Processing of Tough and Difficult Samples," M. Mićić (ed), *Sample Preparation Techniques for Soil, Plant, and Animal Samples*, Springer Protocols Handbooks, Chapter 7, 14 pages, (2016).
U.S. Appl. No. 17/051,310, filed Oct. 28, 2020.
European Office Action dated Mar. 21, 2024 for corresponding EP Application No. 19 720 866.3, 4 pages.

(Continued)

*Primary Examiner* — Jonathan S Lau
(74) *Attorney, Agent, or Firm* — Seed Intellectual Property Law Group LLP

(57) ABSTRACT

Provided is a method for isolating nucleic acids from a plant sample comprising (a) preparing a lysed sample wherein preparing comprises (i) lysing a plant sample by mechanically disrupting the plant sample in a lysis solution which comprises at least one chaotropic agent and one or more solid disrupting particles, and (ii) optionally clearing the lysate; (b) contacting the lysed sample with at least one protein precipitating agent and at least one inhibitor removing agent and providing a mixture; (c) obtaining a liquid phase from the mixture; and (d) isolating nucleic acids from the liquid phase. Also provided is a kit for use in such method.

25 Claims, 13 Drawing Sheets

(56) References Cited

OTHER PUBLICATIONS

Knauth et al., "Comparison of commercial kits for the extraction of DNA from paddy soils," *Letters in Applied Microbiology* 56:222-228 (2012).
Bell Balls, "Ballcone Steel Finishing Media", URL=https://www.bellballs.com/grinding-media/ballcone-steel-finishing-media.html, retrieved Jun. 15, 2024. (6 pages).
Braid et al., Removal of PCR inhibitors from soil DNA by chemical flocculation. Journal of Microbiological Methods, 52, 389-293, 2003.
Burden, "Guide to the Homogenization of Biological Samples," Random Primers 7:1-14, Sep. 2008. (14 pages).
Kuske et al., "Small-Scale DNA Sample Preparation Method for Field PCR Detection of Microbial Cells and Spores in Soil," Applied and Environmental Microbiology 64(7):2463-2472, Jul. 1998. (10 pages).
Office Action, dated May 27, 2025, for Australian Patent Application No. 2019266454. (6 pages).
Wikipedia, "Polyhedron", URL=https://en.wikipedia.org/wiki/Polyhedron, retrieved Jun. 13, 2024. (26 pages).
Cray et al., "A universal measure of chaotropicity and kosmotropicity," Environmental Microbiology 15(1):287-296, Jan. 2013 [Published online Nov. 12, 2012]. (10 pages).
Office Action, dated Jul. 7, 2025, for Australian Patent Application No. 2019258956. (4 pages).
Gibbons et al., "Bead Beating: A Primer," Random Primers 12, May 29, 2014. (20 pages).
Office Action, dated Jul. 14, 2025, for Australian Patent Application No. 2019266454. (4 pages).

\* cited by examiner

Class
- Other
- Pedosphaerae
- Saprospirae
- Cytophagia
- Planctomycetia (P)
- Deltaproteobacteria (D)
- Actinobacteria (A)
- Betaproteobacteria (B)
- Gammaproteobacteria (G)
- Alphaproteobacteria (Al)
- Chloroplast (C)

METHOD FOR ISOLATING NUCLEIC ACIDS FROM PLANT SAMPLES

BACKGROUND OF THE INVENTION

Nucleic acid isolation from plants can be very challenging due to the difficult to lyse nature of plant cells and the presence of large amounts of inhibitors, including polysaccharides and polyphenolic compounds. In addition these parameters can vary dramatically between plant types and different parts of the same plant. This often leads to the isolation of low amount of poor quality of nucleic acids such as DNA.

The most often used methods of lysis for plant samples is either a mortar and pestle or mechanical disruption with common grinding media (i.e., metal or glass beads). When such standard procedures are used, yields are typically low and the DNA includes the presence of large amounts of inhibitors depending on the sample type. Thus a need exists for improved lysis and inhibitor removing that can be used across a large spectrum of plant types.

For isolating nucleic acids such as DNA from plants a commonly used method uses a mortar and pestle in combination with a CTAB lysis buffer for both lysis of plant material and removal of inhibitors. The use of a mortar and pestle is time consuming, ineffective, and difficult to use with multiple samples. CTAB is a toxic agent. Commercially available kits use either a mortar and pestle or some combination of spherically shaped ceramic or metal beads combined with chaotropic buffers and detergent based buffers for lysis. The disadvantages of these approaches are that they are non-standard in nature and cannot be applied to multiple different plant types with similar success. This often leads to lower yields, increased presence of inhibitors and, in the case of mortar and pestle, time-consuming experiments.

There is a need for improved methods for isolating nucleic acids, such as in particular DNA, from plant samples. In particular, there is a need for a protocol that increases the nucleic acid yield and inhibitor removing for a large variety of plant sample types.

SUMMARY OF THE INVENTION

According to a first aspect, a method for isolating nucleic acids from a plant sample is provided comprising
(a) preparing a lysed sample wherein preparing comprises
(i) lysing a plant sample by mechanically disrupting the plant sample in a liquid lysis composition which comprises at least one chaotropic agent and one or more solid disrupting particles, and
(ii) optionally clearing the lysate;
(b) contacting the lysed sample with at least one protein precipitating agent and at least one inhibitor removing agent and providing a mixture;
(c) obtaining a liquid phase from the mixture; and
(d) isolating nucleic acids from the liquid phase.

According to a second aspect, a kit for isolating nucleic acids from a plant sample is provided, said kit comprising
(i) at least one chaotropic agent, preferably selected from sodium thiocyanate, sodium carbonate, ammonium thiocyanate, potassium thiocyanate, lithium thiocyanate, lithium perchlorate, guanidine sulfate, and combinations thereof;
(ii) at least one phosphate;
(iii) at least one solid disrupting particle;
(iv) at least one precipitating agent, preferably selected from ammonium acetate, ammonium sulfate, potassium acetate, sodium acetate, sodium chloride, cesium acetate, and combinations thereof;
(v) at least one inhibitor removing agent, preferably selected from aluminum chloride, aluminum sulfate, erbium (III) acetate, erbium (III) chloride, holmium chloride, zirconium (IV) chloride, hafnium (IV) chloride, aluminum ammonium sulfate, aluminum ammonium sulfate dodecahydrate, aluminum potassium sulfate, aluminum chlorohydrate, calcium oxide, iron (III) chloride, iron (II) sulfate, sodium aluminate, sodium silicate, magnesium chloride, and combinations thereof.

According to a third aspect, the present disclosure relates to the use of a kit according to the second aspect in the method according to the first aspect.

The technology of the present invention allows isolating high quality nucleic acids, such as DNA, with high yield from various plant samples. As is demonstrated by the examples, the present technology allows isolating high quality DNA, which is free from inhibitors, with high yield from different types of plant samples. The present technology improves the lysis of the plant material and therefore improves the release of nucleic acids from the plant sample, thereby increasing the nucleic acid yield. Furthermore, inhibitor removal is very efficient with the present method, thereby ensuring that the isolated nucleic acid is of high quality. As is furthermore demonstrated by the examples, the method of the present invention can be used for various different plant sample types with similar success. The present invention therefore provides a universal method for a large variety of plant sample types that allows isolating nucleic acids, in particular DNA, with high yield and purity. The present invention therefore makes an important contribution to the art.

Other aspects, objects, features, and advantages of the present application will become apparent to those skilled in the art from the following description and appended claims. It should be understood, however, that the following description, appended claims, and specific examples, while indicating preferred embodiments of the application, are given by way of illustration only.

DETAILED DESCRIPTION OF THE INVENTION

The present invention improves the extraction of nucleic acids such as DNA from plant samples, including leave, stem, seed, root and needle compared to standard procedures such as using a mortar and pestle and through mechanical disruption with common grinding media. The present application shows that using an optimized chemistry for plant sample lysis in combination with the choice of grinding media allows efficient, fast, and complete homogenization of various plant samples. Yield and inhibitor removal are substantially improved over standard techniques in the field.

The current invention uses a new lysis chemistry in combination with a relatively large and heavy solid device (ballcone or similar) in order to efficiently homogenize a wide range of plant samples followed by incorporation of a specific inhibitor removal step to provide high quality DNA. The method provided herein isolates nucleic acids from a plant sample and removes inhibitors from the isolated nucleic acids, allowing effective downstream analysis of isolated nucleic acids. The method increases the nucleic acid yield and inhibitor removal for a large variety of plant sample types.

According to a first aspect, a method for isolating nucleic acids from a plant sample is provided comprising
(a) preparing a lysed sample wherein preparing comprises
  (i) lysing a plant sample by mechanically disrupting the plant sample in a liquid lysis composition which comprises at least one chaotropic agent and one or more solid disrupting particles, and
  (ii) optionally clearing the lysate;
(b) contacting the lysed sample with at least one protein precipitating agent and at least one inhibitor removing agent and providing a mixture;
(c) obtaining a liquid phase from the mixture; and
(d) isolating nucleic acids from the liquid phase.

According to a second aspect, a kit for isolating nucleic acids from a plant sample is provided, said kit comprising
  (i) at least one chaotropic agent, preferably selected from sodium thiocyanate, sodium carbonate, ammonium thiocyanate, potassium thiocyanate, lithium thiocyanate, lithium perchlorate, guanidine sulfate, and combinations thereof,
  (ii) at least one phosphate;
  (iii) at least one solid disrupting particle;
  (iv) at least one precipitating agent, preferably selected from ammonium acetate, ammonium sulfate, potassium acetate, sodium acetate, sodium chloride, cesium acetate, and combinations thereof;
  (v) at least one inhibitor removing agent, preferably selected from aluminum chloride, aluminum sulfate, erbium (III) acetate, erbium (III) chloride, holmium chloride, zirconium (IV) chloride, hafnium (IV) chloride, aluminum ammonium sulfate, aluminum ammonium sulfate dodecahydrate, aluminum potassium sulfate, aluminum chlorohydrate, calcium oxide, iron (III) chloride, iron (II) sulfate, sodium aluminate, sodium silicate, magnesium chloride, and combinations thereof.

According to a third aspect, the present disclosure relates to the use of a kit according to the second aspect in the method according to the first aspect.

In the following description, any ranges provided herein include all the values in the ranges.

It should also be noted that the term "or" is generally employed in its sense including "and/or" (i.e., to mean either one, both, or any combination thereof of the alternatives) unless the content dictates otherwise.

Also, as used in this specification and the appended claims, the singular forms "a," "an," and "the" include plural referents unless the content dictates otherwise.

The terms "include," "have," "comprise" and their variants are used synonymously and to be construed as non-limiting.

The term "a combination thereof" as used herein refers to one of the all possible combinations of the listed items preceding the term. For example, "A, B, C, or a combination thereof" is intended to refer to any one of: A, B, C, AB, AC, BC, or ABC. Similarly, the term "combinations thereof" as used herein refers to all possible combinations of the listed items preceding the term. For instance, "A, B, C, and combinations thereof" is intended to refer to all of: A, B, C, AB, AC, BC, and ABC.

The Method According to the First Aspect

According to a first aspect, a method for isolating nucleic acids from a plant sample is provided comprising
(a) preparing a lysed sample wherein preparing comprises
  (i) lysing a plant sample by mechanically disrupting the plant sample in a liquid lysis composition which comprises at least one chaotropic agent and one or more solid disrupting particles, and
  (ii) optionally clearing the lysate;
(b) contacting the lysed sample with at least one protein precipitating agent and at least one inhibitor removing agent and providing a mixture;
(c) obtaining a liquid phase from the mixture; and
(d) isolating nucleic acids from the liquid phase.

The individual steps and preferred embodiments will now be described in detail.

Step (a) Preparing a Lysed Sample

Step (a) comprises preparing a lysed sample. Preparing a lysed sample in step (a) comprises
  (i) lysing a plant sample by mechanically disrupting the plant sample in a liquid lysis composition which comprises at least one chaotropic agent and one or more solid disrupting particles, and
  (ii) optionally clearing the lysate.

The present method combines mechanical disruption using at least one solid disrupting particle with chemical lysis using a chaotropic agent. This special combination allows to efficiently lyse plant samples of different origin and nature. The components can be added in any order to prepare the conditions for disruption in step (a).

The Disrupting Particles

For mechanical disruption of the plant sample, at least one solid disrupting particle is used. The one or more disrupting particles are agitated, e.g. mixed or vortexed, as is further described herein so that disruptive forces are applied to the plant sample upon contact. The plant sample may be homogenized.

The at least one disrupting particle used is non-spherical and preferably has an irregular shape. It is an important advantage that the one or more disrupting particles are non-spherical.

In a particularly preferred embodiment, the surface of the one or more disrupting particle has at least one discontinuity, especially preferred an edge or a peak. According to one embodiment, the disrupting particle used has one or more beveled edges. The discontinuity provides the advantage that it can be used to apply an irregular, preferably point- or line-impact onto the plant material to be disrupted. It also allows the contact between the particle and the plant material to be of a random nature. The discontinuity leads to movements of the particles that are more irregular compared to movements of spherical-shaped particles and can be used to more randomly attack the plant material to be disrupted. The disruptive forces are increased where the discontinuity, such as an edge or peak, hits the plant material to be disrupted. This allows to efficiently disrupt even very diverse plant materials and thereby provides in combination with the used lysis conditions a universal protocol for many different plant sample types. Therefore, all embodiments described herein specifically preferably apply to a disrupting particle having a surface comprising at least one discontinuity as described above and below. As disclosed, it is preferred to use a single disrupting particle of this type.

In a preferred embodiment the surface of the particle contains a first part and contains a second part, whereby the first part and the second part meet by forming an edge. Preferably, the edge extends along a line. The line can be a circle or an arc. The line could also be a straight line. In a preferred embodiment, the first part is the surface of a frustum of a cone and the second part is the surface of a frustum of a cone. Preferably in the embodiment where the first part is the surface of a frustum of a cone and the second part is the surface of a frustum of a cone, both cones are set against each other with their larger base, the edge being formed, where the larger bases meet, the larger basis preferably being of the same diameter. The particle preferably has one, in a preferred embodiment only one line of symmetry. Preferably the particle is of rotational symmetry about the line of symmetry. The edge may be provided in the form of sloping central flange, as is e.g. illustrated in FIGS. 6 to 8.

The particle may have a subportion that is made up of a section or a part of a ball or an ellipse.

The particle may have a tip. In one embodiment, the tip is a frustum of a cone. According to one embodiment, the larger base of the frustum of the cone that provides the tip is set against the smaller base of the frustum of the cone of the second part. In this embodiment, a subportion that is made up of a section or a part of a ball or an ellipse may be set against the smaller base of the frustum of the cone of the first part. In one embodiment, the subportion that is made up of a section or a part of a ball or an ellipse is a semi-sphere. An embodiment of such disrupting particle, which preferably is a ballcone, is shown in FIG. 6.

In one embodiment, the particle comprises at least two tips, wherein preferably, both tips are a frustum of a cone. According to one embodiment, the larger base of the frustum of a cone that provides the first tip is set against the smaller base of the frustum of the cone of the first part and the larger base of the frustum of a cone that provides the second tip is set against the smaller base of the frustum of the cone of the second part. An embodiment of such particle with two tips is shown in FIG. 7.

In one embodiment, the particle has two subportions, wherein each subportion is made up of a section or a part of a ball or an ellipse. In this embodiment, the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part. An embodiment of such particle with two semi-spheres is illustrated in FIG. 8.

The non-spherical particles used for disruption may have one or more discontinuities such as edges. They may be in the form of solid cones, cylinders, cubes, triangles, rectangles and similar suitable geometric forms. A further example is a diagonal with beveled edges. According to one embodiment, the disrupting particle has an irregular shape, and may be selected from a ballcone and satellite (shaped like Saturn, planet or UFO), for effecting a disruption of the tissue material when mixing or milling forces are applied to the tissue sample in the composition of the present invention. The use of a ballcone is particularly effective for disrupting plant samples and therefore is preferred. The solid disrupting particles should be selected in view of not deteriorating or disrupting the released cellular components or analytes.

To achieve sufficient disruption and homogenization of the plant material and undamaged liberation of the desired nucleic acids for isolation, it is preferred that the solid disrupting particles of the present invention are solid inert particles, i.e. particles made of a material, which does not react with the tissue material, with any of the reagents of the composition and in any case not with the desired nucleic acids to be liberated upon disruption. It is particularly preferred that the released nucleic acids cannot adsorb or adhere to the inert solid disrupting particles under the conditions used in step (a). Suitable inert materials comprise for example inert metals, steel, stainless steel, plastic, and ceramic. Preferably, the disrupting particle is made of metal. Preferably, it is made of steel, stainless steel, tungsten or other heavy metals. Further examples are metals and alloys from tantalum, platinum, etc., Steel materials include but are not limited to carbon steel, stainless steel and chrome steel. Steel such as stainless steel is preferred. Further suitable inert disrupting materials are known from commercially available inert disrupting particles. It is also possible to use mixtures of one or more kind of disrupting particles, i.e. use disrupting particles of different forms and/or made of different inert materials. In one embodiment, two kinds (also referred to as types) of solid disrupting particles are used, wherein (i) the first type comprises one or more disrupting particles having a size of at least 1.5 mm and (ii) the second type comprises a plurality of disrupting particles having a size of 1 mm or less. This embodiment is described in further detail elsewhere.

It is further preferred that the one or more disrupting particles used exhibit a sufficient hardness so that no abrasion occurs during the milling or grinding process.

In one embodiment, the one or more non-spherical disrupting particles have a density that lies in a range of 5.0 g/cc to 20 g/cc, e.g. selected from 5.5 g/cc to 15 g/cc, 6 g/cc to 12 g/cc and 6 g/cc to 10 g/cc.

To achieve sufficient disruption forces to effectively disrupt and in particular homogenize the plant sample the disrupting particles should preferably exhibit a comparably large size. This is advantageous and allows the isolation of nucleic acids such as DNA from various plant sample types.

The solid disrupting particles may have a size of at least 1 mm, e.g. at least 1.5 mm, preferably at least 2 mm, at least 2.5 mm or at least 3 mm. Further, the disrupting particles may preferably exhibit a size of at least 3 mm (≥3 mm), at least 3.5 mm or more preferably of at least 4 mm. The solid disrupting particle may exhibit a size of at least 4.5 mm or at least 5 mm.

The disrupting particles may exhibit a size of up to 15 mm, up to 12 mm, up to 10 mm or up to 8 mm.

The disrupting particles according to the present invention may exhibit a size of 1 mm to 15 mm, e.g. 1.5 mm to 15 mm, 2 mm to 15 mm, 2.5 mm to 15 mm, 3 mm to 15 mm or 4 mm to 15 mm. The particles may further exhibit a size of 1 mm to 12 mm, e.g. 1.5 mm to 12 mm, 2 mm to 12 mm, 2.5 mm to 12 mm, 3 mm to 12 mm or 4 mm to 12 mm. Further, the disrupting particles may exhibit a size of 1 mm to 10 mm, e.g. 1.5 mm to 10 mm, 2 mm to 10 mm, 2.5 mm to 10 mm, 3 mm to 10 mm, or 4 mm to 10 mm. The disrupting particles may further exhibit a size of 1 mm to 7 mm, e.g. 1.5 mm to 7 mm, 2 mm to 7 mm, 2.5 mm to 7 mm, 3 mm to 7 mm, 3.5 mm to 7 mm, or 4 mm to 7 mm. Most preferred is a size of 3 mm to 7 mm or of 4 mm to 7 mm. It is also possible to use mixtures of disrupting particles of different sizes in case more than one disrupting particle is used.

The defined sizes of the disrupting particles indicate the longest distance between two opposite points of the respective particle. As discussed, the use of irregularly shaped particles having at least one discontinuity at their surface, such as satellites or ballcones is preferred. Here, the longest distance between two opposite points is usually the diameter of the "saturn-like ring" surrounding the ball or ballcone part of such particles.

Depending on the size of the disrupting particles, one or more disrupting particles can be used. In the case of very large particles, the desired results of disruption and preservation of the analytes may be achieved with only one particle (in particular one ballcone). It is particularly preferred to use one, i.e. a single, disrupting particle. As described herein, the use of a single ballcone is preferred for disrupting the plant sample material. As furthermore described herein, in one embodiment, such single disrupting particle having an irregular shape (first type) can be used in combination with a plurality of different disrupting particles (second type) such as zirconia beads in order to additionally efficiently disrupt microorganisms comprised in the plant sample.

Examples of commercially available particles of irregular shape, ballcones or satellite-shaped particles, which are preferred, exhibit the following sizes:

TABLE I

| Sizes [mm] | | | |
| --- | --- | --- | --- |
| ball diameter × ring diameter | ball diameter | ring diameter | height (top of the cone to the opposite located side of the ball) |
| 3 × 5 mm | 3 mm | 5 mm | 3.6 mm |
| 4 × 6 mm | 4 mm | 6 mm | 4.7 mm |
| 5 × 7 mm | 5 mm | 7 mm | 5.7 mm |
| 6.5 × 8.5 mm | 6.5 mm | 8.5 mm | 8 mm |

Therein, one half of the steel ballcone is a semi-sphere (ball), the other half is a cone and both are separated by a sloping central flange (ring). An example of a ballcone is provided in the figures.

As discussed herein, the solid disrupting particle used is preferably a heavy solid device. According to one embodiment, the weight of the solid disrupting particle is at least 300 mg, e.g. at least 400 mg, at least 500 mg, at least 600 mg or at least 700 mg. In embodiments, the weight of the solid disrupting particle lies in the range of 300 mg-1500 mg, e.g. 400 mg to 1250 mg, 500 mg to 1000 mg and 600 mg to 900 mg.

A weight of 500 mg to 1000 mg or 600 mg to 900 mg is preferred. This is particularly if a single disrupting particle of irregular shape (e.g. a ballcone) is used for mechanical disruption. A disrupting particle of such weight may further exhibit a size of 1 mm to 10 mm, e.g. 1.5 mm to 9 mm, 2 mm to 8 mm, 2.5 mm to 7 mm, 3 mm to 7 mm or 4 mm to 7 mm. Most preferred is a size 3 mm to 7 mm, preferably 4 mm to 7 mm, and a weight of 500 to 1000 mg, preferably 600 mg to 900 mg. The disrupting particle of irregular shape is preferably a ballcone. As discussed herein, the use of a single ballcone is advantageous.

As disclosed, it is preferred to use a single non-spherical disrupting particle (e.g. having a size that lies in the range of 3 mm to 7 mm, preferably 4 mm to 7 mm and a weight of 500 to 1000 mg, preferably 600 mg to 900 mg), such as a single ballcone. When using such a single disrupting particle of irregular shape it is in embodiments possible to combine this single disrupting particle with disrupting particles of a different type, in particular particles having a different shape and preferably made of a different material. In one embodiment, two types of solid disrupting particles are used, wherein (i) the first type comprises one or more disrupting particles having a size of at least 1.5 mm and (ii) the second type comprises a plurality of disrupting particles having a size of 1 mm or less. This embodiment is particularly useful for isolating plant DNA that comprises microbial nucleic acids as described in further detail elsewhere.

The one or more disrupting particles may be comprised in a container, which preferably also comprises the lysis solution. In one embodiment, the lysis solution and the one or more disrupting particles are comprised in the same compartment of the container and are provided in form of a composition. The plant sample from which the nucleic acids are to be isolated can be added to the container. The container is then closed and mechanical disruption can be initiated.

The container for receiving the tissue material may be any suitable container or reaction vessel, which is preferably inert with respect to the agents used in the disruption treatment, which exhibits enough mechanical stability to withstand the forces of the disrupting particles without being destroyed or abraded, which exhibits a suitable size for receiving the plant sample material, the lysis solution and the one or more selected disrupting particle and still provides suitable space to allow agitation and movement of the inserted components to effect disruption and thus lysis of the plant material, and which can suitably be used with the device which is used for effecting the milling or grinding of the tissue material by the disrupting particles. Suitable container or reaction vessels (tubes) are known and commonly available.

According to one embodiment, the plant sample is homogenized in step (a) (i) to provide a lysate. As is demonstrated by the examples, the use of the present lysis chemistry in combination with the one or more solid disrupting particles as described herein efficiently homogenizes a wide range of plant samples.

Mechanical disruption with the one or more, preferably single, disrupting particles may include the use of bead beating and/or homogenizing devices. Suitable devices may include but are not limited to high-performance mixer or high-speed mixer, as well as low-power mixers, such as common laboratory vortexer, bench-top vortexer, or common lab shaker (e.g. horizontal shaker). Disruption may be performed using a vortex mixer with bead tube adapter or beating devices, such as TissueLyzer II (QIAGEN), AMBION™ Vortex Adapter (Thermo Fisher Scientific, Waltham, MA) and the Omini Bead Rupter Homogenizer, OMNI Int'l, Kennesaw, GA), and various homogenizers by OPS Diagnostics. High-power or high-performance mixer usually work with a frequency of 15 to 60 Hz. Low-power mixer such as in particular common vortexer usually work with a force of 150 up to 3200 rpm. Applying a reduced mechanical power, e.g. from a low-power mixer or vortexer can be advantageous for preserving the quality of the released nucleic acids and avoid damages or deterioration of the nucleic acids. In one embodiment, a high-speed shaker (e.g. 15-60 Hz) is used. In embodiments, it achieves oscillations/minute that are in a range of 150-2500, e.g. 180-1800. Suitable and advantageous duration for mechanical disruption can be determined by the skilled person. For example, one disruption cycle may comprise mechanical disruption with the one or more disrupting particles for 30 sec-20 min, 1 min to 15 min, 1.5 min to 10 min and 2 min to 7 min. Two or more disruption cycles can be performed if desired to achieve a good homogenization of the lysate.

The Liquid Lysis Composition and Phosphate

The liquid lysis composition comprises at least one chaotropic agent. According to one embodiment, the liquid lysis composition is a solution, preferably an aqueous solution. One or more solid disrupting particles can be comprised in the solution.

According to one embodiment, the chaotropic agent is a chaotropic salt.

According to one embodiment, the chaotropic agent is selected from sodium thiocyanate, sodium carbonate, potassium thiocyanate, ammonium thiocyanate, lithium thiocyanate, lithium perchlorate, guanidine sulfate, and combinations thereof. Such chaotropic agents can be used to generate a lysate.

According to one embodiment, the chaotropic agent is selected from sodium thiocyanate, potassium thiocyanate, ammonium thiocyanate, lithium thiocyanate and combinations thereof. Such chaotropic agents are particularly suitable to generate a lysate.

According to one embodiment, the chaotropic agent is NaSCN or $Na_2CO_3$, preferably NaSCN. According to one embodiment, the lysis composition comprises only one chaotropic agent and preferably comprises NaSCN as only chaotropic agent.

NaSCN, $Na_2CO_3$, KSCN, $NH_4SCN$, LiSCN, $LiClO_4$, guanidine sulfate are relatively mild chaotropic agents which is advantageous for the present method which combines such mild lysis with mechanical disruption using the irregularly shaped disrupting particles. Preferably, the relatively mild chaotropic agent is NaSCN.

The relatively mild chaotropic agents which may be used as chaotropic agent in the liquid lysis composition may include salts having the strong anion, SCN", paired with a cation weaker than $Mg^{2+}$ in solubilizing proteins; salts having the strong anion, $ClO_4$, paired with a cation weaker than $Mg^{2+}$ in solubilizing proteins; and salts having the weak anion, $CO_3^{2-}$, paired with a cation stronger than $NH_4^+$ in solubilizing proteins.

The relatively mild chaotropic agents (e.g., NaSCN) strike a desirable balance between a stronger chaotropic agent such as GuSCN or GuCl and a weaker chaotropic agent such as RbSCN. The less aggressive chaotropic agent can effectively solubilize biomolecules during disruption with the disrupting particle to make them available for downstream isolation. Strong chaotropic agents and detergents (e.g., SDS), on the other hand, can achieve complete cell lysis but at the expense of degraded biomolecules (e.g., degraded nucleic acids). The less aggressive chaotropic agents that are preferably used in conjunction with the present method are unique in their capacity to solubilize biomolecules (e.g., nucleic acids) while minimizing degradation of nucleic acids. Therefore, combining such mild chaotropic agent with the mechanical sample disruption process using non-spherical beads as taught herein such as preferably particles having at least one discontinuity at their surface (e.g. ballcones and satellites) is particularly advantageous and provides an improvement over prior art methods.

The concentration of the at least one chaotropic agent in the liquid lysis composition and/or the lysis mixture (comprising the plant sample) may be 2.5M or less, e.g. 2M or less, 1.75M or less, 1.5M or less, 1.3M or less, 1.2M or less or 1.125M or less. Suitable concentrations of the at least one chaotropic agent in the liquid lysis composition which preferably is a lysis solution and/or the lysis mixture may be in a range from 0.5 to 2.5M, e.g. selected from 0.6M to 2M, 0.7M to 1.75M, 0.75M to 1.5M and preferably 0.8 to 1.25M. If multiple chaotropic agents are present in the liquid lysis composition, which preferably is a lysis solution, the total concentration of chaotropic agents in the liquid lysis composition, respectively lysis solution may be and preferably lies in the above described range. The same applies with respect to the lysis mixture. The one or more disrupting particles are not considered for determining the concentration.

The chaotropic agent is preferably a thiocyanate salt as described above, more preferably NaSCN. The above concentrations were found particularly suitable for such mild thiocyanate salts, such as NaSCN. Particularly preferred is a concentration of NaSCN in the liquid lysis composition and/or in the lysis mixture in the range of 0.7M to 1.75M, 0.75M to 1.5M and preferably 0.8 to 1.25M.

According to one embodiment, the method further comprises adding at least one phosphate. The at least one phosphate is added prior to contacting in step (b) the lysed sample with the at least one inhibitor removing agent. Preferably, the at least one phosphate is added in step (a). Preferably, the at least one phosphate is included in the liquid lysis composition which is, as described, preferably a lysis solution. Therefore, the liquid lysis composition comprises in an advantageous embodiment the at least one chaotropic agent and the at least one phosphate. According to one embodiment, the liquid lysis composition comprises sodium thiocyanate and a phosphate.

Without wishing to be bound by theory, it is believed that the free phosphate group ($PO_4^{3-}$) prevents or reduces complex formation between the subsequently used inhibitor removing agent (e.g., $AlCl_3$) and the phosphodiester groups of nucleic acids by competitively interacting with the inhibitor removing agent.

Exemplary phosphates include phosphate monobasics, phosphate dibasics, and phosphate tribasics, and other compounds that contain one or more free phosphate groups, such as sodium phosphate monobasic, sodium phosphate dibasic, sodium phosphate, potassium phosphate monobasic, potassium phosphate dibasic, potassium phosphate, ammonium phosphate monobasic, ammonium phosphate dibasic, ammonium phosphate, lithium phosphate monobasic, lithium phosphate dibasic, lithium phosphate, trisodium phosphate, sodium poly(vinylphosphonate), sodium hexametaphosphate, pyrophosphate, sodium triphosphate, sodium polyphosphate, other phosphorus-containing oxyanions, and combinations thereof. The cationic moieties in the phosphates include but are not limited to ammonium, sodium, potassium, and lithium. In one embodiment, the cationic moiety is provided by an alkali metal ion, preferably selected from sodium, potassium and lithium, more preferably sodium.

Preferably, the phosphate is a phosphate dibasic and more preferably is sodium phosphate dibasic.

The concentration of the at least one phosphate in the liquid lysis composition, the lysis mixture (comprising the plant sample) and/or the lysed sample may be selected from 0.05 to 0.75M, e.g. 0.06M to 0.6M, 0.075M to 0.5M, 0.1M to 0.3M and 0.1M to 0.25M or may be 0.125M to 0.2M. As disclosed herein, it is preferred to comprise the at least one phosphate in the liquid lysis composition. The concentration of the at least one phosphate in the liquid lysis composition, which preferably is a lysis solution, is preferably in the range of 0.1M to 0.3M or 0.1M to 0.2M.

According to one embodiment, the liquid lysis composition comprises sodium thiocyanate and at least one phosphate, preferably sodium phosphate dibasic.

According to one embodiment, the liquid lysis composition and/or the liquid lysis mixture comprises sodium thiocyanate in a concentration selected from 0.7M to 1.75M, 0.75M to 1.5M and preferably 0.8 to 1.25M and the at least one phosphate, preferably sodium phosphate dibasic, in a concentration selected from 0.075M to 0.3M, 0.1 to 0.25M and 0.1M to 0.2M. Preferably, the concentration of the at least one phosphate, preferably sodium phosphate dibasic, is in the range of 0.1M to 0.3M.

According to one embodiment, the liquid lysis composition and/or the liquid lysis mixture comprises sodium thiocyanate in a concentration of 0.7M to 1.75M and the at least one phosphate, preferably sodium phosphate dibasic, in a concentration of 0.075M to 0.3M. According to one embodiment, the liquid lysis composition and/or the liquid lysis mixture comprises sodium thiocyanate in a concentration of 0.75M to 1.5M and the at least one phosphate, preferably sodium phosphate dibasic, in a concentration of 0.1 to 0.3M.

According to one embodiment, the liquid lysis composition and/or the liquid lysis mixture comprises sodium thiocyanate in a concentration of 0.8 to 1.25M and the at least one phosphate, preferably sodium phosphate dibasic, in a concentration of 0.1 to 0.25M.

The liquid lysis composition can be prepared by combining a lysis reagent, preferably a lysis solution, comprising the at least one chaotropic agent with the one or more disrupting particles. The lysis reagent preferably also comprises at least one phosphate as described above. The lysis reagent can be combined with the at least one disrupting particle before the plant sample is added. However, the plant sample may also be contacted with the lysis reagent before adding the one or more, preferably one, disrupting particle.

The lysis reagent, which preferably is a lysis solution, may comprise
  (i) one or more chaotropic agents selected from sodium thiocyanate, sodium carbonate, ammonium thiocyanate, potassium thiocyanate, lithium thiocyanate, lithium perchlorate, guanidine sulfate, and combinations thereof, and
  (ii) one or more phosphates.

Details of the chaotropic agent and the at least one phosphate have been described above and it is referred to the respective disclosure. The concentrations described above for the liquid lysis composition also apply to the lysis reagent, which preferably is a lysis solution. Hence, according to one embodiment, the concentration of the at least one chaotropic agent in the lysis reagent may be 2.5M or less, such as 2M or less, 1.75M or less, 1.5M or less, 1.3M or less, 1.2M or less or 1.125M or less. Suitable concentrations of the at least one chaotropic agent in the lysis reagent may be in the range selected from 0.5 to 2.5M, e.g. 0.6M to 2M, 0.7M to 1.75M, 0.75M to 1.5M and preferably 0.8 to 1.25M. If multiple chaotropic agents are present in the lysis reagent, the total concentration of chaotropic agents in the lysis reagent may be and preferably lies in the above described range. The chaotropic agent is preferably a thiocyanate salt as described above, more preferably NaSCN. Particularly preferred is a concentration of NaSCN in the lysis reagent in the range of 0.7M to 1.75M, 0.75M to 1.5M and preferably 0.8 to 1.25M. The concentration of the at least one phosphate in the lysis reagent may be selected from 0.05 to 0.75M, 0.06M to 0.6M, 0.075M to 0.5M, 0.1M to 0.3M and 0.1M to 0.25M. According to one embodiment, the lysis reagent comprises sodium thiocyanate in a concentration selected from 0.7M to 1.75M, 0.75M to 1.5M and preferably 0.8 to 1.25M and the at least one phosphate, preferably sodium phosphate dibasic, in a concentration selected from 0.075M to 0.3M, 0.1 to 0.25M and 0.1M to 0.2M, or. 0.125M to 0.2M. Preferably, the concentration of the at least one phosphate, preferably sodium phosphate dibasic, is in the range of 0.1M to 0.3M.

Preferably, the lysis reagent comprises sodium phosphate dibasic and sodium thiocyanate.

The one or more solid disrupting particles may be comprised in the lysis reagent. As described herein, the lysis reagent may be comprised in a container which additionally comprises the one or more solid disrupting particles. The one or more solid disrupting particles may be contained in, e.g. immersed in the lysis reagent. This embodiment is advantageous, because the plant sample may be added to the liquid lysis composition which comprises the at least one chaotropic agent and the one or more disrupting particles and mechanical disruption can be initiated.

In certain other embodiments, the liquid lysis composition does not include any detergent, such as SDS.

A liquid lysis composition, which may be a lysis solution may optionally further contain one or more buffer substances.

The pH of the liquid lysis composition may be at least 3, e.g. at least 4 or at least 5. E.g., the pH of the liquid lysis composition may be in the range of pH 3 to pH 10, such as pH 4 to pH 9 and pH 5 to 8.0.

The pH of the liquid lysis composition may be in the range of pH 4 to pH 10, e.g. pH 5 to pH 9 and pH 6 to 8.0.

The liquid lysis composition, which preferably is a lysis solution, may comprise, consist essentially of, or consist of one or more chaotropic agents and one or more phosphates, both as described above may be an aqueous solution. For mechanical disruption, one or more solid disrupting particles as described are included in the liquid lysis composition, which may be a lysis solution. Preferably, the one or more relatively mild chaotropic agents comprise or is NaSCN. The one or more phosphates preferably comprise or are sodium phosphate dibasic. An exemplary preferred lysis solution comprises, consists essentially of, or consists of 0.5 to 2M NaSCN and 0.1 to 0.2M $Na_2HPO_4$.

Clearing the Lysate

As discussed herein, disrupting the plant sample in (i) provides a lysed mixture which comprises solid components from the plant sample and a liquid fraction which comprises released nucleic acids. As disclosed herein, the mechanical disruption which is supported by the used lysis chemistry advantageously allows to efficiently homogenizing different types of plant samples. It is preferred to separate the solid components from the liquid fraction and to further process the liquid fraction as lysed sample.

Therefore, preferably, step (a) comprises (ii) clearing the lysate. This clearing step may comprise separating the lysed mixture that is obtained upon disrupting the plant sample into a solid fraction and a liquid fraction. The liquid fraction comprises the nucleic acids (and may still comprise some plant particles) and the liquid fraction is further processed in step (b) as lysed sample. The solid components may be discarded. Separation of the liquid fraction may be assisted by sedimentation, centrifugation, or filtration, preferably by centrifugation. Also combinations of such methods can be used. The separated liquid fraction (e.g. supernatant) is then further processed as lysed sample in (b).

Step (b) Contacting the Lysed Sample with at Least One Protein Precipitating Agent and at Least One Inhibitor Removing Agent and Providing a Mixture In step (b), the lysed sample is contacted with at least one protein precipitating agent and at least one inhibitor removing agent and a mixture is provided. Step (b) may comprise agitating the mixture, e.g. by vortexing.

Protein Precipitating Agent

According to one embodiment, the at least one protein precipitating agent is selected from ammonium acetate, ammonium sulfate, potassium acetate, sodium acetate, sodium chloride and cesium acetate.

Some of the precipitating agents (e.g., ammonium acetate) may function as a protein precipitating agent at a relatively high concentration (e.g., at 1 to 2 M in the mixture comprising the lysed sample, the precipitating agent, and one or more inhibitor removing agents as described below) but as a molecular screen at a relatively low concentration (e.g., at a concentration 5 to 15 times less than the concentration when functioning as a protein precipitation agent). The use of ammonium acetate is preferred.

According to one embodiment, the concentration of the at least one precipitating agent in the mixture is in a range of 0.1 to 4M. It may be selected from 0.1 to 4M, 0.2M to 3M, 0.3M to 2.5M, 0.4M to 2.25M, 0.5M to 2M and 0.6M to 1.75M. According to one embodiment, ammonium acetate is used in such concentration range, preferably is present in the mixture of step (b) in a concentration that lies in the range of 0.5M to 2M or 0.6M to 1.75M.

Inhibitor Removing Agent

Exemplary inhibitor removing agents include aluminum ammonium sulfate, aluminum ammonium sulfate dodecahydrate, ammonium sulfate, aluminum potassium sulfate, aluminum chlorohydrate, calcium oxide, iron (III) chloride, iron (II) sulfate, sodium aluminate, sodium silicate, magnesium chloride, aluminum chloride, aluminum sulfate, erbium (III) acetate, erbium (III) chloride, holmium chloride, zirconium (IV) chloride, hafnium (IV) chloride, and combinations thereof.

According to one embodiment, the inhibitor removing agent comprises a trivalent cation. Preferably, the inhibitor removing agents include aluminum chloride, aluminum sulfate, erbium (III) acetate, erbium (III) chloride, holmium chloride, zirconium (IV) chloride, hafnium (IV) chloride, and combinations thereof.

Thus, according to one embodiment, the at least one inhibitor removing agent is selected from aluminum chloride, erbium (III) acetate, erbium (III) chloride, holmium chloride, hafnium (IV) chloride, zirconium (IV) chloride, guanidine sulfate, and combinations thereof and wherein preferably, the inhibitor removing agent is aluminum chloride. The use of a trivalent aluminum salt such as aluminum chloride is particularly preferred.

As discussed herein, preferably, the at least one phosphate is present in step (b). It serves the purpose to prevent the precipitation of nucleic acids such as in particular DNA from the mixture to prevent a loss of nucleic acid material. The use of aluminum chloride is advantageous because it can be used over a broad pH range.

The pH during step (b) may be at least 3, at least 4 or at least 5. E.g., the pH during step (b) may be in the range of pH 3 to pH 10, pH 4 to pH 9 and pH 5 to 8.0.

According to one embodiment, the pH during step (b) is in the range of 4-10, e.g. 5 to 9 or 6 to 8.

According to one embodiment, the concentration of the at least one inhibitor removing agent in the mixture of step (b) is in a range of 1 to 150 mM. It may be selected from 1 to 150 mM, 5 mM to 125 mM, 10 mM to 100 mM, 15 mM to 75 mM and 20 mM to 65 mM. As discussed above, the use of a trivalent aluminum salt such as aluminum chloride is particularly preferred and it is in one embodiment used in such concentration. Particularly preferred is a concentration of aluminium chloride that is selected 15 mM to 75 mM, e.g. 20 mM to 65 mM or 25 mM to 55 mM.

The lysed sample comprises a contaminant or inhibitor that forms a complex with the one or more inhibitor removing agents, and the complex is precipitated and removed by the one or more inhibitor removing agents. As described herein, plant samples often comprise a large amount of inhibitors, including e.g. polysaccharides and polyphenolic compounds. Such inhibitors remain present in the lysed sample. The present method allows to efficiently remove inhibitors, thereby allowing to isolate high quality nucleic acids, such as DNA.

According to one embodiment, the precipitating agent is ammonium acetate, and the inhibitor removing agent is aluminum chloride.

The protein precipitation step and the inhibitor removing step can be performed sequentially. However, preferably, they are performed simultaneously.

According to one embodiment, which is preferred, the lysed sample is contacted in step (b) with a composition comprising the at least one precipitating agent and the at least one inhibitor removing agent. As disclosed, the lysed sample is preferred a cleared lysate that is obtained after performing step (a) (ii).

The one or more precipitating agents and the one or more inhibitor removing agents may be added in form a composition either in solid form or as a solution, preferably as a solution. Preferably, the composition is an aqueous solution. It can be added to the lysed sample.

According to one embodiment, the composition comprises, consists essentially of, or consists of
(i) one or more precipitating agents selected from ammonium acetate, ammonium sulfate, potassium acetate, sodium acetate, sodium chloride, cesium acetate, and combinations thereof,
(ii) one or more inhibitor removing agents selected from aluminum chloride, erbium (III) acetate, erbium (III) chloride, holmium chloride, hafnium (IV) chloride, zirconium (IV) chloride, and combinations thereof, and
(iii) optionally water.

In the embodiments where the composition is a solution the total concentration of the one or more precipitating agents in the solution that is added in step (b) is in the range of 0.5 M to 10M, e.g. 1 to 8M, or 1.5 to 7.5M, preferably 1M to 6M, 1.5M to 5.5M, 2M to 5M, 2.5 to 4.5M and 3M to 4M. This is particularly suitable when the precipitating agent functions as a protein precipitating agent. The precipitating agent can be ammonium acetate and the described concentrations are particularly suitable when using ammonium acetate. The composition can be added to the lysed sample.

In the embodiments where the composition is a solution the total concentration of the one or more inhibitor removing agents in the solution that is added in step (b) is in the range of 10 to 500 mM, e.g. 25 mM to 400 mM, 50 mM to 350 mM, 75 mM to 300 mM, 90 mM to 250 mM, preferably 50 mM or 100 mM to 200 mM, such as 50 mM to 175 mM or 75 mM to 150 mM. As discussed above, the use of a trivalent aluminum salt such as aluminum chloride is particularly preferred as inhibitor removing agent and it is in one embodiment comprised in such concentration in the solution. According to one embodiment, the solution that is added in step (b) comprises aluminum chloride in a concentration of 50 mM to 250 mM. Particularly preferred concentrations of aluminum chloride include 50 mM to 200 mM, 50 mM to 175 mM and 75 mM to 150 mM.

Exemplary preferred solutions that comprise a precipitating agent and an inhibitor removal agent include:
(1) a solution containing 1 to 8M (preferably 2.5 to 5M) ammonium acetate and 20 to 200 mM aluminum chloride;
(2) a solution containing 1 to 10M (preferably 1 to 8M) sodium acetate and 20 to 200 mM aluminum chloride;
(3) a solution containing 1 to 8M (preferably 1 to 5M) cesium acetate and 20 to 200 mM aluminum chloride;

(4) a solution containing 1 to 8M (preferably 2.5 to 5M) ammonium acetate and 20 to 200 mM erbium (III) acetate;
(5) a solution containing 1 to 10M (preferably 1 to 8M) sodium acetate and 20 to 200 mM erbium (III) acetate;
(6) a solution containing 1 to 8M (preferably 1 to 5M) cesium acetate and 20 to 200 mM erbium (III) acetate;
(7) a solution containing 1 to 8M (preferably 2.5 to 5M) ammonium acetate and 20 to 200 mM erbium (III) chloride;
(8) a solution containing 1 to 10M (preferably 1 to 8M) sodium acetate and 20 to 200 mM erbium (III) chloride;
(9) a solution containing 1 to 8M (preferably 1 to 5M) cesium acetate and 20 to 200 mM erbium (III) chloride;
(10) a solution containing 1 to 8M (preferably 2.5 to 5M) ammonium acetate and 20 to 200 mM holmium chloride;
(11) a solution containing 1 to 10M (preferably 1 to 8M) sodium acetate and 20 to 200 mM holmium chloride; and
(12) a solution containing 1 to 8M (preferably 1 to 5M) cesium acetate and 20 to 200 mM holmium chloride.

According to one embodiment, the precipitating agent in the composition that is added to the lysed sample in step (b) is selected from ammonium acetate, sodium acetate, cesium acetate, or a combination thereof, preferably ammonium acetate and the inhibitor removing agent is aluminum chloride.

According to one embodiment, no precipitation, centrifugation or filtration has been performed between contacting the lysed sample with the at least one precipitating agent and contacting the lysed sample with the at least one inhibitor removing agents. As disclosed herein, it is preferred to add the precipitating agent and the inhibitor removal agent at the same time, e.g. by adding a liquid composition that comprises the at least one precipitating agent and the at least one inhibitor removing agent.

As used herein, the term "inhibitor" in particular refers to any substance that interferes with a reaction involving DNA and/or RNA isolated from a sample, and has a detrimental effect on DNA and/or RNA manipulation. Inhibitors include, for example, inhibitors of an enzymatic reaction that uses DNA or RNA as a substrate and a contaminant that disrupts hybridization of DNA or RNA. Inhibitors may include humic substances. They comprise polycyclic aromatics to which saccharides, peptides, and phenols are attached. Additional exemplary inhibitors include decomposing plant materials, organic compounds from compost, phenolics, phenolic polymers or oligomers, polyphenol, polysaccharides, and tannin. Examples of polysaccharide inhibitors include but are not limited to pectin and xylan. As discussed above, the present method improves sample lysis thereby advantageously increasing the release of nucleic acids, such as in particular DNA, into the lysate. This improved lysis may furthermore release more inhibitors into the lysate and hence the DNA containing supernatant that can be obtained from the lysate as described herein. Therefore, it is advantageous and important to efficiently remove inhibitors in order to provide high quality nucleic acids.

The inhibitor removing agent is capable of substantially removing one or more inhibitors from the lysed sample. After performing steps (b) and (c), an inhibitor is substantially removed. E.g. 20% or less, preferably 18% or less, 15% or less, 13% or less, or 10% or less, more preferably 5% or less, 3% or less, 2% or less, or 1% or less of the inhibitor from the sample remains in the liquid phase after separating the mixture into a solid phase and a liquid phase in step (c).

Step (c) Obtaining a Liquid Phase from the Mixture

During or subsequent to step (b), solid components are generated, e.g. by precipitation and complexing processes. Step (c) therefore comprises obtaining a liquid phase from the mixture of step (b). This can be assisted again by sedimentation, filtration or preferably centrifugation. Also a combination of according techniques can be used.

According to one embodiment, step (c) accordingly comprises removing solid components comprised in the mixture provided in step (b) to obtain a liquid phase that comprises the nucleic acids. The liquid phase can be provided, respectively obtained in form of a supernatant.

The mixture of step (b) is centrifuged, filtrated, precipitated, or otherwise treated in step (c) to separate its solid phase from its liquid phase wherein the one or more inhibitor removing agents are primarily (more than 50%) in the solid phase. The solid phase may be provided in form of a pellet. The one or more inhibitor removing agents form complexes with inhibitors and other contaminating materials from the sample, which complexes are precipitated out or otherwise removed from the liquid phase in step (c).

In certain embodiments, more than 60%, 70%, or 80%, preferably more than 90%, or more preferably more than 95% of the one or more inhibitor removing agents are removed from the liquid phase in step (c).

The liquid phase obtained in step (c) is subsequently used for isolating nucleic acids therefrom in step (d).

Step (d) Isolating Nucleic Acids from the Liquid Phase

The term "nucleic acids" as used herein include single- or double-stranded nucleic acids and can be selected from DNA and RNA. Any methods suitable for isolating DNA, RNA, or both from a solution may be used. Suitable methods are well known to the skilled person and therefore, do not need to be described in detail. Preferably, the nucleic acid isolated in step (d) is DNA.

As discussed herein, the improved lysis and inhibitor removal provided by the present invention provides a liquid phase that comprises large amounts of nucleic acids (due to the improved lysis) and which is advantageously depleted from inhibitors (due to the use of the precipitating agent and inhibitor removing agent). Therefore, nucleic acids such as DNA can be isolated with high yield and purity from the provided liquid phase. Essentially any nucleic acid isolation method can be used in order to isolate the nucleic acids, preferably DNA, from the provided liquid phase.

Preferably, a nucleic acid-binding solid support is used in nucleic acid isolation. Exemplary solid support includes silica matrices, glass particles, diatomaceous earth, magnetic beads, nitrocellulose, nylon, and anion-exchange materials. The solid support may be in the form of loose particles, filters, membranes, fibers or fabrics, or lattices, and contained in a vessel, including tubes, columns, and preferably a spin column.

To facilitate or strengthen binding of nucleic acids to a solid support, a binding solution may be used. The binding solution may be added during sample lysis (e.g., after mechanical disruption of the sample in the presence of a lytic reagent) before contacting the sample material with a protein precipitating agent and an inhibitor removing agent during the inhibitor removal process. Alternatively, the binding solution may be added to the liquid phase obtained after the inhibitor removal process.

Exemplary DNA binding solution may comprise a chaotropic agent (e.g., GuSCN or GuHCl), an alcohol (e.g., ethanol or isopropanol), or both. It may further comprise a buffer substance, such as Tris HCl.

In the embodiments where both DNA and RNA are isolated from a sample, DNA isolation and RNA isolation may be performed in parallel. In other words, the liquid phase of step (b) is divided into at least two portions: one for DNA isolation, and one for RNA isolation. DNA and RNA may also be isolated sequentially. When aiming at isolating RNA, an RNase inhibitor may be used in step (a) to protect the released RNA.

Methods for sequentially isolating DNA and RNA are known (see e.g., U.S. Pat. No. 8,889,393, WO 2004/108925). Preferably, a solid support for binding DNA and a solid support for binding RNA are used. The solid support for binding DNA may be identical to or different from the solid support for binding RNA. When an identical solid support is used for DNA and RNA isolation, differential binding of DNA and RNA to the solid support may be achieved by adjusting the component(s) and/or their concentration(s) of binding mixtures. For example, a silica spin column may be used to bind DNA first while the flow through may be mixed with ethanol, and the resulting mixture is applied to a second silica spin column to bind RNA (Triant and Whitehead, Journal of Heredity 100:246-50, 2009).

After binding to a solid phase, DNA or RNA bound to the solid phase may be washed, and subsequently eluted from the solid phase. DNA wash solution may comprise a chaotropic agent (e.g., GuHCl), an alcohol (e.g., ethanol, isopropanol), or both. It may further comprise a buffer substance (e.g., Tris HCl), a chelating agent (e.g., EDTA (ethylenediaminetetraacetic acid)), and/or a salt (e.g., NaCl). DNA elution solution may be a buffer (e.g., a Tris buffer) or water.

RNA binding solution may comprise alcohol (e.g., ethanol, isopropanol) and optionally another organic solvent (e.g., acetone). RNA wash solution may comprise one or more of the following: a buffer substance (e.g., Tris HCl and Tris base), a chelating agent (e.g., EDTA), an alcohol, and a salt (e.g., NaCl). RNA may be eluted from a solid support using DEPC-treated or other RNase-free water.

According to one embodiment, at least DNA is isolated. According to one embodiment, DNA is isolated while depleting RNA during the performance of the method. Furthermore, RNA may be destroyed by using RNase.

The method may further comprise
 (e) analyzing the nucleic acids isolated in step (d), wherein optionally step (e) comprises PCR, qPCR, RT-PCR, or nucleic acid sequencing.

Plant Samples

The present method is particularly suitable for isolating nucleic acids such as DNA from various plant sample types. Advantageously, the present method can be used for different types of plant samples while ensuring good results with respect to yield and purity. The term "plant" in particular refers to whole plants, plant organs, plant tissues, roots, seeds, plant cells, and progeny of the same. Plant samples include, without limitation, seeds, embryos, meristematic regions, callus tissue, leafs, roots, shoots, gametophytes, sporophytes, pollen and microspores. Plant parts include differentiated and undifferentiated tissues including, but not limited to roots, stems, shoots, leaves, pollens, seeds, tumor tissue and various forms of cells, as well as fruit and flowers.

As mentioned above, the term "plant" refers also to a part of a plant like leaf (blade (base, midrib, veins, margin, apex) and petiole (leafstalk) stipule), stem, root (primary root, lateral root, root hairs, root tip, root cap) needle, flowers (sepal, filament, anther, pollen, petal, stigma, style, ovary, ovule) fruits, buds (axillary bud, apical bud/terminal bud) nodes, internodes. For example leafs include any types of leafs like A) simple, pinnately veined leaves (Oak, Birch); B) Simple, palmately veined leafs (Sweet gum); C) Pinnately compound veined (Walnut); D) Palmately compound leaf (Buckeye); E) Parallel veins (Grass); F) Opposite leaves (Maple) G) Alternating leafs (Elm) H) Needle leafs: Spruces (4 sided needles—Sitka spruce), Pines (2, 3 or 5 needle bundles—*Ponderosa pine*), Firs (flat needles—Hemlock), Scale leaves (*Sequoia* redwood).

According to one embodiment, the plant sample from which nucleic acids are isolated is selected from leaf, needle, root, stem and seed. Furthermore, the plant sample may be selected from fruit and flower. According to one embodiment, the plant sample is obtained from a plant selected from agricultural crop, such as wheat, rice, apple, coffee, tobacco, corn, sunflower, grass and so on. A further common plant sample is cotton.

Exemplary common samples from which nucleic acids such as in particular DNA can be isolated include but are not limited to leaf tissues, such as soft or fibrous leaf tissues, e.g. grape leaf, strawberry leaf, cotton leaf, grass leaf, rice leaf and/or mint leaf, stems, such as e.g. tomato stem, needles, such as pine needle and seeds.

If the plant sample comprises a large amount of phenolic compounds, it is within the scope of the method to add a further compound in step (a) that removes phenolic compounds. A suitable example is PVP. This can be advantageous for samples such as pine needle or strawberry leaf.

Particularly Preferred Embodiments

Suitable and preferred embodiments of the method of the present invention, individual steps (a) to (d) and the used components and reagents were described in detail above and as will be appreciated by the skilled person, the disclosure with respect to the individual steps and components and reagents used in said method can be combined with each other. The subject-matter resulting from a respective combination of individual features also belongs to the present disclosure. Non-limiting, particularly preferred embodiments of the present invention will be emphasized in the following.

A method for isolating nucleic acids from a plant sample comprising
 (a) preparing a lysed sample wherein preparing comprises
  (i) lysing a plant sample by mechanically disrupting the plant sample in a liquid lysis composition which comprises at least one chaotropic agent and one or more solid disrupting particles, wherein at least one non-spherical disrupting particle is used which has the following characteristics:
   it has a surface containing a first part and a second part, whereby the first part and the second part meet by forming an edge, wherein preferably the first part is the surface of a frustum of a cone and the second part is the surface of a frustum of a cone, wherein more preferably, both cones are set against each other with their larger base, the edge being formed where the larger bases meet, the larger bases optionally but preferably being of the same diameter;
   it has a weight of at least 300 mg, preferably at least 400 mg;
   it has a size of at least 1.5 mm, preferably at least 2 mm;
  (ii) optionally clearing the lysate;
 (b) contacting the lysed sample with at least one protein precipitating agent and at least one inhibitor removing agent and providing a mixture;
 (c) obtaining a liquid phase from the mixture; and (d) isolating nucleic acids from the liquid phase, wherein preferably, the method further comprises adding at least one phosphate prior to contacting in step (b) the lysed sample with the at least one inhibitor removing agent.

A method for isolating nucleic acids from a plant sample comprising
(a) preparing a lysed sample wherein preparing comprises
(i) lysing a plant sample by mechanically disrupting the plant sample in a liquid lysis composition which comprises at least one chaotropic agent and one or more solid disrupting particles, wherein at least one non-spherical disrupting particle is used which has the following characteristics:
it has a surface containing a first part and a second part, whereby the first part and the second part meet by forming an edge, wherein the first part is the surface of a frustum of a cone and the second part is the surface of a frustum of a cone, wherein both cones are set against each other with their larger base, the edge being formed where the larger bases meet, the larger bases being of the same diameter;
it has a weight in the range of 500 mg to 1000 mg, optionally 600 mg to 900 mg; and
it has a size of 3 mm to 10 mm, optionally 3 mm to 7 mm or 4 mm to 7 mm;
(ii) optionally clearing the lysate;
(b) contacting the lysed sample with at least one protein precipitating agent and at least one inhibitor removing agent and providing a mixture;
(c) obtaining a liquid phase from the mixture; and
(d) isolating nucleic acids from the liquid phase, wherein preferably, the method further comprises adding at least one phosphate prior to contacting in step (b) the lysed sample with the at least one inhibitor removing agent.

A method for isolating nucleic acids from a plant sample comprising
(a) preparing a lysed sample wherein preparing comprises
(i) lysing a plant sample by mechanically disrupting the plant sample in a liquid lysis composition which comprises at least one chaotropic agent and one or more solid disrupting particles, wherein at least one non-spherical disrupting particle is used which has the following characteristics:
it has a surface containing a first part and a second part, whereby the first part and the second part meet by forming an edge, wherein the first part is the surface of a frustum of a cone and the second part is the surface of a frustum of a cone, wherein both cones are set against each other with their larger base, the edge being formed where the larger bases meet, the larger bases being of the same diameter and wherein the at least one non-spherical particle is selected from the following group of particles that are characterized in that:
(aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein preferably, the subportion that is made up of a section or a part of a ball or an ellipse is a semi-sphere,
(bb) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part,
(cc) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part, and/or
(dd) the particle comprises two semi-spheres wherein the first semi-sphere is set against the smaller base of the frustum of the cone of the first part and the second semi-sphere is set against the smaller base of the frustum of the cone of the second part;
it has a weight of at least 300 mg, preferably at least 400 mg, more preferably at least 500 mg;
it has a size of at least 1.5 mm, preferably at least 2 mm, more preferably at least 3 mm;
(ii) optionally clearing the lysate;
(b) contacting the lysed sample with at least one protein precipitating agent and at least one inhibitor removing agent and providing a mixture;
(c) obtaining a liquid phase from the mixture; and
(d) isolating nucleic acids from the liquid phase, wherein preferably, the method further comprises adding at least one phosphate prior to contacting in step (b) the lysed sample with the at least one inhibitor removing agent.

Suitable and preferred embodiments of such non-spherical disrupting particles are described herein regarding their shape, size and weight and it is referred to the respective disclosure. Suitable and preferred materials are also described herein and it is referred to the respective disclosure. Preferably, the at least one non-spherical disrupting particle is made of an inert metal or metal allow, preferably steel. Furthermore, preferred conditions for step (a) and (b) are described herein and it is referred to the respective disclosure.

A method for isolating nucleic acids from a plant sample comprising
(a) preparing a lysed sample wherein preparing comprises
(i) lysing a plant sample by mechanically disrupting the plant sample in a liquid lysis composition which comprises at least one chaotropic agent in a concentration of 1.5M or less, wherein preferably the chaotropic agent is selected from sodium thiocyanate, potassium thiocyanate, ammonium thiocyanate, lithium thiocyanate and wherein more preferably the chaotropic agent is sodium thiocyanate, and one or more solid disrupting particles,
(ii) optionally clearing the lysate;
(b) contacting the lysed sample with
at least one protein precipitating agent, preferably selected from ammonium acetate, ammonium sulfate, potassium acetate, sodium acetate, sodium chloride and cesium acetate and wherein more preferably the protein precipitating agent is ammonium acetate and
at least one inhibitor removing agent, preferably selected from aluminum chloride, erbium (III) acetate, erbium (III) chloride, holmium chloride, hafnium (IV) chloride, zirconium (IV) chloride, guanidine sulfate, and combinations thereof and wherein more preferably, the inhibitor removing agent is a trivalent aluminum salt such as most preferably aluminum chloride
and providing a mixture;
(c) obtaining a liquid phase from the mixture; and
(d) isolating nucleic acids from the liquid phase, wherein preferably, the method further comprises adding at least one phosphate prior to contacting in step (b) the lysed sample with the at least one inhibitor removing agent.

A method for isolating nucleic acids from a plant sample comprising
(a) preparing a lysed sample wherein preparing comprises
(i) lysing a plant sample by mechanically disrupting the plant sample in a liquid lysis composition which comprises
at least one chaotropic agent in a concentration of 1.5M or less, wherein preferably the chaotropic agent is selected from sodium thiocyanate, potassium thiocyanate, ammonium thiocyanate, lithium thiocyanate and wherein more preferably the chaotropic agent is sodium thiocyanate and
one or more solid disrupting particles, wherein at least one non-spherical disrupting particle is used which has the following characteristics:
it has a surface containing a first part and a second part, whereby the first part and the second part meet by forming an edge, wherein the first part is the surface of a frustum of a cone and the second part is the surface of a frustum of a cone, wherein both cones are set against each other with their larger base, the edge being formed where the larger bases meet, the larger bases being of the same diameter and wherein the at least one non-spherical particle is selected from the following group of particles that are characterized in that:
(aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein preferably, the subportion that is made up of a section or a part of a ball or an ellipse is a semi-sphere,
(bb) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part,
(cc) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part, and/or
(dd) the particle comprises two semi-spheres wherein the first semi-sphere is set against the smaller base of the frustum of the cone of the first part and the second semi-sphere is set against the smaller base of the frustum of the cone of the second part;
it has a weight of at least 300 mg, preferably at least 400 mg, more preferably at least 500 mg;
it has a size of at least 1.5 mm, preferably at least 2 mm, more preferably at least 3 mm;
(ii) optionally clearing the lysate;
(b) contacting the lysed sample with
at least one protein precipitating agent, preferably selected from ammonium acetate, ammonium sulfate, potassium acetate, sodium acetate, sodium chloride and cesium acetate and wherein more preferably the protein precipitating agent is ammonium acetate and
at least one inhibitor removing agent, preferably selected from aluminum chloride, erbium (III) acetate, erbium (III) chloride, holmium chloride, hafnium (IV) chloride, zirconium (IV) chloride, guanidine sulfate, and combinations thereof and wherein more preferably, the inhibitor removing agent is a trivalent aluminum salt such as most preferably aluminum chloride and providing a mixture
(c) obtaining a liquid phase from the mixture; and
(d) isolating nucleic acids from the liquid phase,
wherein preferably, the method further comprises adding at least one phosphate prior to contacting in step (b) the lysed sample with the at least one inhibitor removing agent.

Suitable and preferred embodiments for the disrupting particles and preferred conditions for the individual steps are described herein and it is referred to the respective disclosure which also applies with respect to the particularly preferred embodiments.

As will be appreciated from the present disclosure, the method does not require the use of phenol and/or CTAB. Therefore, in embodiments, the method does not involve the use of phenol and/or CTAB. In embodiments, no detergent is added to assist the lysis. In embodiments, the method does not involve the use of proteolytic enzymes such proteinase K to assist the lysis.

Embodiment for Isolating Nucleic Acids Including Microbial Nucleic Acids from a Plant Sample According to one embodiment, two types of solid disrupting particles are used, wherein (i) the first type comprises one or more disrupting particles having a size of at least 1.5 mm and (ii) the second type comprises a plurality of disrupting particles having a size of 1 mm or less. This embodiment is particularly useful for isolating plant DNA that comprises microbial nucleic acids as demonstrated in the examples. The use of the combination of types of particles allows to efficiently release microbial nucleic acids such as bacterial DNA from microorganisms comprised in plant samples. Such microorganisms may be selected from bacteria and fungi, such as gram-positive bacteria, gram-negative bacteria, fungus, mold and spores, or a combination of the foregoing. Of particular interest are bacteria. Microorganisms comprised in plant samples may be present on, around or within the plant sample, and optionally are comprised in root samples, on leaf surfaces and/or lesions or tumors in the plant tissue.

The first type and the second type of solid disrupting particles that are used in combination to efficiently disrupt the plant sample and microorganisms preferably differ from each other not only is size but also in shape and/or material. Preferably, the one or more disrupting particle used as first type is not spherical and has at least one discontinuity, preferably an edge, and the plurality of particles used as second type are substantially spherical.

The at least one disrupting particle that is used as first type is non-spherical and preferably has an irregular shape. Suitable examples of disrupting particles that can be used as first type were described in detail above and it is referred to the above disclosure. The use of one or more ballcones, such as a single ballcone, is particularly preferred.

The second type of solid disrupting particles that is used in combination with the first type is provided by a plurality of disrupting particles having a size of 1 mm or less. The particles of the second type are therefore smaller than the particles of the first type. In addition, a plurality of such particles is used as second type. The second type of disrupting particles in particular supports the efficient lysis of microorganisms that are comprised in plant sample, such as bacteria and/or fungi that may be present on, around or within the plant sample. As is demonstrated and explained further in the examples, the use of the combination of the first and second type of particles provides high nucleic acids yields, wherein furthermore, the amount of microbial nucleic acid comprised in the released (and subsequently isolated) nucleic acid such as DNA is improved.

The particles of the plurality of particles used as second type are substantially spherical. Conventional beads used in the art are usually described as "substantially" spherical because those beads are not necessarily mathematically-perfect spheres, but may include minor imperfections that affect their shape. As discussed herein, the use of the one or more larger non-spherical disrupting particle as first type (described above, such as e.g. a ballcone or similar) in combination with the plurality of smaller substantially spherical disrupting particles provides particularly advantageous results with respect to overall DNA yield and yield of microbial nucleic acids, such as bacterial DNA.

According to one embodiment, the plurality of particles that are used as second type are crystalline particles.

According to one embodiment, the plurality of particles used as second type comprise or consist of zirconium, zircon (zirconium silicate), zirconia (zirconium dioxide), yttrium-stabilized zirconium, quartz, aluminum oxide, silicon carbide, ceramic, glasses (e.g. silicon dioxide glass or silica) or a combination of the foregoing. According to one embodiment, the particles of the plurality of particles used as second type are substantially spherical and comprise or consist of zirconium, zircon (zirconium silicate), zirconia (zirconium dioxide) or yttrium-stabilized zirconium. According to one embodiment, the particles of the plurality of particles used as second type are made of the same material.

The particles of the plurality of disrupting particles used as second type are smaller and have a size of 1 mm or less. The defined sizes of the one or more disrupting particles used as second type indicate the longest distance between two opposite points of the respective particle. As the particles of the second type are substantially spherical, this is the diameter.

According to one embodiment, the plurality of particles used as second type have a size that lies in the range selected from 0.05 mm to 0.9 mm, e.g. 0.07 mm to 0.8 mm, 0.08 mm to 0.75 mm and 0.09 mm to 0.7 mm. As discussed, the particles are preferably spherical. Bead sizes indicated by vendors are usually median (average) values. Because spherical beads are usually sorted by sieves according to their size, the bead size may vary between +/−10% of a listed value. As discussed herein, one may use a plurality of particles having at least two different sizes as second type, wherein, however, the particles used as second type have a size of less than 1 mm and preferably all lie in the defined ranges.

According to one embodiment, the plurality of particles used as second type have at least two different sizes, wherein (i) the first particle size lies on average in a range selected from 0.05 mm to 0.25 mm, 0.07 mm to 0.2 mm, 0.08 mm to 0.175 mm and 0.9 mm to 0.15 mm and (ii) the second particle size lies on average in a range selected from 0.3 mm to 0.9 mm, 0.35 mm to 0.8 mm, 0.4 mm to 0.7 mm and 0.45 mm to 0.6 mm. Suitable and preferred embodiments were described above. As discussed, the plurality of particles used as second type may be made of the same material. In one embodiment, zirconia beads of two different sizes are used as second type. According to one embodiment, the particles of the first size are mixed with the particles of the second type in a ratio of 1:2 to 2:1, preferably 1:1.

According to one embodiment, the plurality of particles used as second type are substantially spherical and comprise or consist of zirconium, zircon (zirconium silicate), zirconia (zirconium dioxide) or yttrium-stabilized zirconium and have on average a size that lies in the range of 0.08 mm to 0.7 mm, preferably 0.09 mm to 0.6 mm. Preferably, zirconium beads are used.

According to one embodiment, the particles of the plurality of particles used as second type have a density of at least 2.0 g/cc, at least 2.5 g/cc, at least 3.0 g/cc, at least 3.5 g/cc, at least 4.0 g/cc, at least 4.5 g/cc, at least 5.0 g/cc or at least 5.5 g/cc. They may have a density that lies in a range selected from 2.0 g/cc to 15 g/cc, 2.5 g/cc to 12 g/cc, 3.0 g/cc to 10 g/cc, 3.5 g/cc to 9 g/cc, 4.0 g/cc to 8 g/cc, 4.5 g/cc to 7.5 g/cc and 5 g/cc to 7 g/cc.

Suitable amounts for the plurality of particles used as second type can be determined by the skilled person following the guidance given herein and the examples. According to one embodiment, 5 mg-500 mg of particles of the second type are used per mg of plant material.

According to one embodiment, a combination of the following disrupting particles is used for mechanically disrupting the plant sample:
(i) at least one non-spherical disrupting particle is used as first type which has the following characteristics:
it has a surface containing a first part and a second part, whereby the first part and the second part meet by forming an edge, wherein the first part is the surface of a frustum of a cone and the second part is the surface of a frustum of a cone, wherein both cones are set against each other with their larger base, the edge being formed where the larger bases meet, the larger bases being of the same diameter and wherein the at least one non-spherical particle is selected from the following group of particles that are characterized in that:
(aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein preferably, the subportion that is made up of a section or a part of a ball or an ellipse is a semi-sphere,
(bb) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part, (cc) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part, and/or (dd) the particle comprises two semi-spheres wherein the first semi-sphere is set against the smaller base of the frustum of the cone of the first part and the second semi-sphere is set against the smaller base of the frustum of the cone of the second part;

it has a weight of at least 300 mg, preferably at least 400 mg, more preferably at least 500 mg; and it has a size of at least 1.5 mm, preferably at least 2 mm, more preferably at least 3 mm;

and (ii) the second type is provided by a plurality of substantially spherical zirconia beads, preferably having a size that lies in the range of 0.08 mm to 0.7 mm, more preferably 0.09 mm to 0.6 mm. The at least one non-spherical disrupting particle used as first type is preferably made of steel, stainless steel, tungsten or other heavy metals as discussed above. As disclosed herein, the plurality of particles used as second type may have at least two different sub-sizes that lie within this broader range. Details have been described above.

According to one embodiment, no further type of particles is used in addition to the first and second type of disrupting particles.

The Kit According to the Second Aspect

According to a second aspect, a kit for isolating nucleic acids from a plant sample is provided, said kit comprising (i) at least one chaotropic agent, preferably selected from sodium thiocyanate, sodium carbonate, ammonium thiocyanate, potassium thiocyanate, lithium thiocyanate, lithium perchlorate, guanidine sulfate, and combinations thereof, (ii) at least one phosphate;

(iii) at least one solid disrupting particle;

(iv) at least one precipitating agent, preferably selected from ammonium acetate, ammonium sulfate, potassium acetate, sodium acetate, sodium chloride, cesium acetate, and combinations thereof;

(v) at least one inhibitor removing agent, preferably selected from aluminum chloride, aluminum sulfate, erbium (III) acetate, erbium (III) chloride, holmium chloride, zirconium (IV) chloride, hafnium (IV) chloride, aluminum ammonium sulfate, aluminum ammonium sulfate dodecahydrate, aluminum potassium sulfate, aluminum chlorohydrate, calcium oxide, iron (III) chloride, iron (II) sulfate, sodium aluminate, sodium silicate, magnesium chloride, and combinations thereof.

The individual components of the kit and preferred embodiments have been described in conjunction with the method according to the first aspect and it is referred to the corresponding disclosure which also applies to the kit. Specifically, the disrupting particles may have the characteristics of the disrupting particles described above. The chaotropic agent and the at least one phosphate may have the characteristics as described above. They may be comprises in a lysis composition as has been described above in conjunction with the method according to the first aspect. The at least one solid disrupting particle (iii), which preferably is a ballcone or particle of similar shape (see above), may be comprised in the lysis composition. E.g. the kit may comprise a container, e.g. a vessel or tube, comprising the at least one disrupting particle and the liquid lysis composition which preferably is a lysis solution. Details were described above.

The precipitating agent and the inhibitor removal agent were also described in conjunction with the method according to the first aspect and it is referred to the respective disclosure. They may be comprised in a composition as has been described above.

The kit is further described in the below disclosed items and is also defined in the claims.

The Use According to the Third Aspect

According to a third aspect, the present disclosure relates to the use of a kit according to the second aspect in the method according to the first aspect. It is referred to the above disclosure. Suitable plant samples were also described above and it is referred to the above disclosure.

Further Items

Also disclosed in the context of the present invention are the following items as embodiments:

1. A method for isolating nucleic acids from a plant sample comprising
   (a) preparing a lysed sample wherein preparing comprises
   (i) lysing a plant sample by mechanically disrupting the plant sample in a liquid lysis composition which comprises at least one chaotropic agent and one or more solid disrupting particles,
   (ii) optionally clearing the lysate;
   (b) contacting the lysed sample with at least one protein precipitating agent and at least one inhibitor removing agent and providing a mixture;
   (c) obtaining a liquid phase from the mixture; and
   (d) isolating nucleic acids from the liquid phase.
2. The method according to item 1, wherein the one or more disrupting particles are non-spherical and preferably have an irregular shape.
3. The method according to item 1 or 2, wherein the surface of the one or more disrupting particles has at least one discontinuity, preferably an edge or a peak.
4. The method according to item 3, wherein the surface of the one or more disrupting particles contains a first part and contains a second part, whereby the first part and the second part meet by forming an edge.
5. The method according to item 4, wherein the edge extends along a line, wherein optionally the line is a circle, an arc or a straight line.
6. The method of item 4 or 5, wherein the first part is the surface of a frustum of a cone and the second part is the surface of a frustum of a cone, wherein preferably, both cones are set against each other with their larger base, the edge being formed, where the larger bases meet, the larger basis preferably being of the same diameter.
7. The method according to one or more or items 2 to 6, wherein the one or more disrupting particles have one or more of the following characteristics:
   (i) the disrupting particle has one, in a preferred embodiment only one line of symmetry;
   (ii) the disrupting particle is of rotational symmetry about the line of symmetry;
   (iii) the disrupting particle has a subportion that is made up of a section or a part of a ball or an ellipse;

(iv) the disrupting particle has at least one tip, which preferably is a frustum of a cone;
(v) the disrupting particle has at least two subportions that are made up of a section or a part of a ball or an ellipse;
(vi) the one or more disrupting particles have a shape selected from cones, cylinders, cubes, triangles, rectangles, a ballcone and satellite.

8. The method according to one or more of items 4 to 7, wherein the one or more disrupting particles are selected from the following group of particles that are characterized in that:
(aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein preferably, the subportion that is made up of a section or a part of a ball or an ellipse is a semi-sphere;
(bb) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part;
(cc) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part;
(dd) the particle comprises two semi-spheres wherein the first semi-sphere is set against the smaller base of the frustum of the cone of the first part and the second semi-sphere is set against the smaller base of the frustum of the cone of the second part.

9. The method according to one or more of items 1 to 8, wherein the one or more disrupting particles have one or more of the following characteristics:
(i) the disrupting particle is made of an inert material;
(ii) the disrupting particle is made of a material selected from inert metals, steel, stainless steel, tungsten, heavy metals, metals and alloys e.g. from tantalum or platinum, plastic and ceramic, preferably the disrupting particle is made of metal, preferably steel.

10. The method according to one or more of items 1 to 9, wherein the one or more disrupting particles have one or more of the following characteristics:
(i) the weight of the solid disrupting particle is at least 300 mg, at least 400 mg, at least 500 mg, at least 600 mg or at least 700 mg;
(ii) the weight of the solid disrupting particle lies in the range of 300 mg to 1500 mg, 400 mg to 1250 mg, 500 mg to 1000 mg or 600 mg to 900 mg.

11. The method according to one or more of items 1 to 10, wherein the one or more disrupting particles have one or more of the following characteristics:
(i) the disrupting particle has a size of at least 1 mm, at least 1.5 mm, preferably at least 2 mm, at least 2.5 mm or at least 3 mm;
(ii) the disrupting particle has a size of up to 15 mm, up to 12 mm, up to 10 mm or up to 8 mm;
(iii) the disrupting particle has a size of 1 mm to 15 mm, 1.5 mm to 15 mm, 2 mm to 15 mm, 2.5 mm to 15 mm, 3 mm to 15 mm and 4 mm to 15 mm;
(iv) the disrupting particle has a size of 1 mm to 12 mm, 1.5 mm to 12 mm, 2 mm to 12 mm, 2.5 mm to 12 mm, 3 mm to 12 mm and 4 mm to 12 mm;
(v) the disrupting particle has a size of 1 mm to 10 mm, 1.5 mm to 10 mm, 2 mm to 10 mm, 2.5 mm to 10 mm, 3 mm to 10 mm and 4 mm to 10 mm;
(vi) the disrupting particle has a size of 1 mm to 7 mm, 1.5 mm to 7 mm, 2 mm to 7 mm, 2.5 mm to 7 mm, 3 mm to 7 mm and 4 mm to 7 mm;
(vii) the disrupting particle has a size of 3 mm to 7 mm, 3.5 mm to 7 mm or of 4 mm to 7 mm.

12. The method according to one or more of items 8 to 10, wherein at least one disrupting particle is used in step (a) (i) that (aa) has a weight in the range of 500 mg to 1000 mg, optionally 600 mg to 900 mg and (bb) exhibits a size of 3 mm to 10 mm, optionally 3 mm to 7 mm or 4 mm to 7 mm.

13. The method according to one or more of items 1 to 12, wherein a single solid disrupting particle is used for mechanical disruption.

14. The method according to one or more of items 1 to 13, wherein a mixture of disrupting particles of different sizes is used for mechanical disruption.

15. The method according to one or more of items 1 to 14, wherein the liquid lysis composition is a solution, preferably an aqueous solution.

16. The method according to one or more of items 1 to 15, wherein the chaotropic agent has one or more of the following characteristics:
(i) the chaotropic agent is a chaotropic salt;
(ii) the chaotropic agent is selected from sodium thiocyanate, sodium carbonate, potassium thiocyanate, ammonium thiocyanate, lithium thiocyanate, lithium perchlorate, guanidine sulfate, and combinations thereof to generate a lysate;
(iii) the chaotropic agent is selected from sodium thiocyanate, potassium thiocyanate, ammonium thiocyanate, lithium thiocyanate and combinations thereof.

17. The method according to one or more of items 1 to 16, wherein the chaotropic agent is NaSCN.

18. The method according to one or more of items 1 to 17, having one or more of the following characteristics:
(i) the concentration of the at least one chaotropic agent in the liquid lysis composition and/or the lysis mixture is selected from 2.5M or less, 2M or less, 1.75M or less, 1.5M or less, 1.3M or less, 1.2M or less and 1.125M or less;
(ii) the concentration of the at least one chaotropic agent in the liquid lysis composition and/or the lysis mixture lies in a range selected from 0.5 to 2.5M, 0.6M to 2M, 0.7M to 1.75M, 0.75M to 1.5M and preferably 0.8 to 1.25M;
(iii) the chaotropic agent is NaSCN and the concentration of NaSCN in the liquid lysis composition and/or in the lysis mixture lies in the range of 0.7M to 1.75M, 0.75M to 1.5M or preferably 0.8 to 1.25M;
(iv) the plant sample is homogenized in step (a) (i) to provide a lysate.

19. The method according to one or more of items 1 to 18, wherein the method further comprises adding at least one phosphate.

20. The method according to item 19, wherein the at least one phosphate is added prior to contacting in step (b) the lysed sample with the at least one inhibitor removing agent.

21. The method according to item 19 or 20, wherein the at least one phosphate is added in step (a), and wherein preferably, the at least one phosphate is included in the lysis composition, which preferably is a lysis solution.

22. The method according to one or more of items 19 to 21, wherein the phosphate has one or more of the following characteristics:
(i) it is a phosphate dibasic,
(ii) the cationic moiety in the phosphate is selected from ammonium, sodium, potassium, or lithium,
(iii) it is sodium phosphate dibasic.

23. The method according to one or more of items 19 to 22, wherein the concentration of the at least one phosphate in the liquid lysis composition, the lysis mixture and/or the lysed sample is selected from 0.05 to 0.75M, 0.06M to 0.6M, 0.075M to 0.5M, 0.1M to 0.3M and preferably 0.1 to 0.25M or 0.15M to 0.2M or 0.125M to 0.2M.

24. The method according to one or more of items 19 to 23, wherein the liquid lysis composition comprises sodium thiocyanate and at least one phosphate, preferably sodium phosphate dibasic.

25. The method according to item 24, wherein the liquid lysis composition and/or the liquid lysis mixture comprises sodium thiocyanate in a concentration selected from 0.7M to 1.75M, 0.75M to 1.5M and preferably 0.8 to 1.25M and the at least one phosphate, preferably sodium phosphate dibasic, in a concentration selected from 0.075M to 0.3M, 0.1 to 0.25M and 0.1M to 0.2M.

26. The method according to one or more of items 1 to 25, wherein step (a) comprises performing (ii) clearing the lysate.

27. The method according to item 26, wherein clearing the lysate comprises separating the lysed mixture that is obtained upon disrupting the plant sample into a solid fraction and a liquid fraction.

28. The method according to item 27, wherein in step (b) the liquid fraction of the lysed mixture is processed as lysed sample.

29. The method according to one or more of items 1 to 28, wherein the at least one protein precipitating agent is selected from ammonium acetate, ammonium sulfate, potassium acetate, sodium acetate, sodium chloride and cesium acetate and wherein preferably, ammonium acetate is used.

30. The method according to one or more of items 1 to 29, wherein the concentration of the at least one precipitating agent in the mixture is in a range selected from 0.1 to 4M, 0.2M to 3M, 0.3M to 2.5M, 0.4M to 2.25M, 0.5M to 2M and 0.6M to 1.75M.

31. The method according to one or more of items 1 to 30, wherein the at least one inhibitor removing agent is selected from aluminum chloride, erbium (III) acetate, erbium (III) chloride, holmium chloride, hafnium (IV) chloride, zirconium (IV) chloride, guanidine sulfate, and combinations thereof and wherein preferably, the inhibitor removing agent is aluminum chloride.

32. The method according to one or more of items 1 to 31, wherein the at least one inhibitor removing agent is selected from aluminum ammonium sulfate, aluminum ammonium sulfate dodecahydrate, aluminum potassium sulfate, aluminum chlorohydrate, aluminum sulfate, calcium oxide, iron (III) chloride, iron (II) sulfate, sodium aluminate, sodium silicate, magnesium chloride, and combinations thereof.

33. The method according to one or more of items 1 to 32, wherein the concentration of the at least one inhibitor removing agent in the mixture is in the range selected from 1 to 150 mM, 5 mM to 125 mM, 10 mM to 100 mM, 15 mM to 75 mM and 20 mM to 65 mM.

34. The method according to one or more of items 1 to 33, wherein the precipitating agent is ammonium acetate, and the inhibitor removing agent is a trivalent aluminium salt, preferably aluminum chloride.

35. The method according to one or more of items 1 to 34, wherein in step (b) the lysed sample is contacted with a composition comprising the at least one precipitating agent and the at least one inhibitor removing agent, wherein the composition is preferably a liquid composition, more preferably a liquid solution.

36. The method according to item 35, wherein the composition has one or more of the following characteristics:
(aa) the total concentration of the one or more precipitating agents in the solution that is added in step (b) is in the range of 0.5 M to 10M, 1 to 8M, or 1.5 to 7.5M, preferably 1M to 6M, 1.5M to 5.5M, 2M to 5M, 2.5 to 4.5M and 3M to 4M;
(bb) the total concentration of the one or more inhibitor removing agents in the solution that is added in step (b) is in the range of 10 to 500 mM, 25 mM to 400 mM, 50 mM to 350 mM, 75 mM to 300 mM, 90 mM to 250 mM, preferably 50 mM or 100 mM to 200 m, such as 50 mM to 175 mM or 75 mM to 150 mM;
(cc) it comprises, consists essentially of, or consists of
(i) one or more precipitating agents selected from ammonium acetate, ammonium sulfate, potassium acetate, sodium acetate, sodium chloride, cesium acetate, and combinations thereof,
(ii) one or more inhibitor removal agents selected from aluminum chloride, erbium (III) acetate, erbium (III) chloride, holmium chloride, hafnium (IV) chloride, zirconium (IV) chloride, and combinations thereof, and
(iii) optionally water.

37. The method according to item 35 or 36, wherein the precipitating agent is selected from ammonium acetate, sodium acetate, cesium acetate, or a combination thereof, and the inhibitor removal agent is a trivalent aluminum salt, preferably aluminum chloride.

38. The method according to any one of items 35 or 37, wherein the composition is an aqueous solution.

39. The method according to one or more of items 1 to 38, wherein step (c) comprises removing solid components comprised in the mixture provided in step (b) to obtain a liquid phase that comprises the nucleic acids.

40. The method according to item 39, wherein solid components are comprised in a pellet and the liquid phase is obtained in form of a supernatant.

41. The method according to item 39 or 40, wherein the mixture of step (b) is centrifuged, filtrated, precipitated, or otherwise treated in step (c) to separate its solid phase from its liquid phase wherein preferably, the one or more inhibitor removing agents are primarily in the solid phase.

42. The method of any of items 1 to 41, wherein nucleic acids isolated in step (d) comprise DNA, RNA or both and wherein preferably, the nucleic acid isolated in step (d) is DNA.

43. The method of any of items 1 to 42, further comprising:
(e) analyzing the nucleic acids isolated in step (d), wherein optionally step (e) comprises PCR, qPCR, RT-PCR, or nucleic acid sequencing.
44. The method according to one or more of items 1 to 43, wherein the plant sample from which nucleic acids, preferably DNA, is isolated is selected from leaf, needle, root, stem and seed or is selected from fruit and flowers.
45. The method according to one or more of items 1 to 44, wherein in step (a) (i) at least two types of solid disrupting particles are used, wherein
(i) the first type is provided by one or more disrupting particles having a size of at least 1.5 mm and
(ii) the second type is provided by a plurality of disrupting particles having a size of 1 mm or less.
46. The method according to item 45, wherein the first type has one or more of the characteristics of the disrupting particle as defined in any one of items 2 to 13, preferably as defined in item 8 or items 9 to 12 when being dependent on item 8.
47. The method according to item 45 or 46, wherein the second type has one or more of the following characteristics:
(i) the plurality of particles are crystalline particles;
(ii) the plurality of particles comprise or consist of zirconium, zircon (zirconium silicate), zirconia (zirconium dioxide), yttrium-stabilized zirconium, quartz, aluminum oxide, silicon carbide, ceramic, glasses (e.g. silicon dioxide glass or silica) or a combination of the foregoing;
(iii) the plurality of particles are substantially spherical;
(iv) the plurality of particles have a size that lies in the range selected from 0.05 mm to 0.9 mm, 0.07 mm to 0.8 mm, 0.08 mm to 0.75 mm and 0.09 mm to 0.7 mm;
(v) the plurality of particles are substantially spherical and comprise or consist of zirconium, zircon (zirconium silicate), zirconia (zirconium dioxide) or yttrium-stabilized zirconium having on average a size that lies in the range of 0.08 mm to 0.7 mm, preferably 0.09 mm to 0.6 mm, wherein preferably, zirconium beads are used;
(vi) the plurality of particles have a density of at least 2.0 g/cc, at least 2.5 g/cc, at least 3.0 g/cc, at least 3.5 g/cc, at least 4.0 g/cc, at least 4.5 g/cc, at least 5.0 g/cc or at least 5.5 g/cc;
(vii) the plurality of particles have a density that lies in a range selected from 2.0 g/cc to 15 g/cc, 2.5 g/cc to 12 g/cc, 3.0 g/cc to 10 g/cc, 3.5 g/cc to 9 g/cc, 4.0 g/cc to 8 g/cc, 4.5 g/cc to 7.5 g/cc and 5 g/cc to 7 g/cc;
(viii) the plurality of particles have at least two different sizes, wherein (i) the first particle size lies on average in a range selected from 0.05 mm to 0.25 mm, 0.07 mm to 0.2 mm, 0.08 mm to 0.175 mm and 0.9 mm to 0.15 mm and (ii) the second particle size lies on average in a range selected from 0.3 mm to 0.9 mm, 0.35 mm to 0.8 mm, 0.4 mm to 0.7 mm and 0.45 mm to 0.6 mm.
48. The method according to any one of items 45 to 47, wherein (i) the first type is provided by a single solid disrupting particle as defined in any one of items 8 to 12, preferably as defined in item 8 or items 9 to 12 when being dependent on item 8 and (ii) the second type is provided by a plurality of zirconia beads, preferably having a size that lies in the range of 0.08 mm to 0.7 mm, more preferably 0.09 mm to 0.6 mm.
49. The method according to one or more of items 45 to 48, wherein disruption with the first and second type of disrupting particles is performed sequentially or simultaneously, preferably simultaneously.
50. A kit for isolating nucleic acids from a plant sample comprising
(i) at least one chaotropic agent, preferably selected from sodium thiocyanate, sodium carbonate, ammonium thiocyanate, potassium thiocyanate, lithium thiocyanate, lithium perchlorate, guanidine sulfate, and combinations thereof,
(ii) at least one phosphate;
(iii) at least one solid disrupting particle;
(iv) at least one precipitating agent, preferably selected from ammonium acetate, ammonium sulfate, potassium acetate, sodium acetate, sodium chloride, cesium acetate, and combinations thereof;
(v) at least one inhibitor removing agent, preferably selected from aluminum chloride, aluminum sulfate, erbium (III) acetate, erbium (III) chloride, holmium chloride, zirconium (IV) chloride, hafnium (IV) chloride, aluminum ammonium sulfate, aluminum ammonium sulfate dodecahydrate, aluminum potassium sulfate, aluminum chlorohydrate, calcium oxide, iron (III) chloride, iron (II) sulfate, sodium aluminate, sodium silicate, magnesium chloride, and combinations thereof.
51. The kit according to item 50, wherein the at least one disrupting particle has one or more of the characteristics of the one or more disrupting particles as defined in one or more of items 2 to 12.
52. The kit according to item 50 or item 51, wherein the at least one chaotropic agent (i) is comprised in a liquid lysis composition, which preferably additionally comprises the at least one phosphate (ii).
53. The kit according to any one of items 50 to 52, wherein the at least one chaotropic agent has one or more characteristics as defined in items 16 or 17.
54. The kit according to item 52 or 53, wherein the lysis composition has one or more of the characteristics as defined in item 18.
55. The kit according to one or more of items 50 to 54, wherein the phosphate has one or more of the characteristics as defined in item 22.
56. The kit according to any one of items 52 to 55, wherein the at least one phosphate is comprised in the liquid lysis composition which comprises the at least one chaotropic agent.
57. The kit according to any one of items 52 to 56, wherein the lysis composition has one or more of the characteristics as defined in any one of items 23 to 25.
58. The kit according to any one of items 50 to 57, wherein the at least one precipitating agent has one or more of the characteristics as defined in item 29.
59. The kit according to any one of items 50 to 58, wherein the at least one inhibitor removing agent has one or more of the characteristics as defined in item 31 or 32.
60. The kit according to any one of items 50 to 59, wherein the precipitating agent is ammonium acetate and the inhibitor removing agent is a trivalent aluminum salt, preferably aluminum chloride.
61. The kit according to one or more of items 50 to 60, wherein the precipitating agent (iv) and the inhibitor removing agent (v) are comprised in a single composition, preferably a solution.
62. The kit according to item 61, wherein the composition has one or more of the characteristics as defined in any one of items 36 to 38.

63. The kit according to one or more of items 50 to 62, the kit comprising at least two types of solid disrupting particles, wherein
(aa) the first type is provided by one or more disrupting particles having a size of at least 1.5 mm, wherein preferably the first type has one or more of the characteristics of the disrupting particle as defined in any one of items 2 to 13, more preferably as defined in item 8 or items 9 to 12 when being dependent on item 8; and
(bb) the second type is provided by a plurality of disrupting particles having a size of 1 mm or less.
64. The kit according to item 63, wherein the second type has one or more of the characteristics as defined in item 47.
65. The kit according to item 63 or item 64, wherein (i) the first type is provided by a single solid disrupting particle as defined in any one of items 8 to 12, preferably as defined in item 8 or items 9 to 12 when being dependent on item 8 and (ii) the second type is provided by a plurality of zirconia beads, preferably having a size that lies in the range of 0.08 mm to 0.7 mm, more preferably 0.09 mm to 0.6 mm.
66. The kit according to one or more of items 50 to 65, further comprising a nucleic acid-binding solid support.
67. The kit of any of items 50 to 66, further comprising one or more of the solutions selected from a DNA binding solution, a DNA wash solution, a DNA elution solution, a RNA binding solution, a RNA wash solution, and a RNA elution solution.
68. Use of a kit as defined in one or more of items 50 to 67 in a method as defined in any one of items 1 to 49.

This invention is not limited by the exemplary methods and materials disclosed herein, and any methods and materials similar or equivalent to those described herein can be used in the practice or testing of embodiments of this invention. Numeric ranges are inclusive of the numbers defining the range. The headings provided herein are not limitations of the various aspects or embodiments of this invention which can be read by reference to the specification as a whole.

The term "solution" as used herein in particular refers to a liquid composition, preferably an aqueous composition. It may be a homogenous mixture of only one phase but it is also within the scope of the present invention that a solution comprises solid constituents, specifically in minor amounts.

Reference to "the disclosure" and "the invention" and the like includes single or multiple aspects taught herein; and so forth. Aspects taught herein are encompassed by the term "invention".

According to one embodiment, subject matter described herein as comprising certain steps in the case of methods or as comprising certain ingredients in the case of compositions, solutions and/or buffers refers to subject matter consisting of the respective steps or ingredients. It is preferred to select and combine preferred embodiments described herein and the specific subject-matter arising from a respective combination of preferred embodiments also belongs to the present disclosure

TABLE II

| Order | Dimensions | |
|---|---|---|
| Size | A | B |
| ⅛" | .125" | .170" |
| 5/32" | .215" | .270" |
| 3/16" | .270" | .300" |
| ¼" | .320" | .400" |
| 5/16" | .375" | .465 |

Figure 7:
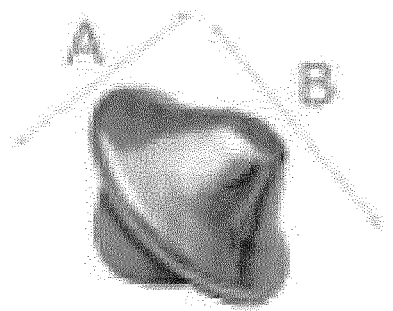
Figure 8:
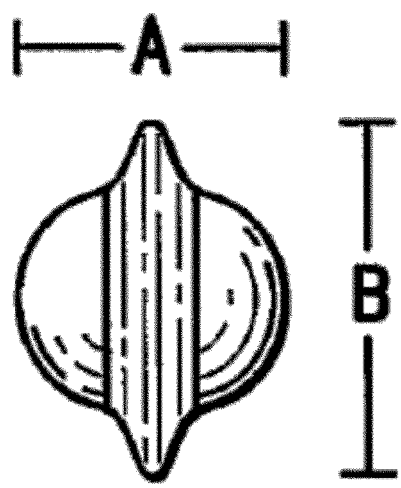

FIGS. 7 and 8 show further exemplary shapes of solid, non-spherical disrupting particles having a surface containing a first part and a second part, whereby the first part and the second part meet by forming an edge, here in the form of sloping central flange. FIG. 7 shows an embodiment with two cone-like tips. FIG. 8 shows an embodiment with two semi-spheres.

Figure 9:
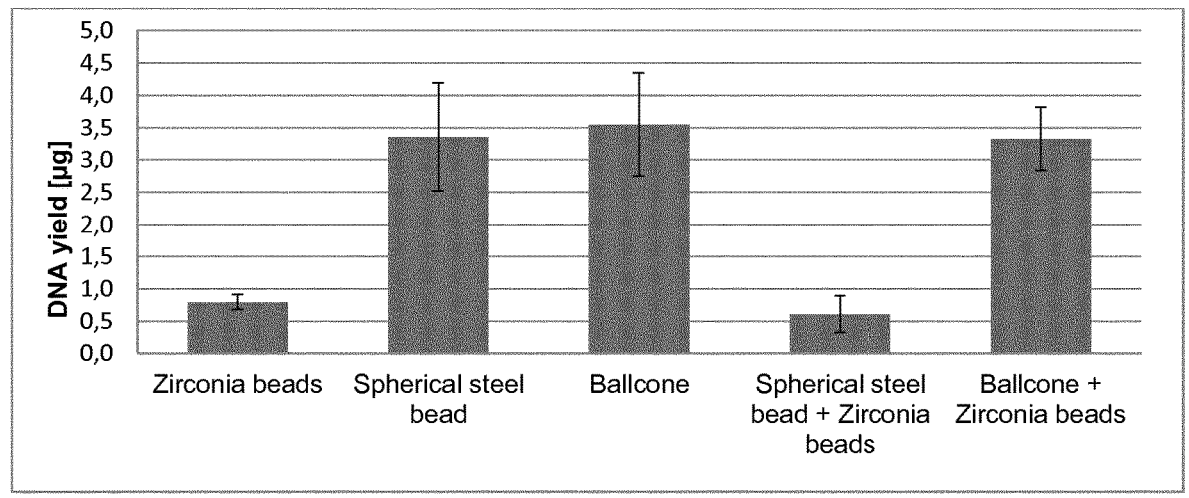

FIG. 9 shows the total DNA yield (in µg) obtained from pine needle samples using different solid disrupting particles and combinations thereof for mechanical disruption of the plant sample.

Figure 10:
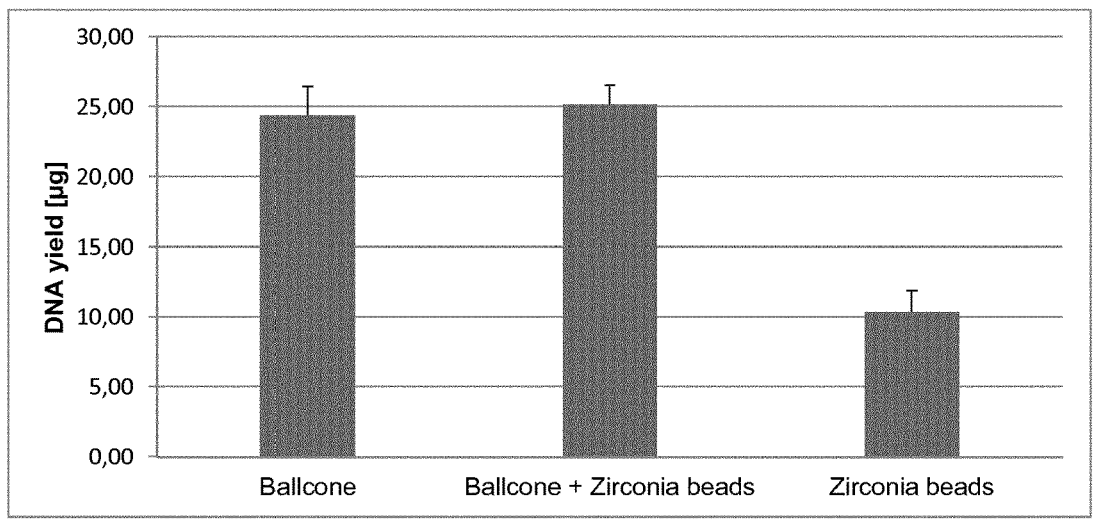

FIG. 10 shows the total DNA yield (in µg) obtained from root samples using either a ballcone or zirconia beads alone, or a combination thereof for mechanical disruption of the plant sample.

Figure 11A:
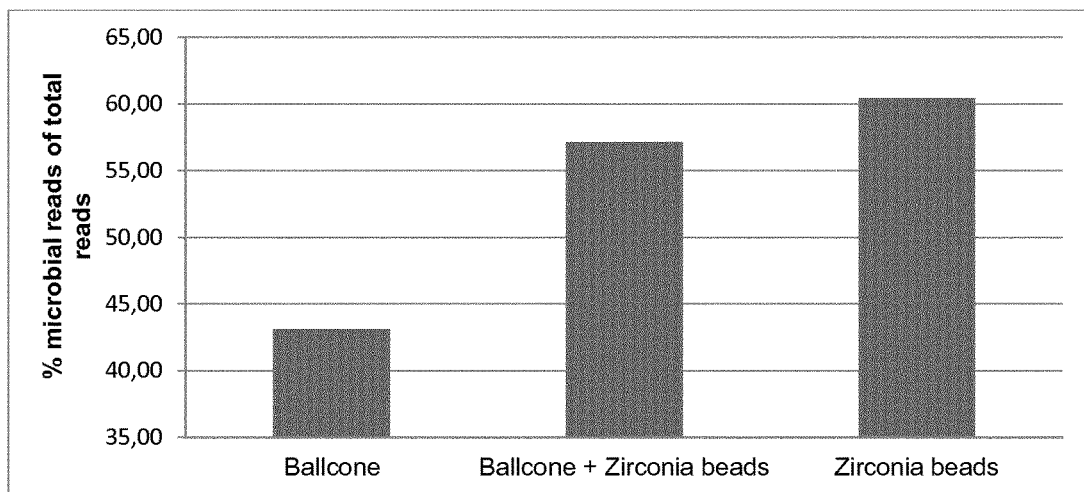
Figure 11B:
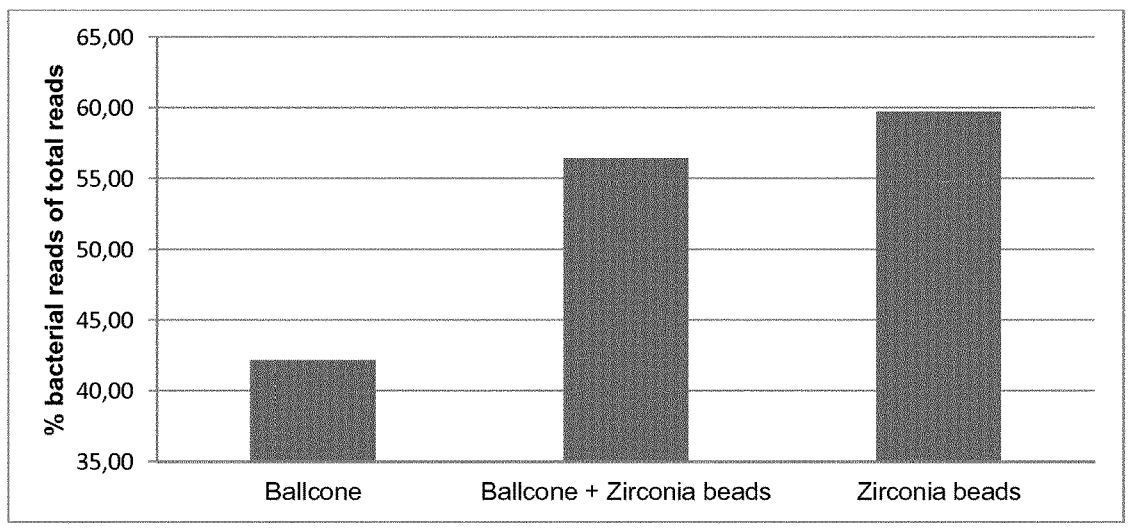

FIGS. 11a-11b shows the percentage of microbial reads (FIG. 11a) and bacterial reads (FIG. 11b) obtained from rose leaf samples using either a ballcone or zirconia beads alone, or a combination thereof for mechanical disruption of the plant sample.

Figure 12A:
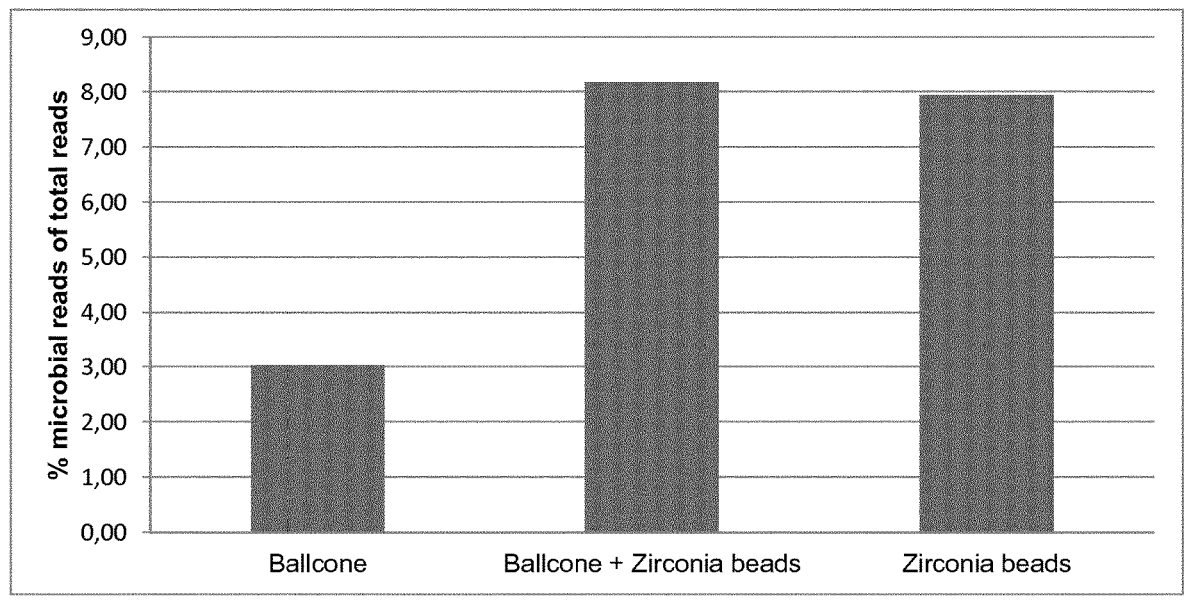
Figure 12B:
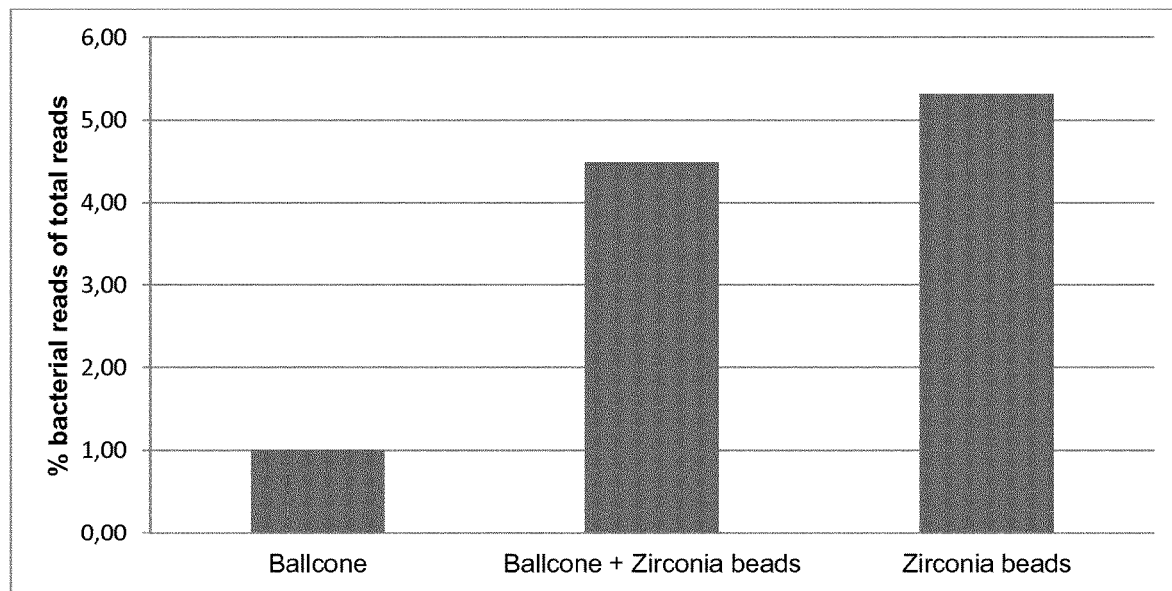

FIGS. 12a-12b shows the percentage of microbial reads (FIG. 12a) and bacterial reads (FIG. 12b) obtained from maple leaf samples using either a ballcone or zirconia beads alone, or a combination thereof for mechanical disruption of the plant sample.

Figure 13A:
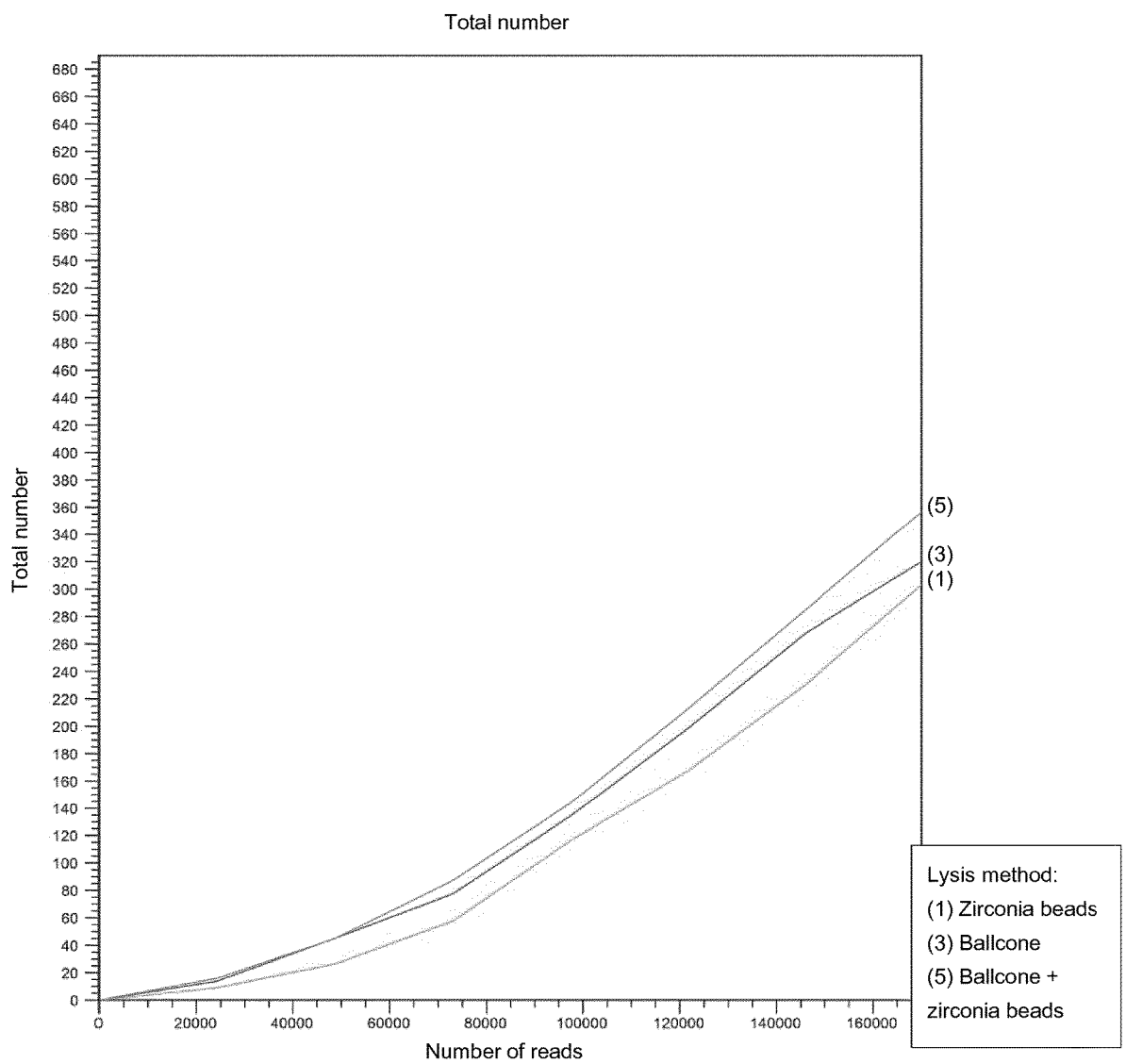
Figure 13B:
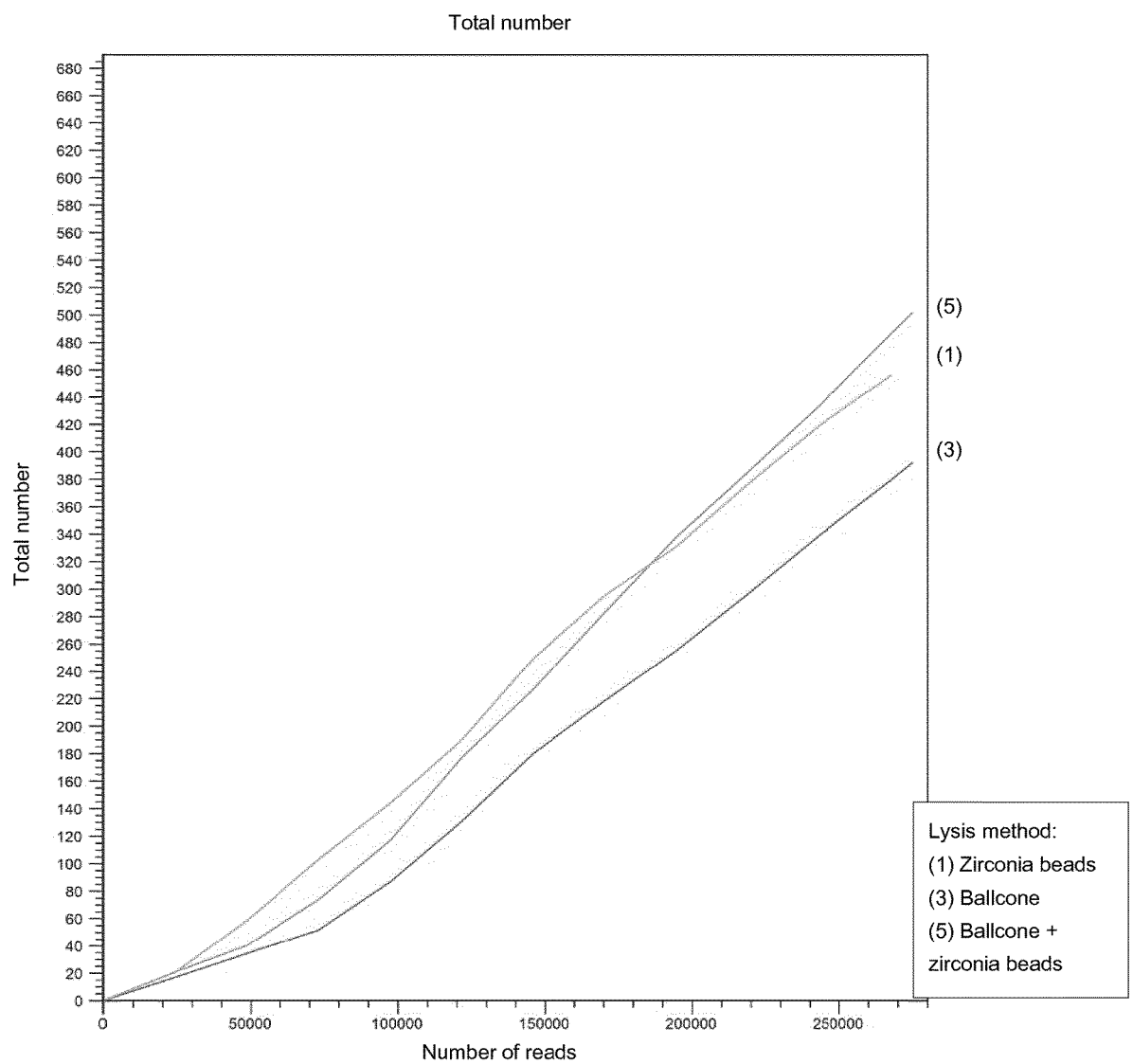

FIGS. 13a-13b show rarefaction curves, which are generally used to show the amount on species richness in a sample. FIG. 13a demonstrates that the method where the combination of particles according to the invention was used for lysis resulted in the highest curve, indicating that more bacterial species were detected there than in the other methods. FIG. 13b further supports that in particular with deeper sequencing, the combination will provide more information than the zirconium beads alone.

Figure 14A:
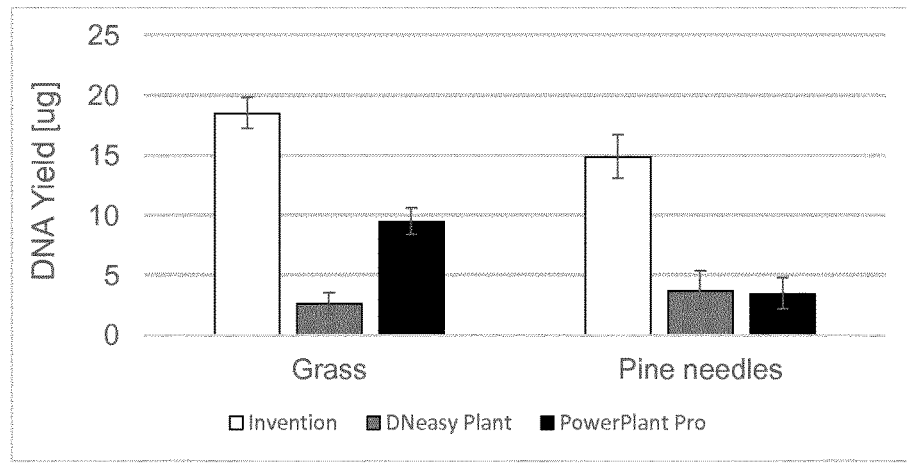
Figure 14B:
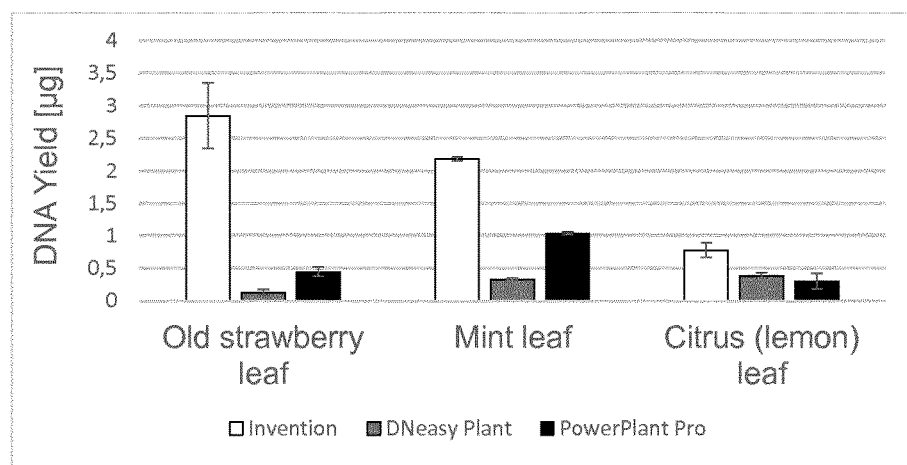

FIG. 14 shows the total DNA yield obtained from (a) grass, pine needles and (b) old strawberry leaf, mint leaf and citrus (lemon) leaf (50 mg each) using the lysis chemistry of the invention together with a ballcone and in comparison prior art methods which use a different lysis chemistry in combination with spherical metal beads (PowerPlant Pro kit) or mortar and pestle (DNeasy Plant kit). The results again confirm with different plant materials that overall yields are higher when using the method according to the invention.

Figure 15:
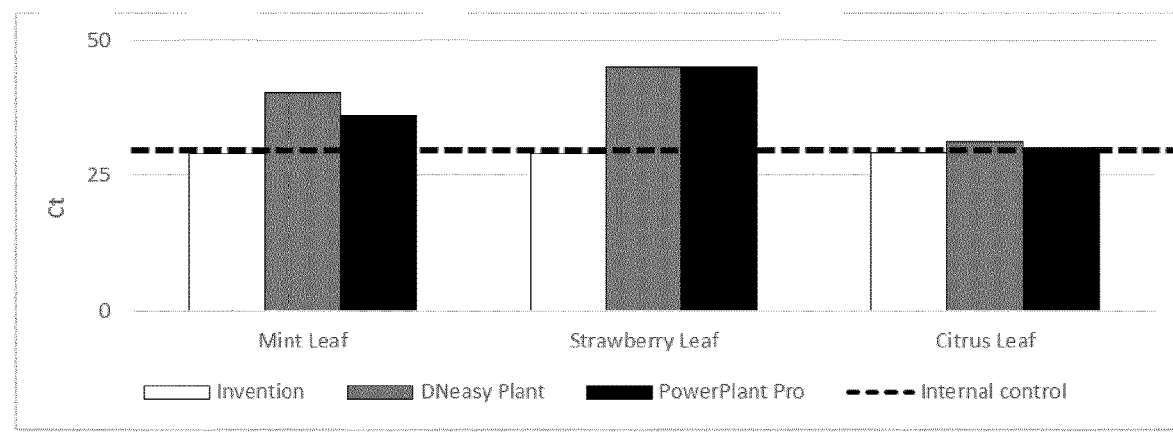

FIG. 15 shows the Ct value results of a real time PCR assay using the eluates of FIG. 14. The eluates (3 replicates) were spiked into a PCR and the Internal Control (IC) was amplified using the QuantiFast Pathogen+IC Kit. Ct values of PCR reactions with plant DNA eluates containing possible inhibitors were compared to Ct values of the PCR reaction with water added as control (dotted line) which does not inhibit amplification of the IC DNA. The eluates obtained with the method according to the invention showed no inhibition.

Figure 16:
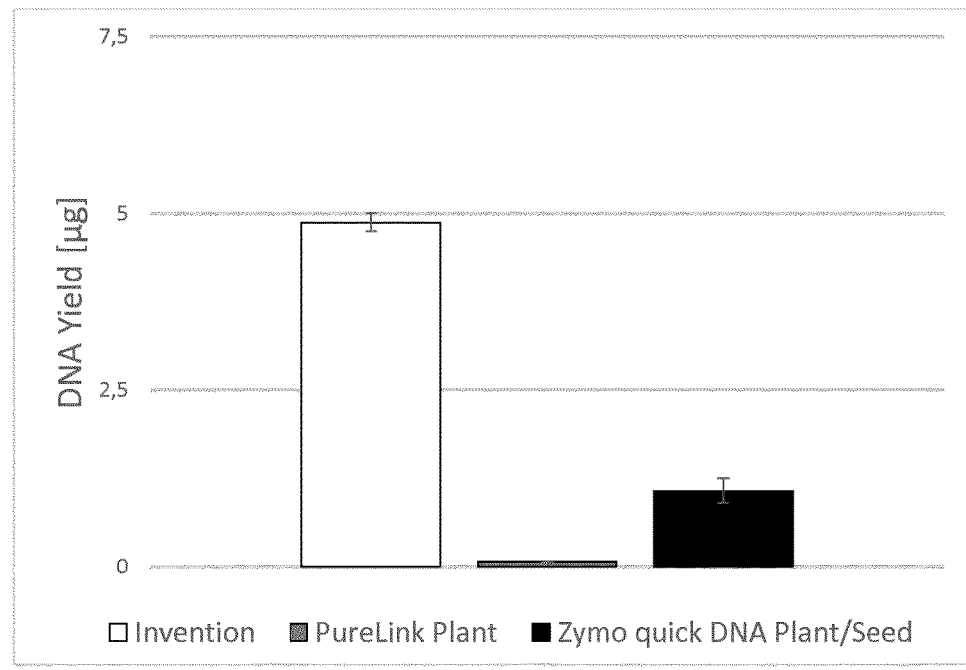

FIG. 16 shows the DNA yield (µg) obtained from strawberry leaf when using the method according to the invention in comparison with prior art kits (PureLink Plant and Zymo quick DNA Plant/Seed). The DNA yield was significantly improved with the method according to the invention.

Figure 17:
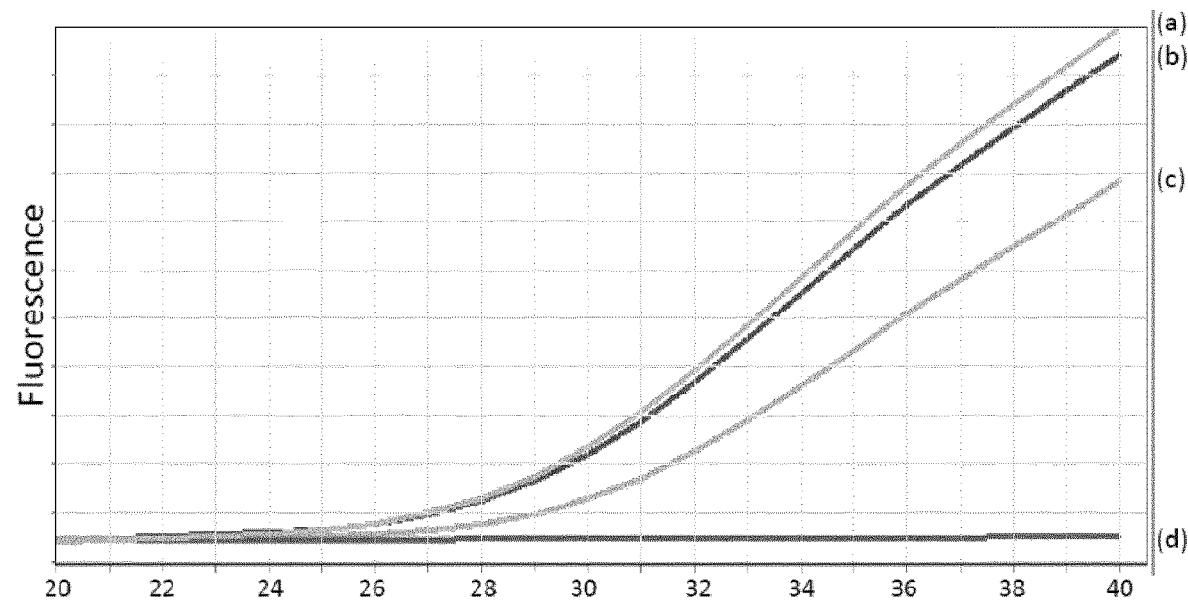

FIG. 17 demonstrates the improved inhibitor removal that is achieved with the present invention. The resulting strawberry DNA eluates of FIG. 16 (8 µl, 4 replicates) were spiked into an Internal Control (IC) PCR and the IC was amplified using the QuantiFast Pathogen+IC Kit. FIG. 17 shows the fluorescence generated with the PCR reactions as measured with Rotor Gene Q and is proportional to the generated PCR product. (a) Control PCR with water; (b) method according to the invention; (c) Zymo Quick DNA Plant/Seed and (d) PureLink Plant Total DNA Purification. The method of the invention showed in contrast to the prior art methods no PCR inhibition.

Figure 18:
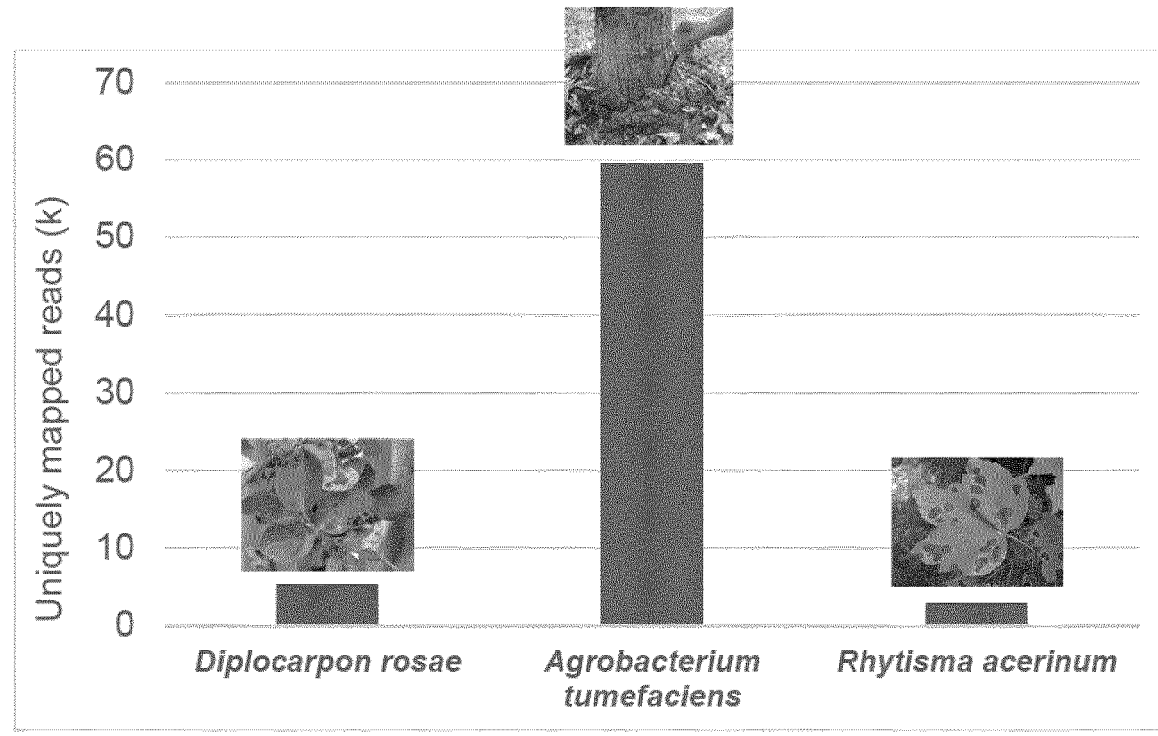

FIG. 18 demonstrates that DNA purified with the method according to the invention purifies plant and pathogen DNA so that plant pathogens can be detected in the isolated DNA. DNA was isolated from 50 mg of plant material infected with the respective pathogen using a ballcone together with the lysis and inhibitor removal chemistry of the present invention. A whole genome library was prepared with the QIAseq FX DNA Library Kit and sequenced by an Illumina MiSeq system (2×250 bp run). The resulting reads were analyzed with the CLC Genomic Workbench (QIAGEN Microbial Genomics Pro Suite). The collected data was used to successfully identify the plant pathogens Diplocarpon rosae, Agrobacterium tumefaciens and Rhytisma acernium.

Figure 19:
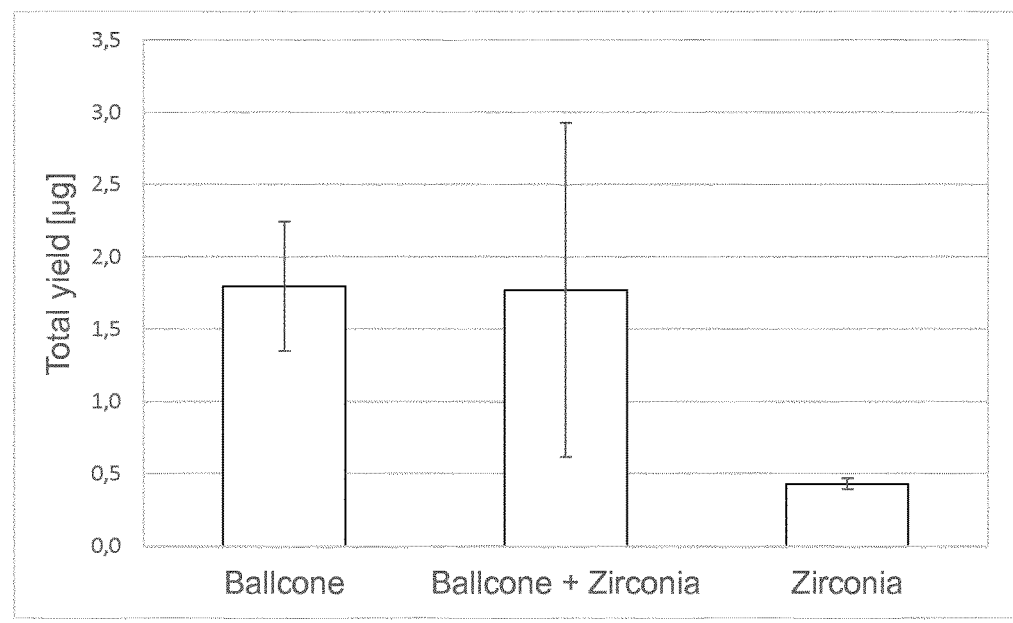

FIG. 19 shows the total DNA yield obtained from apple leaf (50 mg) using the lysis chemistry of the present disclosure together with either a ballcone or zirconia beads alone, or a combination thereof for mechanical disruption of the plant sample (Qubit). The results demonstrate that the amount of total DNA (plant and microbial) isolated from apple leaf samples is strongly increased when using a lysis chemistry according to the present disclosure together with zirconia beads and a ballcone for tissue disruption compared to using zirconia beads alone.

Figure 20:
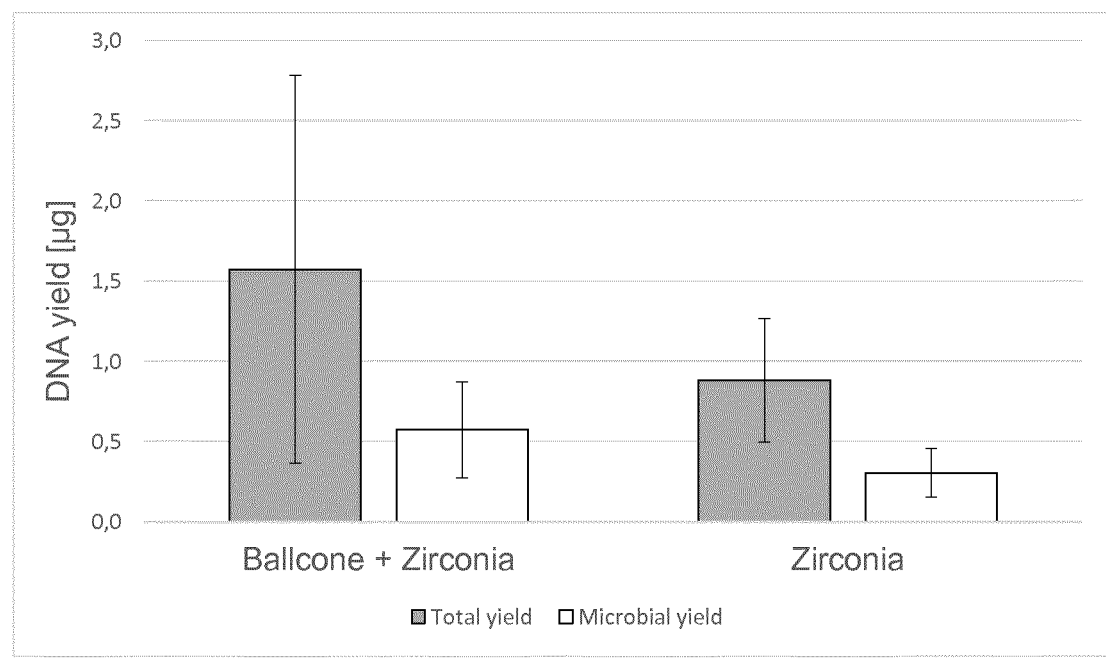

FIG. 20 is a graph showing the total DNA yield obtained from apple root using the lysis chemistry of the present application with a mixture of a ballcone and zirconia beads or zirconia beads alone. Total DNA quantification was done using Qubit. Furthermore, the yield of microbial DNA, as assessed using a QuantiTect SYBR green assay, is shown. The data demonstrates an improved yield of microbial DNA by combining zirconia beads with a ballcone for the lysis of the plant sample material.

Figure 21:
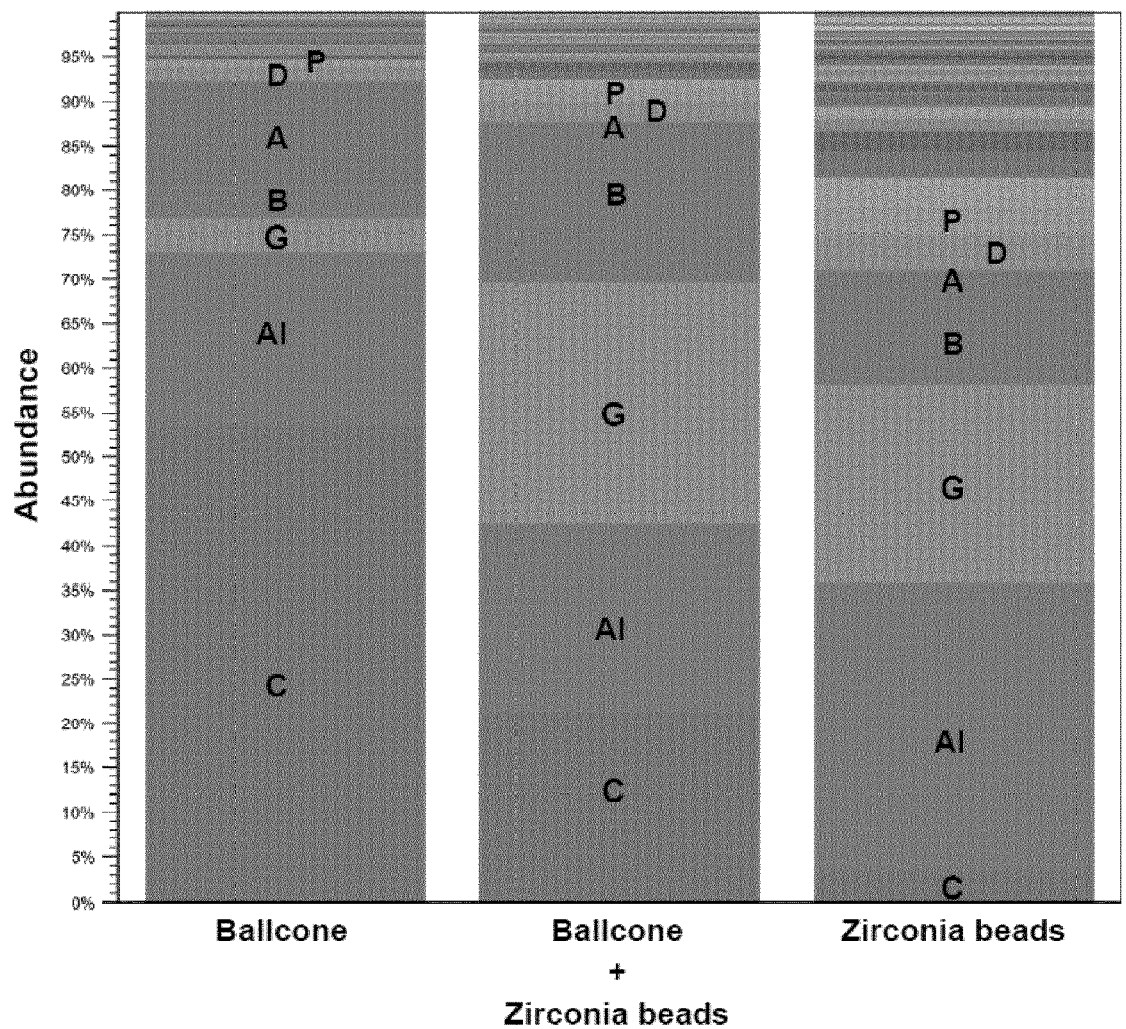

FIG. 21 shows an operational taxonomy unit (OTU) clustering based on the 16S RNA marker gene, which is an operational definition used to classify groups of closely related microbial species. DNA was isolated from apple tree root. Percentages of reads from different microbial species are indicated in the figure. As can be seen, plant cells are more efficiently lysed using a ballcone, whereas zirconia beads are more efficient in lysing bacterial cells. Using a combination combines advantages.

EXAMPLES

It should be understood that the following examples are for illustrative purpose only and are not to be construed as limiting this invention in any manner. The following examples show the positive impact on DNA yield and removal of inhibitors when using this combination of lysis buffer and a non-spherical disrupting particle such as a ballcone for plant sample lysis and homogenization followed by inhibitor removal.

I. Example 1: General Protocol of the Method According to the Invention

The present method incubates a plant sample under agitation in a lysis composition according to the present disclosure in the presence of at least one, and preferably only one, non-spherical disrupting particle. In the examples, a ballcone was used. The ballcone had a size in the range of 4 mm to 7 mm and a weight in the range of 600 mg to 900 mg. The ballcone used was made of steel. Other suitable and preferred disrupting particles are described in the description. It is preferred that the surface has at least one discontinuity, as it is the case in ballcones.

Inhibitors present in the respective plant sample were subsequently removed using the inhibitor removal buffer according to the present disclosure and DNA was isolated using standard methodology known in the prior art.

Plant DNA was isolated using the protocol below unless otherwise stated:

1. Plant Sample Lysis

Figure 6:
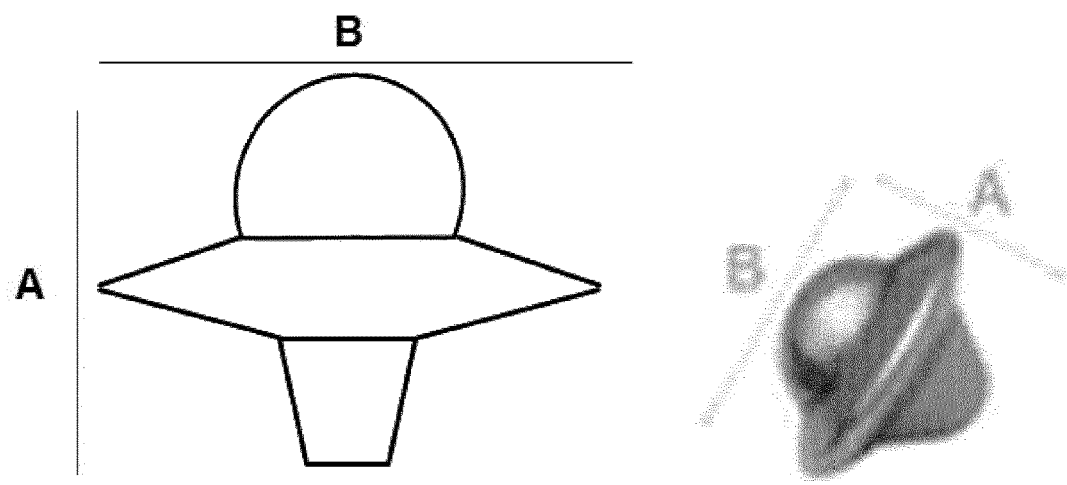
FIG. 6 shows one embodiment of a disrupting particle, here a ballcone shaped particle. This design combines the burnishing abilities of spheres and cones. Exemplary dimensions of A and B in which ballcone shaped beads can be applied are stated in the following Table II (in inches)

Up to 50 mg of plant tissue of different origins (e.g. pine needle, strawberry leaves and grass) were collected. The respective samples were each put in a collection tube (tissue disruption tube, QIAGEN) containing 500 µl of the lysis solution and a ballcone shaped disrupting particle (see FIG. 6).

The lysis solution comprised NaSCN and $Na_2HPO_4$. Preferred concentrations are described herein. E.g. NaSCN can be present in the lysis solution in a concentration lying in a range of 0.8M to 1.25M. $Na_2HPO_4$ can be present in a concentration lying in a range of 0.1M to 0.25M or 0.15M to 0.2M. $Na_2HPO_4$ is preferably comprised in the lysis solution but could also be added separately. An according lysis solution was used in the examples below.

The samples were briefly vortexted to mix and homogenized by 2 homogenization cycles (TissueLyzer II, QIAGEN) of 2 minutes each (@24 Hz).

When processing a plant sample high in phenolic compounds, one may optionally add 450 µl lysis solution and 50 µl of a phenolic substance suppressing (PSS) buffer, comprising PVP.

The lysates were centrifuged at 12,000×g for 2 min to clear the lysate and the supernatant transferred into a clean tube (approx. 350-450 µl). The supernatant may still comprise some plant particles. Centrifugation can be performed in the Tissue Disruption Tube.

2. Inhibitor Removal

200 µl of an IRT solution were added to the supernatant and the sample was vortexed briefly for 5 sec. When processing plants rich in phenolic compounds, the PSS buffer could be alternatively added at this step instead of the lysis step. As disclosed herein, the use of such buffer is optional.

The samples were centrifuged at 12,000 g for 1 min at room temperature. Avoiding the pellet, the supernatant (liquid phase) was transferred into a clean tube. The amount of supernatant was approx. 400-500 µl.

The Inhibitor removal solution (IRT) comprised ammonium acetate as precipitating agent and $AlCl_3$ as inhibitor removing agent. Preferred concentrations for both agents are described herein. E.g. ammonium acetate can be comprised in the IRT solution in a concentration that lies in a range of 3M to 4M. Aluminum chloride can be comprised in the IRT solution in a concentration that lies in a range of 100 mM to 150 mM. An according solution was used in the examples below.

3. Isolation of Nucleic Acids

As described herein, essentially any nucleic acid isolation protocol can be used to isolate and hence recover nucleic acids comprised in the obtained liquid phase (supernatant). In the following, a nucleic acid isolation protocol was used for recovering DNA, wherein DNA is bound to a solid silica support in the presence of a chaotropic salt. A commercially available buffer containing a chaotropic agent (buffer AVL, Qiagen) was added in a volume approx. corresponding to the volume of the supernatant. The DNA in the lysate was bound to a silica spin column (e.g. QIAGEN), the sample-containing tubes were centrifuged and the flow through discarded. Two washing steps of the column-bound DNA were performed, before the samples were eluted into an elution buffer (QIAGEN). The following protocol was followed:

Add 500 µl of Solution AVL and vortex for 5 s. Load 650 µl of the lysate onto an MB Spin Column and centrifuge at 12,000×g for 1 min. Discard the flow-through and repeat step to ensure that all of the lysate has passed through the MB Spin Column (MO BIO). Carefully place the MB Spin Column into a clean 2 ml Collection Tube. Avoid splashing any flow-through onto the MB Spin Column.

Add 500 µl of AW1 (wash buffer, QIAGEN) to the MB Spin Column. Centrifuge at 12,000×g for 1 min. Discard the flow-through and place the MB Spin Column back into the same 2 ml Collection Tube. Add 500 µl of AW2 (wash buffer, QIAGEN) to the MB Spin Column. Centrifuge at 12,000×g for 1 min. Discard the flow-through and place the MB Spin Column into the same 2 ml Collection Tube. Centrifuge at up to 16,000×g for 2 min. Carefully place the MB Spin Column into a new 1.5 ml Elution Tube (provided).

Add 50-100 µl of Solution EB (elution buffer, QIAGEN) to the center of the white filter membrane. Centrifuge at 12,000×g for 1 min. Discard the MB Spin Column. The eluate comprises the eluted DNA.

The eluted DNA was then analysed.

As discussed herein, the present method allows to isolate high quality DNA with high yield, because of the efficient sample lysis and efficient depletion of proteins and inhibitory compounds. Therefore, the present method provides a significant advantage, be providing a universal method that provides high quality DNA with good yield from various different plant samples.

II. Example 2: Use of Ballcone in Combination with the Lysis Solution of the Present Disclosure Increases DNA Yield from Various Plant Samples DNA yields from different plant tissue types using a lysis solution according to the invention (see Example 1) in combination with a ballcone for mechanical plant sample disruption are between 2 and 20-fold improved over standard methods, which use mortar and pestle (M&P) or ceramic/metal spherical beads. This was true for both difficult to lyse samples (pine needle, strawberry leaf) and easy to lyse samples (grass). DNA was isolated using the method of the invention according to the above protocol (see Example 1).

Figure 1:
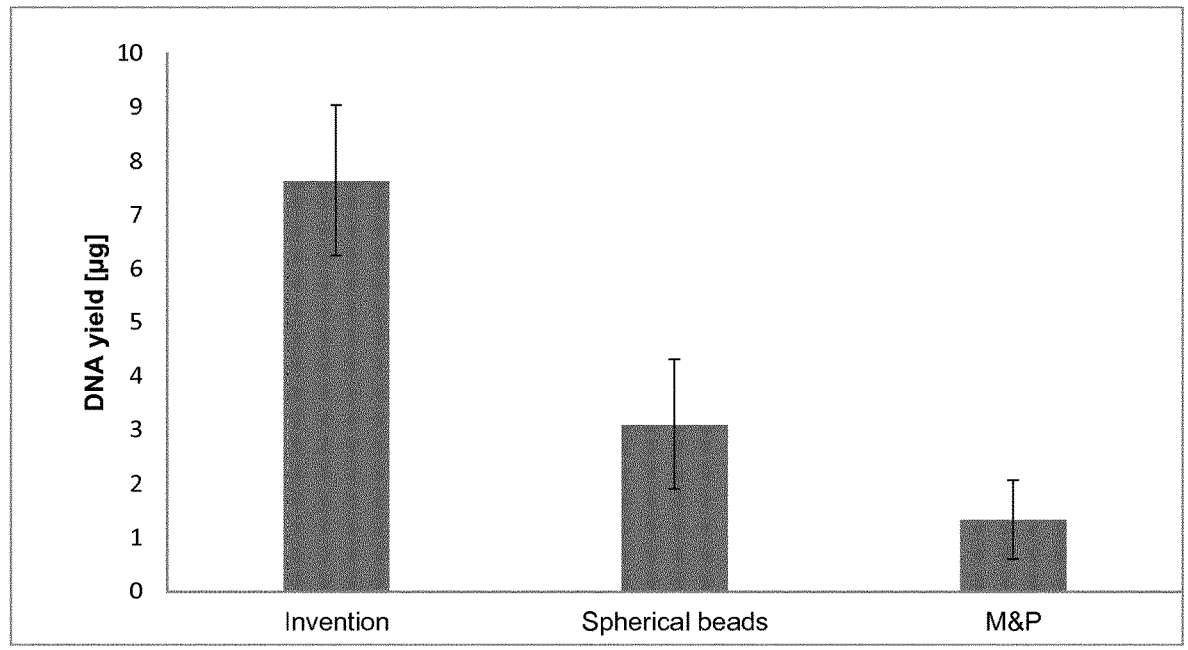
FIG. 1 is a graph showing the total DNA yield obtained from pine needle samples (50 mg) using the method according to the invention and comparative prior art methods, here spherical ceramic beads (Zymo Quick-DNA Plant/Seed kit) or mortar and pestle (M&P—ThermoFisher Purelink Genomic Plant DNA Purification Kit). The results demonstrate that using a lysis chemistry according to the invention in combination with mechanical lysis mediated by an irregularly shaped solid disrupting particle as defined herein, such as a ballcone, increases the yield of DNA that can be subsequently isolated by standard methodology.
Figure 2:
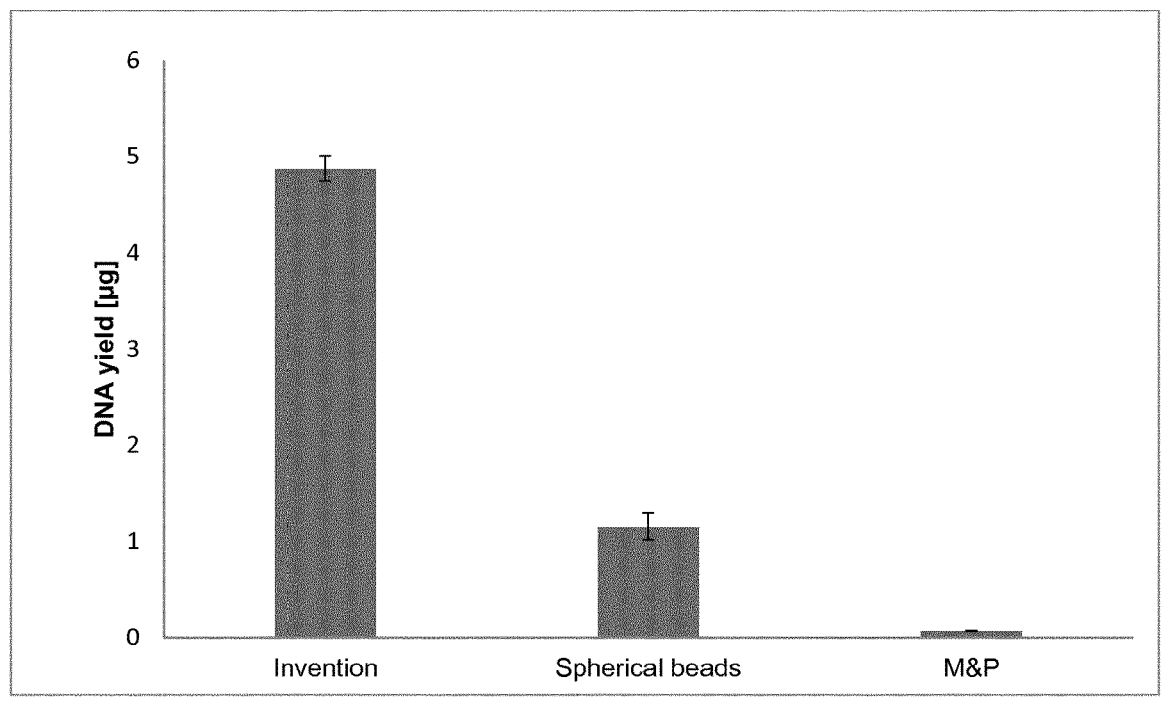
FIG. 2 is a graph showing the total DNA yield obtained from old strawberry leaf samples (50 mg) using the method according to the invention and comparative prior art methods, here spherical ceramic beads (Zymo Quick-DNA Plant/Seed kit) or mortar and pestle (M&P—ThermoFisher Purelink Genomic Plant DNA Purification Kit).). The results demonstrate that using a lysis chemistry according to the invention in combination with mechanical lysis mediated by a solid disrupting particle as defined herein, such as a ballcone, increases the yield of DNA that can be subsequently isolated by standard methodology.
Figure 3:
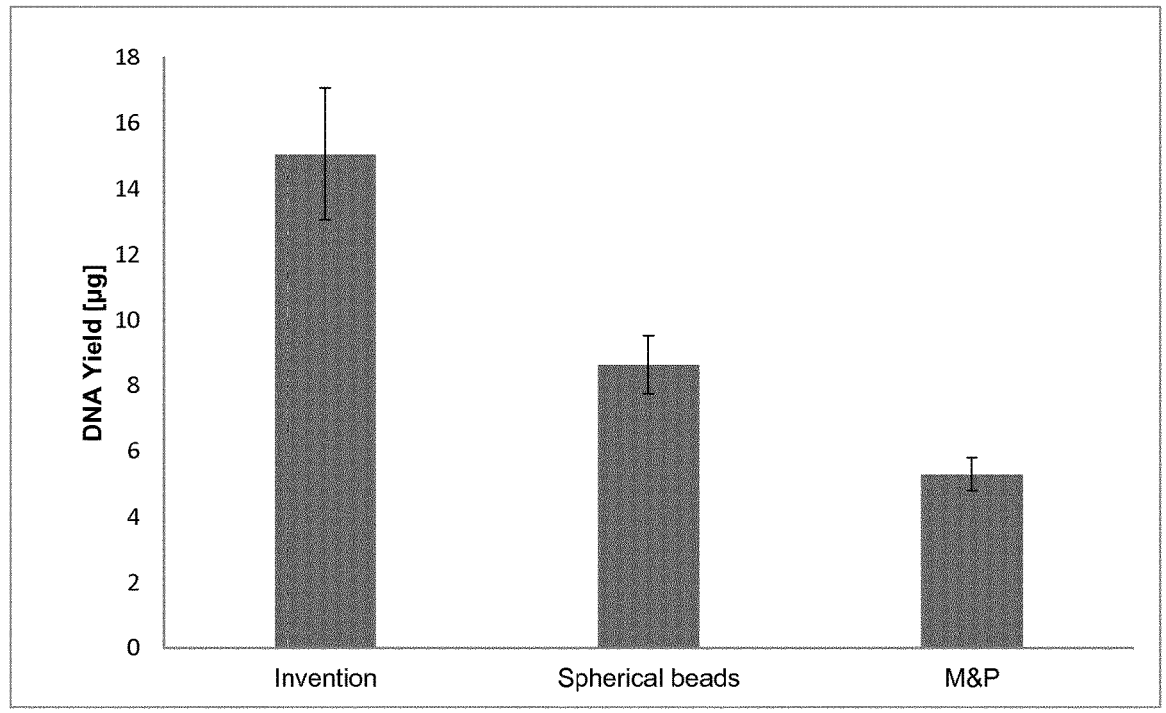
FIG. 3 is a graph showing the total DNA yield obtained from grass (50 mg) using the method according to the invention and comparative prior art methods, here spherical metal beads (DNeasy PowerPlant Pro Kit) or mortar and pestle (DNeasy Plant Kit). The results demonstrate that using a lysis chemistry according to the invention in combination with mechanical lysis mediated by a solid disrupting particle as described herein, such as a ballcone, increases the yield of DNA that can be subsequently isolated by standard methodology.

DNA was furthermore isolated using different lysis buffers in combination with ceramics or metal beads (Zymo quick DNA Plant/seed miniprep kit (uses a plurality of small spherical ceramic beads), QIAGEN DNeasy PowerPlant Pro (spherical metal beads) respectively) or M&P (FIGS. 1 and 2—ThermoFisher Purelink Plant, FIG. 3 QIAGEN DNeasy Plant Kit). The lysis buffers used for the comparison protocols typically contain a higher concentration of chaotropic salt (GuHCL) in combination with NaCL and a detergent (typically SDS). Hence, reference controls were processed using conventional lysis chemistry which typically includes a higher concentration of a chaotropic salt in combination with NaCl and a surfactant with either spherical beads (Zymo quick-DNA Plant/Seed Miniprep Kit or QIAGEN DNeasy PowerPlant Pro Kit) or mortar and pestle (M&P) (ThermoFisher PureLink Plant Total DNA Purification Kit) according to the respective manuals.

The isolated DNA was quantified by fluorescent measurement using a Qubit.

50 mg of plant tissue was used as input for each sample type and processed with the method of the invention or the different prior art protocols according to the manufacturer's instructions. Isolated plant DNA was quantified by fluorometric means (Qubit, invitrogen) (FIG. 1-3). Each column represents the average of 4 independent replicates. The DNA yields obtained using the lysis chemistry in combination with the mechanical lysis of the ballcone in the method of the invention are significantly higher compared to DNA isolation yields after using conventional lysis chemistry together with spherical beads (ceramic beads or metal beads) or mortar and pestle (M&P). Four biological replicates per lysis condition were included for each sample type.

As can be seen, the method of the invention increases nucleic acid yield significantly from several different plant types. This increase in yield is achieved by the advantageous lysis chemistry in combination with the use of a non-spherical, heavy and large disrupting particle, which preferably is a ballcone. It is advantageous to use a low chaotropic salt lysis reagent in combination with such disrupting particle. The present method is clearly superior over conventional methods that use either mortar and pestle or spherical beads, such as spherical ceramic beads or spherical metal beads.

III. Example 3: Evaluation of the Efficacy of the Inhibitor Removal Chemistry

An additional major issue when isolating DNA from plants other than increasing yield is the presence of inhibitors. The removal of inhibitors is important to be able to obtain high quality nucleic acids. The improved lysis efficiency that is achieved with the method of the invention (see Examples 1 and 2) may also result in a release of more inhibitors into the DNA containing supernatant. The present invention improves inhibitor removal as is demonstrated by the following example.

Plant DNA was isolated from 50 mg of coffee seeds or wine grape leaves using the lysis chemistry in combination with the mechanical lysis according to the invention as applied during the sample lysis step as disclosed in Example 2 (see also Example 1 for the basic protocol). Coffee seeds and wine grape leaves both contain high amounts of polyphenolic and polysaccharide based inhibitor compounds.

To evaluate the efficiency of the inhibitor removal chemistry of the IRT solution of the invention, different volumes of the IRT inhibitor removal solution or a comparative buffer were tested.

Figure 4:
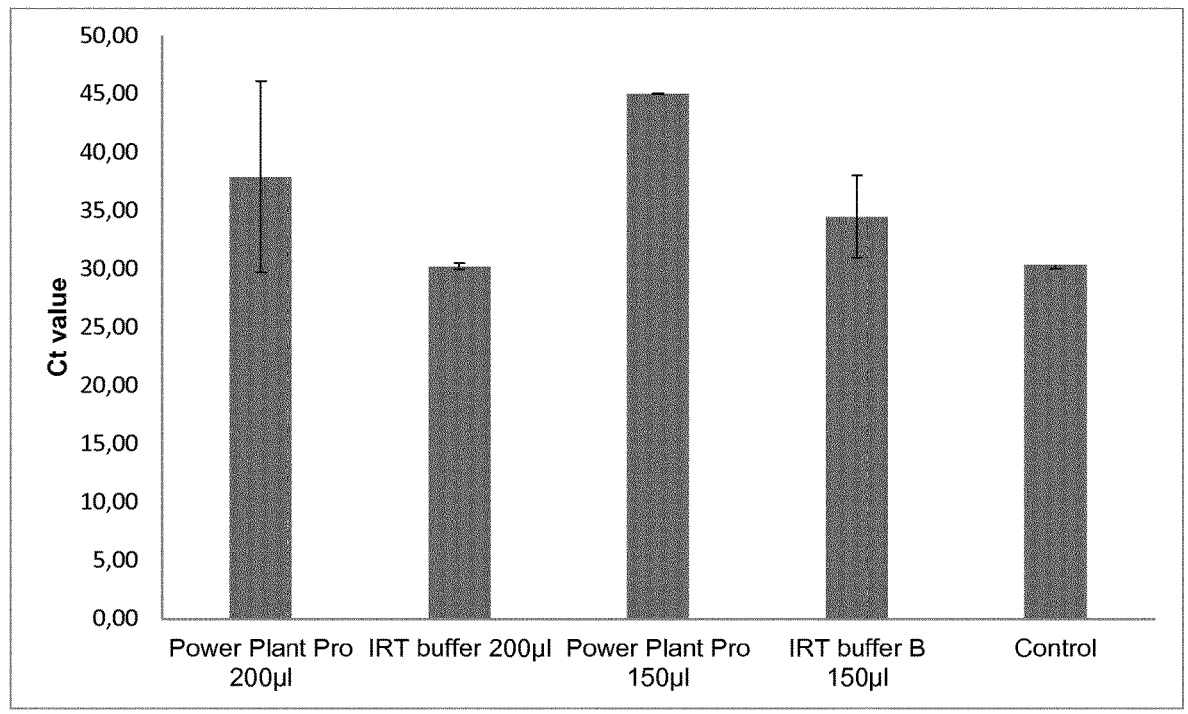
FIG. 4 is a graph showing the Ct value results of a real time PCR assay based on DNA isolated from coffee seed samples. The lysis chemistry in combination with mechanical lysis as disclosed herein were used for DNA isolation prior to the addition of varying volumes of an inhibitor removal buffer according to the invention. The method of the invention is compared with a comparative prior art buffer. Less PCR inhibition is seen with the present invention.
Figure 5:
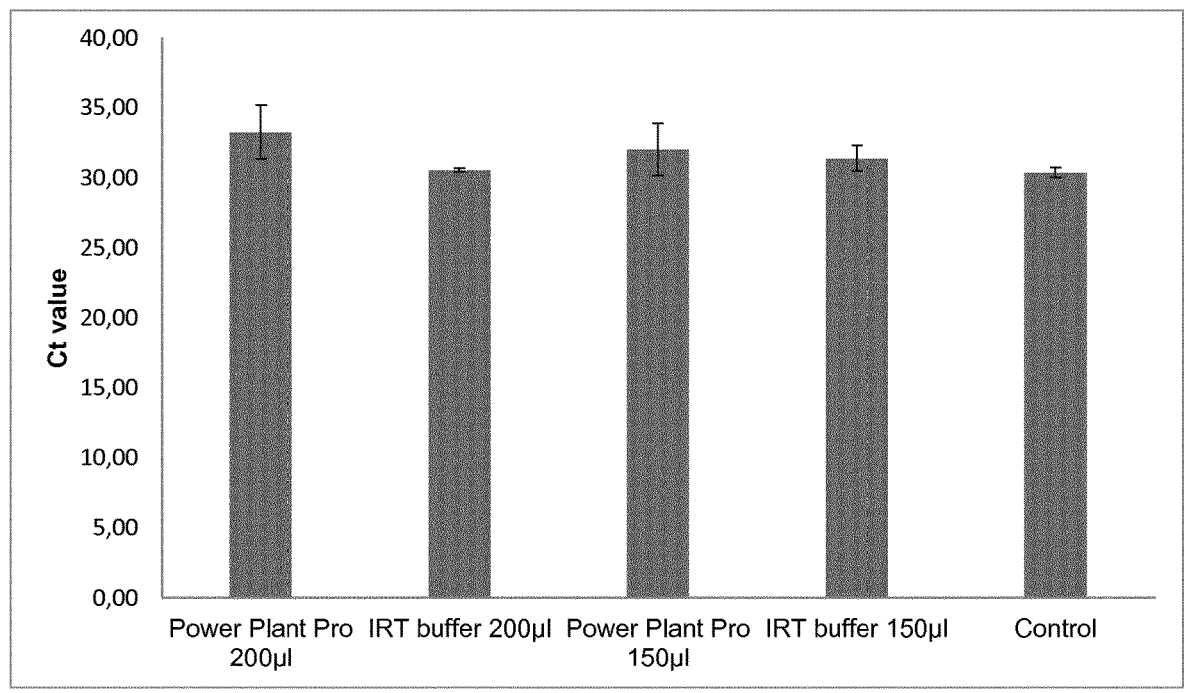
FIG. 5 is a graph showing the Ct value results of a real time PCR assay based on DNA isolated from wine grape leaf samples. The lysis chemistry in combination with mechanical lysis as disclosed herein were used for DNA isolation prior to the addition of varying volumes of an inhibitor removal buffer according to the invention. The method of the invention is compared with a comparative prior art buffer. Less PCR inhibition is seen with the present invention.

The inhibitor removal efficiency of the IRT solution according to the invention (see Example 1 above) was compared to with the gold standard inhibitor removal chemistry (QIAGEN DNeasy PowerPlant Pro kit, standard protocol). Either 150 µl or 200 µl of the respective inhibitor removal solution were added to the lysed sample, i.e. approx. 500 µl supernatant (see Example 1). The added inhibitor removal solution volume is also indicated in FIG. 4 and FIG. 5.

The QIAGEN DNeasy PowerPlant Pro Kit protocol was followed for lysis and inhibitor removal according to the instructions of the manufacturer using two different amounts of the inhibitor removal solution of the kit. DNA was also isolated according to the instructions of the QIAGEN DNeasy PowerPlant Pro Kit protocol.

For the method of the invention, lysis and inhibitor removal was performed as described in Example 1 using two different amounts of the inhibitor removal solution. From the obtained supernatant, DNA was isolated according to the instructions of the QIAGEN DNeasy PowerPlant Pro Kit protocol.

To evaluate the efficiency of inhibitor removal, a SYBR green-based real time analysis that includes an internal control DNA was performed (QuantiTect Pathogen+IC PCR, QIAGEN). This allows to quantify PCR inhibition of eluates. To this end, 4 µl of each DNA eluate were added into a real time PCR reaction sample that includes an internal control DNA which is efficiently amplified in the absence of PCR inhibitors. As an inhibitor-free control, 4 µl of water were added in a separate real time PCR reaction sample. PCR inhibition is reflected by the overall change in Ct values between the samples treated with different concentrations of the different buffers and the control (FIG. 4 and FIG. 5). Each Ct value is a replicate of 4 independent biological samples, i.e. each column is a replicate of 4 individual DNA eluate spike-ins obtained from 4 different preparations. The error bars indicate the standard deviation.

FIG. 4 and FIG. 5 demonstrate that the efficiency of inhibitor removal was significantly improved using the inhibitor removal chemistry according to the invention (see Ct values). By comparing the Ct values of the inhibitor removal chemistry groups according to the prior art and the invention with each other and with the control group it can be seen that there is barely any inhibition when using the inhibitor removal chemistry according to the invention. PCR inhibition is increased with the IRT buffer of the prior art. This is especially the case for coffee seeds, which have an unusually high amount of secondary metabolites that can act as PCR inhibitors.

Example IV: Improved Lysis Method for Effectively Releasing Microbial Nucleic Acids from Microorganisms Comprised in a Plant Sample For certain applications wherein the isolation of microbial nucleic acids from the plant sample is of interest, it is advantageous to use in step (a) (i) at least two types of solid disrupting particles, wherein (i) the first type is provided by one or more non-spherical disrupting particles having a size of at least 1.5 mm (e.g. a ballcone) and (ii) the second type is provided by a plurality of disrupting particles having a size of 1 mm or less (e.g. spherical zirconia beads). This is demonstrated by the following examples:

1. Materials and Methods

In the following examples, the effectiveness of different solid disrupting particles used as grinding media to support lysis of various plant samples by mechanical disruption was tested. Inter alia, the following disrupting particles and combinations of disrupting particles were tested:

(1) Zirconia beads in two different sizes (0.1 mm and 0.5 mm (diameter); 0.75 g each per sample preparation). The zirconia beads were substantially spherical.
(2) Spherical stainless steel beads (approx. 2.4 mm; 3 per sample preparation).
(3) Ballcone. The ballcone had a size in the range of 4 mm to 7 mm and a weight in the range of 600 mg to 900 mg. The ballcone used was made of steel.
(4) Zirconia beads and spherical steal beads (combination of (1) and (2))
(5) Zirconia beads and ballcone (combination of (1) and (3)).

Plant DNA was isolated from up to 50 mg of plant sample of different origins (pine needles, root, rose leaf, maple leaf) using the general protocol of Example 1, unless otherwise stated.

Quantification of isolated DNA was done by fluorometric means (Qubit dsDNA, HS assay kit, Invitrogen) using 5 µl eluate obtained from 4 independent replicates, i.e. 4 individual samples processed.

400 ng of isolated DNA were used for library construction. Library construction followed manufacturer's instructions for the QIASeq FX DNA library kit. Libraries were sequenced on an Illumina MiSeq and analyzed with CLC Microbial Genomics Workbench. The libraries were mapped against all available bacterial genomes. The percentage of bacterial reads was determined by taking the number of reads mapping to that reference microbial database, divided by the total number of reads in the library.

2. Results 2.1. DNA Yield

The results are shown in FIG. 9 and FIG. 10. Each column represents the average of 4 independent replicates, the standard deviation is indicated.

Pine Needle Samples

FIG. 9 shows the DNA yield obtained from pine needle samples (50 mg). As can be seen, the ballcone as a preferred example of an irregularly shaped disrupting particle as used in the present invention provided the highest DNA yield and therefore was most effective in disrupting the plant sample tissue. In contrast, spherical zirconia beads alone only provided very low DNA yields. Therefore, zirconia beads alone do not sufficiently disrupt the plant tissue which is reflected in the reduced DNA yield.

While spherical steel beads alone were effective in lysing the samples when using the lysis and inhibitor removal chemistry of the invention, the DNA yield was significantly reduced when using a combination of spherical steel beads and zirconium beads (4). The yield of the combination was even lower than the yield obtained with zirconia beads alone. Thus, the spherical steel particles and the spherical zirconium beads apparently impair each other in the efficiency of mechanical cell lysis. The spherical steel beads might hinder the movement of the zirconia beads around the spherical surface thereby reducing the effectiveness of zirconia bead bashing.

In contrast, the combination of a ballcone with zirconia beads (5) was highly effective in lysing the plant sample as shown by the high total yield of isolated total DNA. The irregular ballcone shape allows efficient sample mixing and free movement of the zirconia beads, thereby ensuring efficient mechanical plant sample and also microorganism lysis. Therefore, the use of a ballcone as a preferred example of a disrupting particle that is used according to the invention is especially suitable for combination with a plurality of small spherical particles such as zirconia beads. The continued high effectiveness of mechanical lysis of the bacterial cells by zirconium beads in the presence of a ballcone is noteworthy. The combination of the irregular ballcone shape and zirconia beads thus provides very high DNA yields and enables efficient lysis of the plant sample as well as comprised microorganisms such as bacteria and fungi (see also below).

Root Samples

A high total DNA yield is also obtained when using a combination of a ballcone and zirconium beads for processing difficult to lyse plant samples. This was demonstrated by the processing of root samples. Root is a plant organ especially rich in microorganisms such as bacteria. To efficiently release microbial nucleic acids comprised in root samples it is important to achieve a thorough disruption and lysis of the root sample, because microorganisms such as bacteria may also be comprised inside the root sample. FIG. 10 shows the DNA yield obtained when processing root samples (50 mg).

Zirconia beads alone were not efficient in lysing and homogenizing the root sample as is evident from the reduced DNA yield. This is critical when being interested in microbial nucleic acids because microorganisms such as bacteria which are inside the plant tissue (here roots) will not be reached by the zirconia beads alone. Therefore, microbial nucleic acids originating from microorganisms that are present inside the plant sample can be lost for analysis when using zirconia beads alone.

In contrast, the combination of a ballcone with zirconia beads provides a high DNA yield thereby indicating that the root sample was efficiently lysed when using the combination of these two types of disrupting particles. The results also show that root samples can be lysed efficiently when using a ballcone alone. However, the heavy ballcone alone is not very efficient for lysing microorganisms comprised in the root sample, i.e. less microbial nucleic acids are released when using a ballcone alone compared to using a combination of a ballcone with zirconia beads (see below).

Summary

The use of a ballcone as disrupting particle provides high DNA yields and therefore is particularly effective in homogenizing and hence disrupting various plant samples. However, such large disrupting particle alone is less effective in mechanically disrupting microorganisms such as bacteria that are comprised in the plant sample (see FIGS. 11 to 13 discussed below). Large particles are in general not sufficiently effective for lysing microbes.

The combined use of a ballcone together with zirconium beads achieves the same high total yield of isolated total DNA as the use of a ballcone alone. The total DNA yield obtained when using this combination for mechanical lysis was significantly higher compared to the use of zirconium beads alone or a combination of zirconia beads and spherical metal beads in the lysis step. Moreover, the combined use of a ballcone and zirconium beads efficiently releases microbial nucleic acids comprised in microbes comprised in plant samples, as is shown by the high percentage of bacterial DNA among total DNA isolated (see FIGS. 11 to 13 discussed below). Therefore, the combined use of a ballcone together with zirconium beads advantageously allows to release nucleic acids including microbial nucleic acids from various plant samples, including difficult to lyse samples such as root samples.

2.2. Percentage of Microbial Reads

The use of a ballcone alone, while efficiently lysing various plant samples, is less efficient in lysing microorganisms such as bacteria that are comprised in a plant sample. Therefore, microbial nucleic acids are to a certain extent lost when just using a ballcone alone for plant sample lysis.

Therefore, for performing a lysis that improves the release of microbial nucleic acids such as bacteria DNA in addition to the plant DNA, it is advantageous to use a ballcone in combination with zirconia beads. As can be seen from FIGS. 11 and 12, the combination achieves a high percentage of microbial (bacterial and fungal) and also bacterial reads, thereby indicating efficient plant sample lysis as well as efficient microorganism lysis. The higher release of microbial DNA is reflected by the higher percentage of microbial and/or bacterial reads that were obtained in next generation sequencing that followed DNA isolation.

The results demonstrate that using a ballcone in combination with the zirconia beads achieved a higher yield of microbial DNA compared to using a ballcone alone. Furthermore, the results indicate that the overall amount of released and thus recoverable microbial DNA is increased when using a combination of a ballcone with zirconia beads compared to zirconia beads alone. As is shown by FIGS. 9 and 10 discussed above, spherical zirconia beads alone do not efficiently lyse the plant sample, thereby loosing for example to a certain extent microorganisms such as bacteria that are comprised in the plant sample. In this respect it is noted that an increased overall amount of bacterial or microbial DNA in the isolated DNA can nevertheless result in a lower percentage of microbial/bacterial reads, if there is a lot of plant derived DNA.

As the combination of two different types of particles provides significantly higher total DNA yields and renders accessible microorganisms that are e.g. inside the plant sample (e.g. in case of roots), the total amount of microbial DNA is improved compared to the use of zirconia beads alone. Microbial nucleic acids comprised in the microorganisms contained within the plant sample are additionally released and therefore can be subsequently isolated when using the method of the invention. This is reflected in the sequencing results which showed a higher diversity of 16S sequences for samples were the combination of particles according to the present invention was used for lysis compared to zirconia beads or the ballcone alone (see FIG. 13a).

Summary

The combined mechanical lysis using a non-spherical disrupting particle as described herein, such as a ballcone, and a plurality of small spherical particles such as zirconium beads provides DNA from plant samples with high yield, wherein the obtained DNA comprises a high amount of microbial DNA which is therefore available for analysis. For analysis, various methods can be used, such as amplification based procedures (for example PCR) as well as sequencing, such as next generation sequencing.

The provided sequencing results demonstrate a significantly improved percentage of obtained microbial such as bacterial reads when using a combination of these two types of particles. The percentage of bacterial reads essentially corresponds to the use of zirconium beads alone, while, however, the overall DNA yield is improved (see above). This achieved high percentage of bacterial DNA among total DNA obtained by using a solid non-spherical disrupting particle such as a ballcone in combination with zirconium beads for mechanical lysis is advantageous for certain applications which aim at also isolating microbial nucleic acids from plant samples.

V. Example 5: DNA Yield and Inhibitor Removal for Further Examples

DNA was isolated from grass, pine needles, old strawberry, mint leaf and citrus (lemon) samples (50 mg each) using the lysis method according to the invention (see Example 1) or prior art methods, here the PowerPlant Pro kit and the DNeasy Plant Mini kit which use a different lysis chemistry in combination with spherical metal beads or mortar and pestle (4 replicates). DNA yields were quantified with a Qubit Fluorometer. The results are shown in FIGS. 14 (*a*) and (*b*). It was again demonstrated that overall DNA yields are higher when using the method according to the present invention.

To evaluate the efficiency of inhibitor removal, a QuantiTect SYBR green-based real time analysis that includes an internal control DNA was performed and the results are shown in FIG. 15. This enabled quantification of the PCR inhibition of eluates. To this end, 8 µl of each DNA eluate were added into a real time PCR reaction sample that includes an internal control DNA which is efficiently amplified in the absence of PCR inhibitors. Amplification was performed using QuantiFast Pathogen+IC kit. As an inhibitor-free control, 8 µl of water were added in a separate real time PCR reaction sample (FIG. 15, dotted line). PCR inhibition is reflected by the overall change in Ct values between the samples obtained using different methods and the control (FIG. 15). Each Ct value is a replicate of 4 independent biological samples, i.e. for each column shown the purified DNA eluates of 4 independent preparations was measured in 3 replicates.

FIG. 15 demonstrates that the efficiency of inhibitor removal was significantly improved using the inhibitor removal chemistry according to the invention (see Ct values). By comparing the non-inhibited Ct values (dotted-line) to the inhibitor removal chemistry according to the prior and the invention, it can be seen that there was no PCR inhibition when using the eluates obtained with the method according to the present invention. PCR inhibition was increased with inhibitor removal buffers of the prior art. This is especially the case for old strawberry leaf samples, which have a high amount of secondary metabolites that can act as PCR inhibitors.

The method according to the present invention (see Example 1) was also compared to further prior art kits, here the PureLink Plant kit and the Zymo Quick DNA Plant/Seed kit. DNA was isolated from 50 mg strawberry leaves and the yield measured via a Qubit Fluorometer. The results are shown in FIG. 16 and demonstrate that the method of the invention provided the highest yield. To analyse the inhibitor removal efficiency, 8 µl of the resulting strawberry DNA eluates (4 replicates) were spiked into an Internal Control (IC) PCR and the IC was amplified using the QuantiFast Pathogene+IC kit. Fluorescence generated with the PCR reactions was measured with Rotor-Gene Q and is proportional to the generated PCR product. Resulting fluorescence in PCR reactions with strawberry DNA eluates containing possible inhibitors were compared to fluorescence signals of the PCR reaction with water added as control which does not inhibit amplification of the IC DNA. The results are shown in FIG. 17 and demonstrate that the eluate obtained with the method according to the present invention (see (b)) showed no inhibition, essentially like the control PCR with water (see (a)). The prior art kits show inhibition (see (c) and (d)). The obtained results therefore again demonstrate a significantly improved DNA yield and inhibitor removal compared to a variety of prior art kits.

Summary

The method according to the invention provides higher DNA yields than prior art methods. Furthermore, the efficient inhibitor chemistry of the present invention removes essentially all inhibitors contained in the plants samples providing an inhibitor-free DNA eluate that can be subjected to any enzyme-based procedure including PCR.

VI. Example 6: Detecting Plant Pathogens in Plant Samples

Fungal and bacterial pathogens affecting plants can have a large economic impact depending on the pathogen and plant type.

It was studied if the workflow of the present invention could be used to identify commonly found plant pathogens, such as Diplocarpon *rosae* (a fungus infecting rose species causing rose black spot disease), *Agrobacterium tumefaciens* (a bacterial pathogen infecting over 60 different plant families causing crown galls) and *Rhytisma acernium* (a fungal pathogen infecting maple and sycamore trees causing tar spots).

DNA was extracted from 50 mg of the plant material infected with the respective pathogen using a ballcone together with the lysis and inhibitor removal chemistry of the present invention (see Example 1). A whole genome library was prepared with the QIASeq FX DNA Library Kit and sequenced by an Illumina MiSeq system (1×250 bp run). The resulting reads were analyzed with the CLC Genomic Workbench (QIAGEN Microbial Genomics Pro Suite). Each plant pathogen was successfully identified (see FIG. 18). The identification of plant-associated pathogens as part of the workflow of the present disclosure can be readily achieved. Sample lysis provided by the lysis chemistry of the present disclosure in combination with the mechanical lysis according to the present invention releases sufficient pathogen DNA which can be purified essentially inhibitor-free. The DNA isolated in the manner of the invention is highly pure and suitable for downstream applications such as next generation sequencing.

VII. Example 7: Total and Microbial DNA Yield

As discussed in Example IV for certain applications wherein the isolation of microbial nucleic acids from the plant sample is of interest, it is advantageous to use in step (a) (i) at least two types of solid disrupting particles, wherein (i) the first type is provided by one or more non-spherical disrupting particles having a size of at least 1.5 mm (e.g. a ballcone) and (ii) the second type is provided by a plurality of disrupting particles having a size of 1 mm or less (e.g. spherical zirconia beads). The effect when using either a ballcone or zirconia beads alone or in combination (see Example IV, Material and Methods) was analysed with further samples.

Apple Leaf and Apple Root Samples

DNA was isolated from apple leaf samples (50 mg) using the lysis method according to the invention in combination with mechanical lysis provided by a ballcone, a ballcone and zirconia beads or zirconia beads alone. Total DNA yield was determined using the Qubit assay. The results shown in FIG. 19 demonstrate that the total DNA yield (plant and microbial) can be increased when using a ballcone and zirconia, compared to zirconia alone.

For FIG. 20, the yields for total (Qubit) and microbial DNA for apple root samples were determined using two different assays. The improved yield of microbial DNA from microbes contained in apple root samples by a combination of a ballcone and zirconia beads over zirconia beads alone is demonstrated in FIG. 20. Microbial DNA was determined using a QuantiTect-based qPCR assay. These data highlight the thorough disruption and lysis of the apple root sample as well as the microbes contained inside the sample which in some cases may strongly increase the overall yield. The data demonstrates the improved yield of microbial DNA by a mixture of a ballcone and zirconia enabling the efficient release of intracellular microbes from the sample over the use of zirconia beads alone.

Summary

High yields of DNA comprising a high amount of microbial DNA is released from plant samples by a combined mechanical lysis using a non-spherical disrupting particle as described herein, such as a ballcone, and a plurality of small spherical particles such as zirconia beads. For analysis, various methods can be used, such as amplification based procedures (for example PCR) as well as sequencing, such as next generation sequencing, further enabling the amplification-based quantification of microbial DNA contained in the sample.

VIII. Example 8: The Root-Associated Plant Microbiome

To study the diversity of the microbiome contained within a plant sample and the disruption efficiency of plant associated bacteria, DNA was isolated from 50 mg apple tree root using the method of the invention with a ballcone, a mix of ballcone and small zirconia beads or zirconia beads alone (see Example IV). A 16S rRNA gene library was prepared with the QIAseq FX DNA Library Kit, sequenced by Illumina MiSeq system (2×250 bp run) and the resulting reads were analyzed with the CLC Genomic Workbench (QIAGEN Microbial Genomics Pro Suite). From the results, an operational taxonomy unit (OTU) clustering was performed (FIG. 21). The results demonstrate that plant cells are more efficiently lysed using the ballcone whereas the small zirconia beads are more efficient lysing bacterial cells. Using a combination of a ballcone and zirconia beads has important advantages for certain applications. The combined mechanical lysis using a non-spherical disrupting particle as described herein, such as a ballcone, and a plurality of small spherical particles such as zirconia beads provides DNA from plant samples with high yield, wherein the obtained DNA comprises a high amount of microbial DNA and high microbial diversity.

As is demonstrated by the above examples, the method according to the present invention improves both DNA yield and quality compared with prior art methods. It is suitable to isolate large amounts of high quality DNA from a variety of plant samples including, but not limited to, grass, pine needle, strawberry leaf, citrus leaf, grapevine leaf, tomato stem, coffee seed, cotton seed and root. The isolated DNA is of high purity and can directly go towards downstream applications including, but not limited to PCR, qPCR and next generation sequencing (NGS) applications. The isolated DNA was successfully used as part of a sample to insight work flow to identify various common plant pathogens and furthermore the root-associated plant microbiome. Furthermore, by using a combination of a non-spherical disrupting particle such as a ballcone together with a plurality of small disrupting particles, such as zirconium beads, the method according to the present invention can be adjusted to furthermore highly efficiently releases microbial nucleic acids, such as microbial DNA, from microorganisms that are comprised in the plant sample thereby making the microbial nucleic acids available for analysis in addition to the plant DNA.

Taken together, this data shows that the method according to the present invention can successfully isolate nucleic acids such as DNA from samples that are both difficult to lyse and high in inhibitors.

The invention claimed is:
1. A method for isolating nucleic acids from a plant sample comprising:
   (a) preparing a lysed sample wherein preparing comprises
      (i) lysing a plant sample by mechanically disrupting the plant sample in a liquid lysis composition which comprises at least one chaotropic agent selected from sodium thiocyanate, sodium carbonate, potassium thiocyanate, ammonium thiocyanate, lithium thiocyanate, lithium perchlorate, and combinations thereof and one or more non-spherical solid disrupting particles, and (ii) optionally clearing the lysate;

(b) contacting the lysed sample with at least one protein precipitating agent and at least one inhibitor removing agent and providing a mixture;

(c) obtaining a liquid phase from the mixture; and (d) isolating nucleic acids from the liquid phase.

2. The method according to claim 1, wherein the surface of the one or more disrupting particles contains a first part and contains a second part, whereby the first part and the second part meet by forming an edge.

3. The method according to claim 2, wherein (i) the first part is the surface of a frustum of a cone and the second part is the surface of a frustum of a cone, wherein both cones are set against each other with their larger base, the edge being formed where the larger bases meet; or (ii) the first part is the surface of a frustum of a cone and the second part is the surface of a frustum of a cone, wherein both cones are set against each other with their larger base, the edge being formed where the larger bases meet, the larger bases being of the same diameter.

4. The method according to claim 2, wherein the one or more disrupting particles have one or more of the following characteristics:

(i) the disrupting particle has a subportion that is made up of a section or a part of a ball or an ellipse;

(ii) the disrupting particle has at least one tip;

(iii) the disrupting particle has at least one tip, which is a frustum of a cone;

(iv) the disrupting particle has at least two subportions that are made up of a section or a part of a ball or an ellipse; and (v) the one or more disrupting particles have a shape selected from cones, cylinders, cubes, triangles, rectangles, a ballcone and a satellite.

5. The method according to claim 2, wherein the one or more disrupting particles are selected from the following group of particles that are characterized in that:

(aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part;

(bb) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein the subportion that is made up of a section or a part of a ball or an ellipse is a semi-sphere;

(cc) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part;

(dd) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part; and (ee) the particle comprises two semi-spheres wherein the first semi-sphere is set against the smaller base of the frustum of the cone of the first part and the second semi-sphere is set against the smaller base of the frustum of the cone of the second part.

6. The method according to claim 1, wherein at least one disrupting particle is used in step (a) (i) that (aa) has a weight in the range of 500 mg to 1000 mg, or 600 mg to 900 mg, and (bb) exhibits a size of 3 mm to 10 mm, 3 mm to 7 mm, or 4 mm to 7 mm, wherein optionally (cc) the disrupting particle is a ballcone.

7. The method according to claim 1, wherein (i) the chaotropic agent is selected from sodium thiocyanate, potassium thiocyanate, ammonium thiocyanate, lithium thiocyanate and combinations thereof;

(ii) the chaotropic agent is sodium thiocyanate; and/or (iii) the concentration of the at least one chaotropic agent in the liquid lysis composition and/or the lysis mixture lies in a range of 0.75 M to 1.5 M or of 0.8 M to 1.25 M.

8. The method according to claim 1, wherein (i) the method further comprises adding at least one phosphate prior to contacting in step (b) the lysed sample with the at least one inhibitor removing agent; or (ii) the method further comprises adding at least one phosphate prior to contacting in step (b) the lysed sample with the at least one inhibitor removing agent, wherein the at least one phosphate is added in step (a).

9. The method according to claim 8, wherein the at least one phosphate is included in the liquid lysis composition, and wherein the concentration of the at least one phosphate in the liquid lysis composition, the lysis mixture and/or the lysed sample lies in a range of 0.05 M to 0.75 M, 0.06 M to 0.6 M, 0.075 M to 0.5 M, 0.1 M to 0.3 M, 0.1 M to 0.25 M, 0.15 M to 0.2 M, or 0.125 M to 0.2 M, optionally wherein the liquid lysis composition is a lysis solution.

10. The method according to claim 1, wherein (i) the liquid lysis composition comprises sodium thiocyanate and at least one phosphate;

(ii) the liquid lysis composition comprises sodium thiocyanate and at least one phosphate, wherein the at least one phosphate is sodium phosphate dibasic;

(iii) the liquid lysis composition comprises sodium thiocyanate and at least one phosphate, wherein the liquid lysis composition and/or the liquid lysis mixture comprises sodium thiocyanate in a concentration selected from 0.75 M to 1.5 M and 0.8 M to 1.25 M and the at least one phosphate in a concentration selected from 0.075 M to 0.3 M, 0.1 M to 0.25 M and 0.1 M to 0.2 M; and/or (iv) the liquid lysis composition and/or the liquid lysis mixture which comprises the liquid lysis composition and the plant sample comprises sodium thiocyanate in a concentration of 0.7 M to 1.5 M and the at least one phosphate in a concentration of 0.075 M to 0.3 M, optionally wherein the at least one phosphate is sodium phosphate dibasic.

11. The method according to claim 1, wherein step (a) comprises performing (ii) clearing the lysate, wherein clearing the lysate comprises separating the lysed mixture that is obtained upon disrupting the plant sample into a solid fraction and a liquid fraction, and wherein in step (b) the liquid fraction of the lysed mixture is processed as lysed sample.

12. The method according to claim 1, wherein
   (aa) the at least one protein precipitating agent is selected from ammonium acetate, ammonium sulfate, potassium acetate, sodium acetate, sodium chloride and cesium acetate, and/or wherein the concentration of the at least one precipitating agent in the mixture is in a range selected from 0.1 to 4M, 0.2M to 3M, 0.3M to 2.5M, 0.4M to 2.25M, 0.5M to 2M and 0.6M to 1.75M; and
   (bb) the at least one inhibitor removing agent is selected from aluminum chloride, erbium (III) acetate, erbium (III) chloride, holmium chloride, hafnium (IV) chloride, zirconium (IV) chloride, guanidine sulfate, and combinations thereof, and/or wherein the concentration of the at least one inhibitor removing agent in the mixture is in a range selected from 1 mM to 150 mM, 5 mM to 125 mM, 10 mM to 100 mM, 15 mM to 75 mM and 20 mM to 65 mM.

13. The method according to claim 12, wherein the protein precipitating agent is ammonium acetate and/or the inhibitor removing agent is aluminum chloride.

14. The method according to claim 1, wherein in step (b) the lysed sample is contacted with a composition comprising the at least one precipitating agent and the at least one inhibitor removing agent, wherein the composition has one or more of the following characteristics:
   (aa) the total concentration of the one or more precipitating agents in the composition that is added in step (b) is in the range of 0.5 M to 10 M, 1 M to 8 M, 1.5 M to 7.5 M, 1 M to 6 M, 1.5 M to 5.5 M, 2 M to 5 M, 2.5 M to 4.5 M, or 3 M to 4 M;
   (bb) the total concentration of the one or more inhibitor removing agents in the composition that is added in step (b) is in the range of 10 mM to 500 mM, 25 mM to 400 mM, 50 mM to 350 mM, 75 mM to 300 mM, 90 mM to 250 mM, 50 mM or 100 mM to 200 mM, 50 mM to 175 mM or 75 mM to 150 mM;
   (cc) it comprises, consists essentially of, or consists of
      (i) one or more precipitating agents selected from ammonium acetate, ammonium sulfate, potassium acetate, sodium acetate, sodium chloride, cesium acetate, and combinations thereof,
      (ii) one or more inhibitor removal agents selected from aluminum chloride, erbium (III) acetate, erbium (III) chloride, holmium chloride, hafnium (IV) chloride, zirconium (IV) chloride, and combinations thereof, and
      (iii) optionally water; and
   (dd) it is a liquid composition, optionally a liquid solution.

15. The method according to claim 1, wherein in step (a) (i) at least two types of solid disrupting particles are used, wherein
   (i) the first type is provided by one or more non-spherical disrupting particles having a size of at least 1.5 mm, and
   (ii) the second type is provided by a plurality of disrupting particles having a size of 1 mm or less.

16. The method according to claim 15, wherein the first type has one or more of the characteristics of the disrupting particle:

a. the surface of the one or more disrupting particles of the first type contains a first part and contains a second part, whereby the first part and the second part meet by forming an edge;
b. (i) the first part is the surface of a frustum of a cone and the second part is the surface of a frustum of a cone, wherein both cones are set against each other with their larger base, the edge being formed where the larger bases meet; or
   (ii) the first part is the surface of a frustum of a cone and the second part is the surface of a frustum of a cone, wherein both cones are set against each other with their larger base, the edge being formed where the larger bases meet, the larger bases being of the same diameter;
c. (i) the disrupting particle of the first type has a subportion that is made up of a section or a part of a ball or an ellipse;
   (ii) the disrupting particle of the first type has at least one tip;
   (iii) the disrupting particle of the first type has at least one tip, which is a frustum of a cone;
   (iv) the disrupting particle of the first type has at least two subportions that are made up of a section or a part of a ball or an ellipse;
   (v) the one or more disrupting particles of the first type have a shape selected from cones, cylinders, cubes, triangles, rectangles, a ballcone and a satellite;
d. (aa) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part;
   (bb) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein the subportion that is made up of a section or a part of a ball or an ellipse is a semi-sphere;
   (cc) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part;
   (dd) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part;
   (ee) the particle comprises two semi-spheres wherein the first semi-sphere is set against the smaller base of the frustum of the cone of the first part and the second semi-sphere is set against the smaller base of the frustum of the cone of the second part; and e. at least one disrupting particle of the first type is used in step (a) (i) that (aa) has a weight in the range of 500 mg to 1000 mg, or 600 mg to 900 mg, and (bb) exhibits a size of 3 mm to 10 mm, 3 mm to 7 mm, or 4 mm to 7 mm, wherein optionally (cc) the disrupting particle is a ballcone.

17. The method according to claim 15, wherein the second type has one or more of the following characteristics:
  (i) the plurality of particles are substantially spherical and comprise or consist of zirconium, zircon (zirconium silicate), zirconia (zirconium dioxide), yttrium-stabilized zirconium, quartz, aluminum oxide, silicon carbide, ceramic, glasses (optionally silicon dioxide glass or silica) or a combination of the foregoing;
  (ii) the plurality of particles have a size that lies in the range of 0.05 mm to 0.9 mm, optionally selected from 0.07 mm to 0.8 mm, 0.08 mm to 0.75 mm and 0.09 mm to 0.7 mm;
  (iii) the plurality of particles have a density of at least 2.0 g/cc, at least 2.5 g/cc, at least 3.0 g/cc, at least 3.5 g/cc, at least 4.0 g/cc, at least 4.5 g/cc, at least 5.0 g/cc or at least 5.5 g/cc;
  (iv) the plurality of particles have a density that lies in a range selected from 2.0 g/cc to 15 g/cc, 2.5 g/cc to 12 g/cc, 3.0 g/cc to 10 g/cc, 3.5 g/cc to 9 g/cc, 4.0 g/cc to 8 g/cc, 4.5 g/cc to 7.5 g/cc and 5 g/cc to 7 g/cc; and
  (v) the plurality of particles comprises at least two subtypes of particles, wherein the at least two subtypes differ from one another by size, wherein (a) the size of the first particle subtype lies on average in a range selected from 0.05 mm to 0.25 mm, 0.07 mm to 0.2 mm, 0.08 mm to 0.175 mm and 0.9 mm to 0.15 mm, and (b) the size of the second particle subtype lies on average in a range selected from 0.3 mm to 0.9 mm, 0.35 mm to 0.8 mm, 0.4 mm to 0.7 mm and 0.45 mm to 0.6 mm.

18. The method according to claim 15, wherein
  (i) the first type is provided by a single solid non-spherical disrupting particle having one or more of the following characteristics:
    a. the surface of the disrupting particle contains a first part and contains a second part, whereby the first part and the second part meet by forming an edge;
    b. (i) the first part is the surface of a frustum of a cone and the second part is the surface of a frustum of a cone, wherein both cones are set against each other with their larger base, the edge being formed where the larger bases meet; or
      (ii) the first part is the surface of a frustum of a cone and the second part is the surface of a frustum of a cone, wherein both cones are set against each other with their larger base, the edge being formed where the larger bases meet, the larger bases being of the same diameter;
    c. (i) the disrupting particle of the first type has a subportion that is made up of a section or a part of a ball or an ellipse;
      (ii) the disrupting particle of the first type has at least one tip;
      (iii) the disrupting particle of the first type has at least one tip, which is a frustum of a cone;
      (iv) the disrupting particle of the first type has at least two subportions that are made up of a section or a part of a ball or an ellipse; and/or
      (v) the one or more disrupting particles of the first type have a shape selected from cones, cylinders, cubes, triangles, rectangles, a ballcone and a satellite;
    d. (aa) (i) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part; or
      (ii) the particle comprises at least one tip which is a frustum of a cone, wherein the larger base of the frustum of the cone that provides the tip is set against the smaller base of the frustum of the cone of the second part and wherein the particle comprises a subportion that is made up of a section or a part of a ball or an ellipse which is set against the smaller base of the frustum of the cone of the first part, wherein the subportion that is made up of a section or a part of a ball or an ellipse is a semi-sphere;
      (bb) the particle comprises at least two tips, wherein both tips are a frustum of a cone, wherein the larger base of the frustum of a cone is set against the smaller base of the frustum of the cone of the first part and the larger base of the frustum of a cone is set against the smaller base of the frustum of the cone of the second part;
      (cc) the particle comprises two subportions, wherein each subportion is made up of a section or a part of a ball or an ellipse, wherein the first subportion that is made up of a section or a part of a ball or an ellipse is set against the smaller base of the frustum of the cone of the first part and the second subportion that is made up of a section or a part of a ball or an ellipse is set against the smaller base of the frustum of the cone of the second part; and/or
      (dd) the particle comprises two semi-spheres wherein the first semi-sphere is set against the smaller base of the frustum of the cone of the first part and the second semi-sphere is set against the smaller base of the frustum of the cone of the second part; and
    e. at least one disrupting particle of the first type is used in step (a) (i) that (aa) has a weight in the range of 500 mg to 1000 mg, or 600 mg to 900 mg and (bb) exhibits a size of 3 mm to 10 mm, 3 mm to 7 mm, or 4 mm to 7 mm, wherein optionally (cc) the disrupting particle is a ballcone; and
  (ii) the second type is provided by a plurality of substantially spherical zirconia beads, optionally having a size that lies in the range of 0.08 mm to 0.7 mm, or 0.09 mm to 0.6 mm.

19. The method according to claim 1, wherein the method comprises
  (a) preparing a lysed sample wherein preparing comprises
    (i) lysing a plant sample by mechanically disrupting the plant sample in a liquid lysis composition which comprises at least one chaotropic agent selected from sodium thiocyanate, sodium carbonate, potassium thiocyanate, ammonium thiocyanate, lithium thiocyanate, lithium perchlorate, and combinations thereof and one or more solid disrupting particles, wherein at least one non-spherical disrupting particle is used; and
  (ii) clearing the lysate, wherein clearing the lysate comprises separating the lysed mixture that is obtained upon disrupting the plant sample into a solid fraction and a liquid fraction, wherein the liquid fraction of the lysed mixture is processed in step (b) as lysed sample;
(b) contacting the lysed sample with at least one protein precipitating agent and at least one inhibitor removing agent and providing a mixture;
(c) obtaining a liquid phase from the mixture; and
(d) isolating nucleic acids from the liquid phase,
wherein the method further comprises adding at least one phosphate prior to contacting in step (b) the lysed sample with the at least one inhibitor removing agent;
optionally wherein the at least one non-spherical disrupting particle used in step (a) (i) has a weight of at least 300 mg and/or has a size of at least 1.5 mm.

20. The method according to claim 1, wherein the method comprises
(a) preparing a lysed sample wherein preparing comprises
  (i) lysing a plant sample by mechanically disrupting the plant sample in a liquid lysis composition which comprises at least one chaotropic agent in a concentration of 1.5 M or less, wherein the chaotropic agent is selected from sodium thiocyanate, potassium thiocyanate, ammonium thiocyanate, lithium thiocyanate and one or more solid disrupting particles, wherein at least one non-spherical disrupting particle is used; and
  (ii) clearing the lysate, wherein clearing the lysate comprises separating the lysed mixture that is obtained upon disrupting the plant sample into a solid fraction and a liquid fraction, wherein the liquid fraction of the lysed mixture is processed in step (b) as lysed sample;
(b) contacting the lysed sample with
  at least one protein precipitating agent selected from ammonium acetate,
  ammonium sulfate, potassium acetate, sodium acetate, sodium chloride and cesium acetate, and at least one inhibitor removing agent selected from aluminum chloride, erbium (III) acetate, erbium (III) chloride, holmium chloride, hafnium (IV) chloride, zirconium (IV) chloride, guanidine sulfate, and combinations thereof, and
  providing a mixture;
(c) obtaining a liquid phase from the mixture; and
(d) isolating nucleic acids from the liquid phase;
wherein the method further comprises adding at least one phosphate prior to contacting in step (b) the lysed sample with the at least one inhibitor removing agent.

21. The method of claim 20, having one or more of the following characteristics:
  (i) the chaotropic agent is sodium thiocyanate;
  (ii) the protein precipitating agent is ammonium acetate;
  (iii) the inhibitor removing agent is aluminum chloride.

22. The method according to claim 1, wherein the method comprises
(a) preparing a lysed sample wherein preparing comprises
  (i) lysing a plant sample by mechanically disrupting the plant sample in a liquid lysis composition which comprises at least one chaotropic agent in a concentration of 1.5 M or less, wherein the chaotropic agent is sodium thiocyanate, and one or more solid disrupting particles, wherein at least one non-spherical disrupting particle is used;
  (ii) clearing the lysate, wherein clearing the lysate comprises separating the lysed mixture that is obtained upon disrupting the plant sample into a solid fraction and a liquid fraction, wherein the liquid fraction of the lysed mixture is processed in step (b) as lysed sample;
(b) contacting the lysed sample with
  at least one protein precipitating agent selected from ammonium acetate, ammonium sulfate, potassium acetate, sodium acetate, sodium chloride and cesium acetate, and
  at least one inhibitor removing agent which is a trivalent aluminum salt, and providing a mixture;
(c) obtaining a liquid phase from the mixture; and
(d) isolating nucleic acids from the liquid phase;
wherein the method further comprises adding at least one phosphate prior to contacting in step (b) the lysed sample with the at least one inhibitor removing agent.

23. The method according to claim 22, wherein the protein precipitating agent is ammonium acetate and/or the inhibitor removing agent is aluminum chloride.

24. The method according to claim 1, wherein step (b) comprises contacting the lysed sample with ammonium acetate as precipitating agent and a trivalent aluminum salt as an inhibitor removing agent, and wherein in the mixture of step (b) the concentration of ammonium acetate lies is a range of 0.5 M to 2 M, and the concentration of the trivalent aluminum salt lies in a range of 15 mM to 75 mM.

25. The method of claim 24, wherein the trivalent aluminum salt is aluminum chloride.

* * * * *